United States Patent

[11] 3,577,185

[72] Inventor Laszlo A. Belady
    Yorktown Heights, N.Y.
[21] Appl. No. 863,265
[22] Filed Oct. 2, 1969
[45] Patented May 4, 1971
[73] Assignee International Business Machines Corporation
    Armonk, N.Y.

[54] ON-LINE SYSTEM FOR MEASURING THE EFFICIENCY OF REPLACEMENT ALGORITHMS
10 Claims, 51 Drawing Figs.

[52] U.S. Cl. .................................................. 340/142.5
[51] Int. Cl. ..................................................... G06f 15/00
[50] Field of Search .......................................... 340/172.5

[56] References Cited
UNITED STATES PATENTS

| | | | |
|---|---|---|---|
| RE26,624 | 7/1969 | Bloom et al. ................ | 340/172.5 |
| 3,292,152 | 12/1966 | Barton ........................ | 340/172.5 |
| 3,292,153 | 12/1966 | Barton ........................ | 340/172.5 |
| 3,339,182 | 8/1967 | Horwitz et al. .............. | 340/172.5 |

Primary Examiner—Paul J. Henon
Assistant Examiner—Harvey E. Springborn
Attorneys—Hanifin and Jancin and C. P. Boberg

ABSTRACT: Technique for dynamically measuring the efficiency of a replacement algorithm in a virtual-memory data processing system. Each time the actual replacement algorithm effects the replacement of a "block" or "page" stored in the working memory, the measurement system automatically compares the number of such replacement that have been made with the number that would have been required by an assumed "optimal" replacement algorithm, the latter being unable to make its determinations in real time. The difference between the actual replacement count and the optimal replacement count is the number of unnecessary block transfers. The efficiency measurement functions are performed during those periods when the processor has been interrupted for a block replacement and is awaiting the entry of a newly demanded block into the working memory. Thus, the present system makes its efficiency measurements in an efficient manner. To accomplish this, the system utilizes an associative memory or equivalent storage mapping means having provisions for storing special reference bits (R' bits) in the words respectively associated with the addresses in working memory. Each time a block stored in working memory is referenced by the processor, the R' bit associated with that block is set. Then, when the next block replacement occurs, the measurement system is able, with the aid of these R' bits, to update the optimal replacement pattern, or more specifically, to determine what blocks currently would have been present in the working memory if the optimal replacement algorithm had been followed and, therefore, whether the currently demanded replacement operation would have been necessary if said algorithm had been followed. The measurement system also is able to detect the occasional instances, if any, in which the actual replacement algorithm is able to avoid making a block replacement that the optimal algorithm would have found necessary. The system is further able to detect when, due to incomplete knowledge of the order of referencing, it is uncertain whether the optimal algorithm could have avoided making the currently demanded block replacement, and in such a case the system specifies a possible range of values for the replacement efficiency.

FIG. 2

| BLOCK REQUEST SEQUENCE | | ACTUAL REPLACEMENT ALGORITHM | | | OPTIMAL REPLACEMENT ALGORITHM | | |
|---|---|---|---|---|---|---|---|
| INTERVAL NUMBER | REQUESTED BLOCK NUMBER | BLOCK BROUGHT INTO WM | REPLACED BLOCK | REFERENCE TO BLOCK ALREADY IN WM | BLOCK BROUGHT INTO WM | REPLACED BLOCK | REFERENCE TO BLOCK ALREADY IN WM |
| 1 | BL1 | BL1 | | | BL1 | | |
| 2 | BL2 | BL2 | | | BL2 | | |
| 3 | BL3 | BL3 | | | BL3 | | |
| 4 | BL4 | BL4 | BL1 | | BL4 | BL1 OR BL3 | |
| 5 | BL5 | BL5 | BL2 | | BL5 | BL3, BL1, OR BL4 | |
| 6 | BL2 | BL2 | BL3 | | | | BL2 |

← UNNECESSARY TRANSFER

ASSUMED CAPACITY OF WORKING MEMORY = 3 BLOCKS

ACTUAL REPLACEMENT EFFICIENCY = $\frac{P-U}{P} = \frac{6-1}{6} = 83.3\%$

P = NUMBER OF BLOCKS PULLED FROM BACKUP STORE
U = NUMBER OF UNNECESSARY BLOCK TRANSFERS

FIG. 3

| ACTUAL SEQUENCE OF OPERATIONS | | | OPTIMAL SEQUENCE OF OPERATIONS | | | | | | | |
|---|---|---|---|---|---|---|---|---|---|---|
| ACTUAL INTERVAL NUMBER | OPERATIONS PERFORMED | P | OPTIMAL INTERVAL NUMBER | OPERATIONS SPECIFIED | A | E | C | B | U | |
| 1 | ENTER BL1<br>REFERENCE BL1 | 1 | 1 | ENTER BL1<br>REFERENCE BL1 | 1 | 1 | 2 | 1 | 0 | |
| 2 | ENTER BL2<br>REFERENCE BL2 | 2 | 2 | ENTER BL2<br>REFERENCE BL2 | 2 | 2 | 2 | 1 | 0 | |
| 3 | ENTER BL3<br>REFERENCE BL3 | 3 | 3 | ENTER BL3<br>REFERENCE BL3 | 3 | 3 | 2<br>1 | 1 | 0 | |
| 4 | ENTER BL4; REPLACE BL1<br>REFERENCE BL4 | 4 | 4 | ENTER BL4; REPLACE BL1<br>REFERENCE BL4 | 4 | 4 | 2<br>1 | 1 | 0 | |
| 5 | ENTER BL5; REPLACE BL2<br>REFERENCE BL5 | 5 | 5 | ENTER BL5; REPLACE BL3<br>REFERENCE BL5<br>REFERENCE BL2<br>REFERENCE BL4 | 5 | 5<br>5<br>5 | 2<br>1<br>0 | 5 | | |
| 6 | ENTER BL2; REPLACE BL3<br>REFERENCE BL2<br>REFERENCE BL4 | 6 | | | | | | | 1 | |

FIG. 4A

Block Referencing Sequence: BL1, BL2, BL3, BL4, BL5, BL2, BL4, BL1, BL6, BL1, BL2, BL4
Capacity of Working Memory WM assumed to be 3 blocks.

| P | Actual Sequence of Operations | Optimal Sequence of Operations | A | U |
|---|---|---|---|---|
| 1 | Request BL1 (not in WM) Enter BL1 into 2nd address of WM Reference BL1 in 2nd address of WM | Request BL1 (not in WM) Enter BL1 into 2nd address of WM Reference BL1 in 2nd address of WM | 1 | 0 |
| 2 | Request BL2 (not in WM) Enter BL2 into 3rd address of WM Reference BL2 in 3rd address of WM | Request BL2 (not in WM) Enter BL2 into 3rd address of WM Reference BL2 in 3rd address of WM | 2 | 0 |
| 3 | Request BL3 (not in WM) Enter BL3 into 1st address of WM Reference BL3 in 1st address of WM | Request BL3 (not in WM) Enter BL3 into 1st address of WM Reference BL3 in 1st address of WM | 3 | 0 |
| 4 | Request BL4 (not in WM) Enter BL4 into 2nd address of WM, replacing BL1. Reference BL4 in 2nd address of WM | Request BL4 (not in WM) Enter BL4 into 2nd address of WM, replacing BL1. Reference BL4 in 2nd address of WM | 4 | 0 |
| 5 | Request BL5 (not in WM) Enter BL5 into 3rd address of WM, replacing BL2. Reference BL5 in 3rd address of WM | Request BL5 (not in WM) Enter BL5 into 1st address of WM, replacing BL3. Reference BL5 in 1st address of WM Reference BL2 in 3rd address of WM Reference BL4 in 2nd address of WM Complete set formed, B = 5 | 5 | 0 |
| 6 | Request BL2 (not in WM) Enter BL2 into 1st address of WM, replacing BL3. Reference BL2 in 1st address of WM Reference BL4 in 2nd address of WM Alter BL4, set alteration bit of BL4 = 1 | Unnecessary transfer performed by actual replacement algorithm. Increment U to 1. | | 1 |

FIG. 4B

| | | | | |
|---|---|---|---|---|
| 7 | REQUEST BL1 (NOT IN WM) ENTER BL1 INTO 3RD ADDRESS OF WM, REPLACING BL5. REFERENCE BL1 IN 3RD ADDRESS OF WM | REQUEST BL1 (NOT IN WM) ENTER BL1 INTO 1ST ADDRESS OF WM, REPLACING BL5. REFERENCE BL1 IN 1ST ADDRESS OF WM | 6 | 1 |
| 8 | REQUEST BL6 (NOT IN WM) ENTER BL6 INTO 1ST ADDRESS OF WM, REPLACING BL2. REFERENCE BL6 IN 1ST ADDRESS OF WM REFERENCE BL1 IN 3RD ADDRESS OF WM (BL4 STILL IN 2ND ADDRESS OF WM) | REQUEST BL6 (NOT IN WM) ENTER BL6 INTO 2ND ADDRESS OF WM, REPLACING BL4. REFERENCE BL6 IN 2ND ADDRESS OF WM REFERENCE BL1 IN 1ST ADDRESS OF WM REFERENCE BL2 IN 3RD ADDRESS OF WM | 7 | 1 |
| 9 | REQUEST BL2 (NOT IN WM) SET "L" BIT OF BL4 = 1 ENTER BL2 INTO 1ST ADDRESS OF WM, REPLACING BL6. REFERENCE BL2 IN 1ST ADDRESS OF WM REFERENCE BL4 IN 2ND ADDRESS OF WM (INITIAL "E" VALUE OF BL4 = 5) UNNECESSARY TRANSFER SPECIFIED BY OPTIMAL REPLACEMENT ALGORITHM. DECREMENT U TO "1". INCREMENT A TO "8". | COMPLETE SET FORMED, B = 7 UNNECESSARY TRANSFER PERFORMED BY ACTUAL REPLACEMENT ALGORITHM. INCREMENT U TO "2". (ADDRESS UNDETERMINED) | | 2 |
| | | REQUEST BL4 (NOT IN WM) ENTER BL4 INTO WM (ADDRESS UNDETERMINED) REFERENCE BL4 IN WM | 8 | 1 |

FIG. 5

BLOCK REFERENCING SEQUENCE: BL1,BL2,BL3,BL4,BL5,BL2,BL3,BL6,BL1,BL2,BL7,BL4,BL6

| ACTUAL SEQUENCE OF OPERATIONS | | OPTIMAL SEQUENCE OF OPERATIONS | | | | | |
|---|---|---|---|---|---|---|---|
| P | OPERATIONS PERFORMED | A | OPERATIONS SPECIFIED | E | C | B | U |
| 1-4 | SAME AS FIG. 3 | 1-4 | SAME AS FIG. 3 | 1-4 | 2 OR 1 | 1 | 0 |
| 5 | ENTER BL5; REPLACE BL2 | 5 | ENTER BL5; REPLACE BL4 REFERENCE BL5 | 5 | 2 | | |
| 6 | ENTER BL2; REPLACE BL3 | | REFERENCE BL2 REFERENCE BL3 | 5 5 | 1 0 | 5 | 2 |
| 7 | ENTER BL3; REPLACE BL4 | | | | | | |
| 8 | ENTER BL5; REPLACE BL5 | 6 | ENTER BL6; REPLACE BL5 REFERENCE BL6 | 6 | 2 | 5 | 2 |
| 9 | ENTER BL2; REPLACE BL2 | 7 | ENTER BL1; REPLACE BL3 REFERENCE BL1 | 7 | 2 | 5 | 3 |
| 10 | ENTER BL2; REPLACE BL3 | | REFERENCE BL2 (BL6 REFERENCED DURING OPTIMAL INTERVAL 9) | 7 | 1 0 | | |
| 11 | ENTER BL7; REPLACE BL6 | 8 | ENTER BL7; REPLACE BL2 REFERENCE BL7 | 8 | 2 1 | 5 | 3 |
| 12 | ENTER BL4; REPLACE BL7 | 9 | ENTER BL4; REPLACE BL1 REFERENCE BL4 | 9 | 2 | 7 | 4 |
| 13 | ENTER BL6; REPLACE BL2 | | REFERENCE BL6 (COMPLETE SET DEFINED FOR OPTIMAL INTERVAL 7) | 9 | | | |

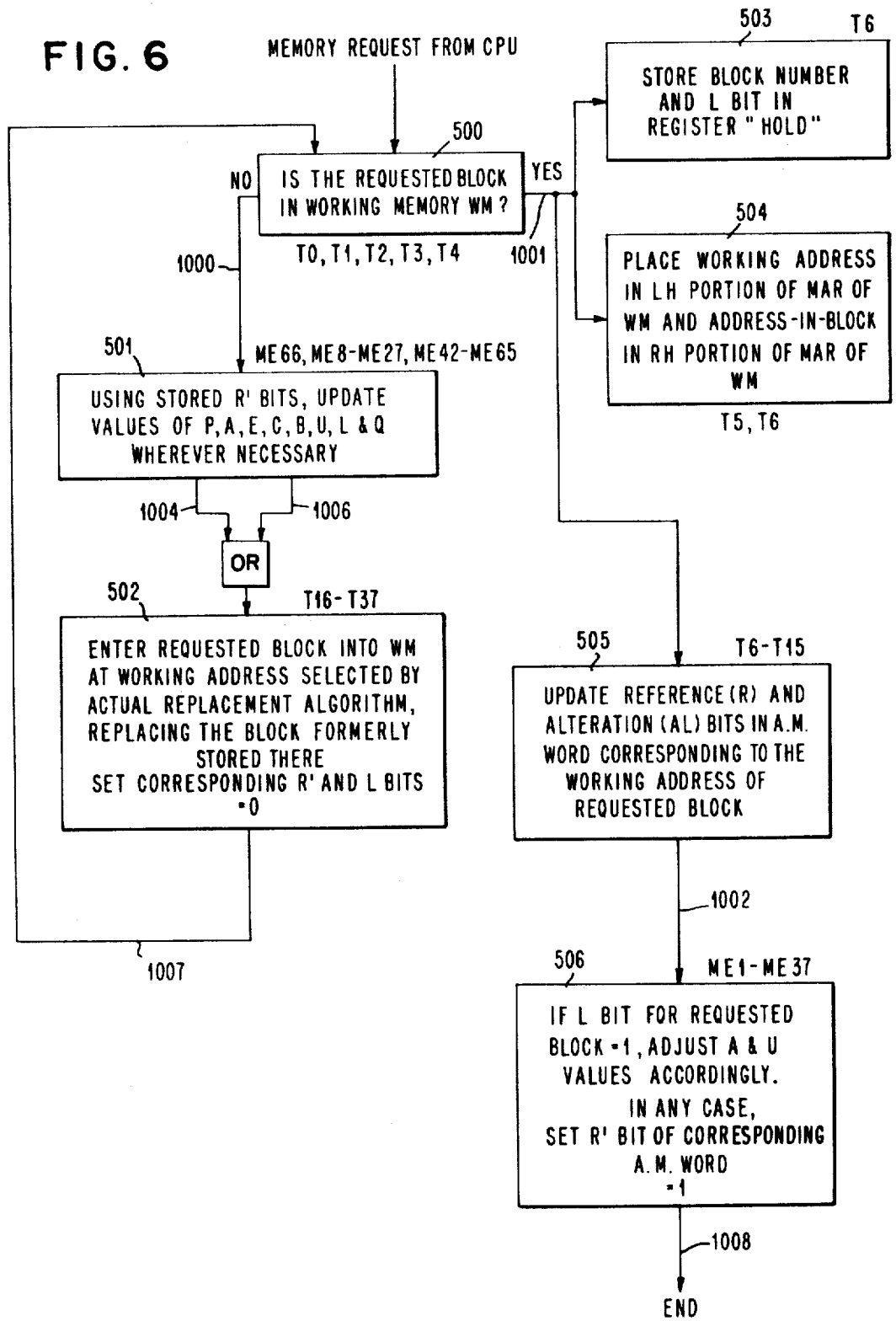

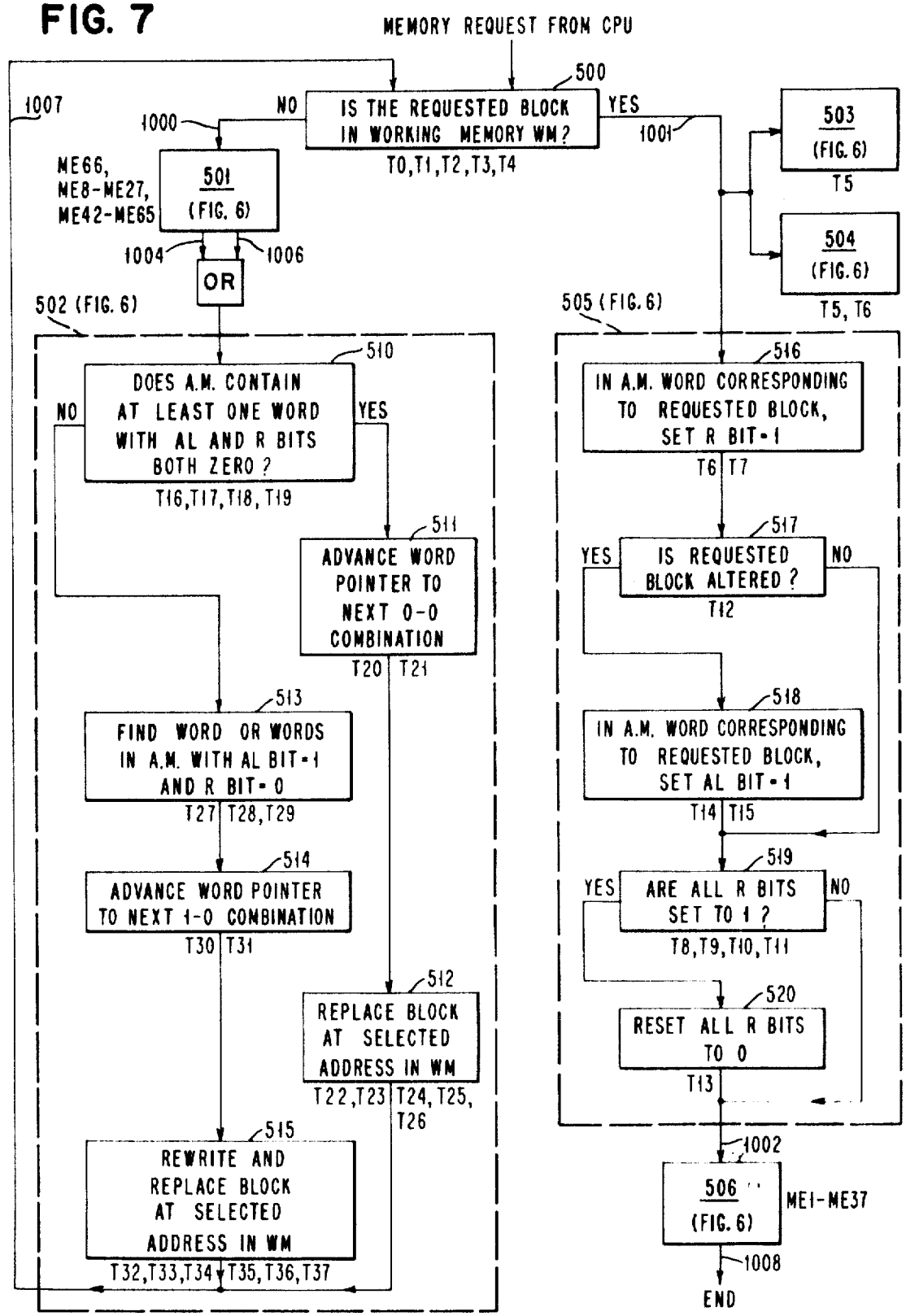

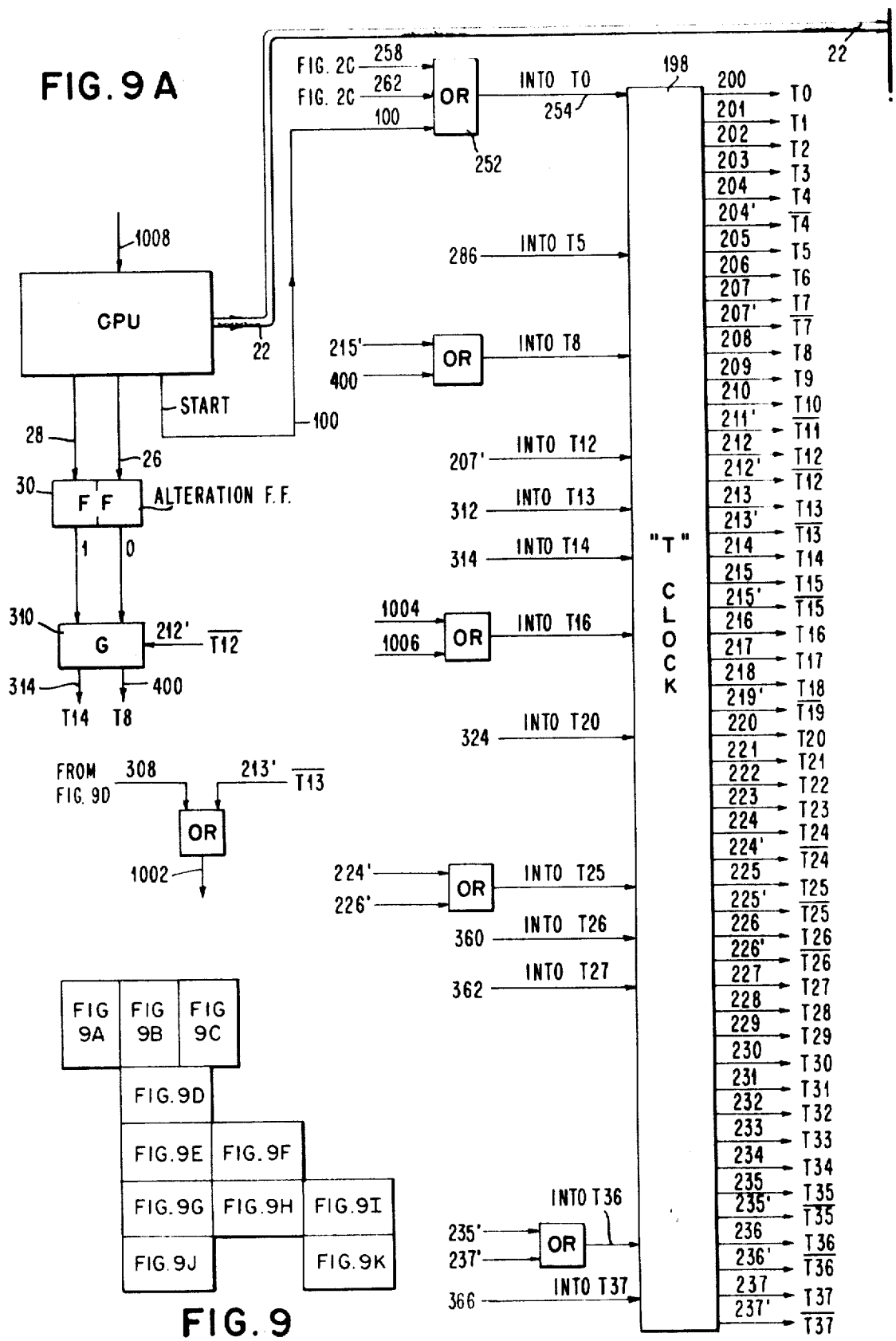

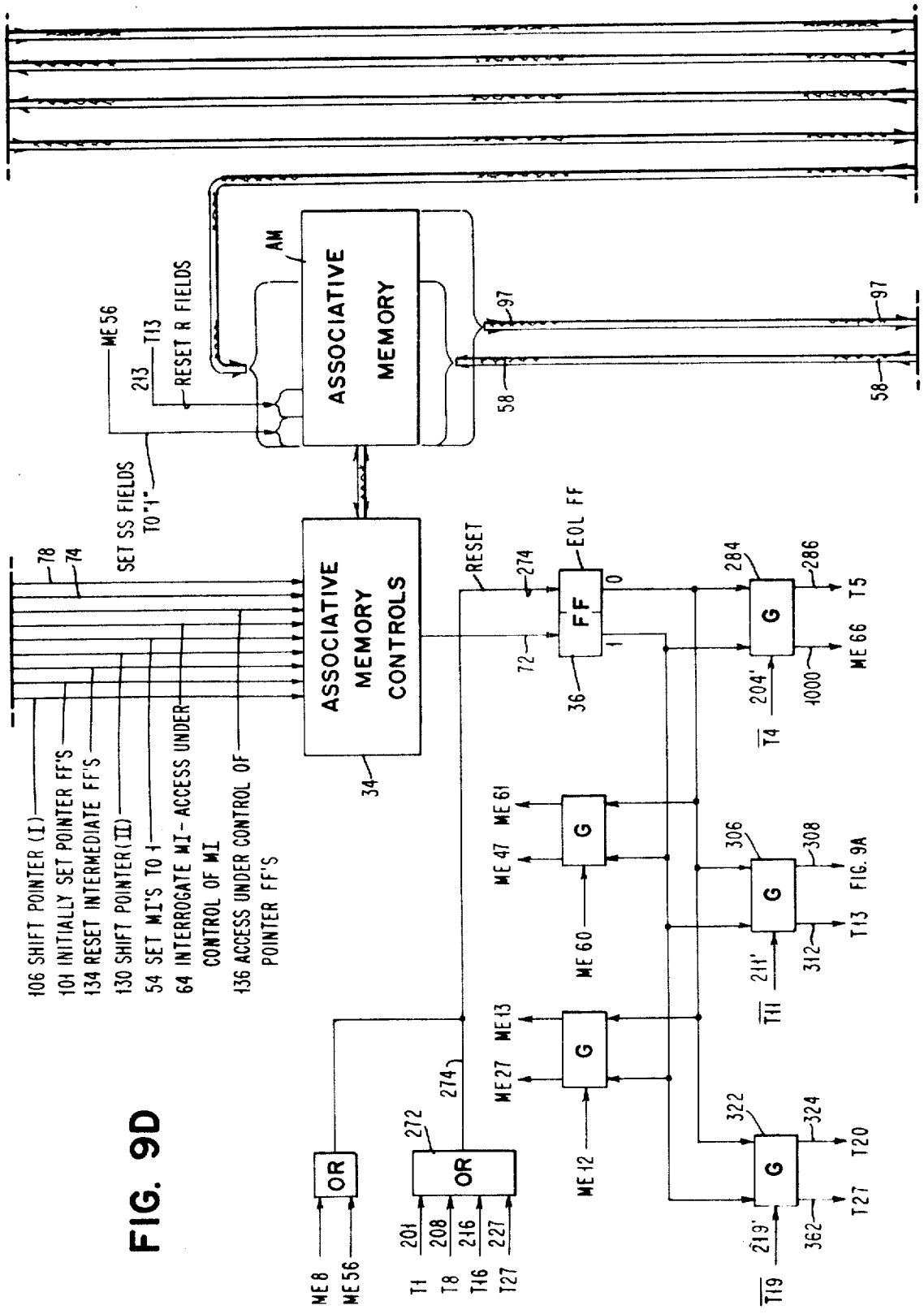

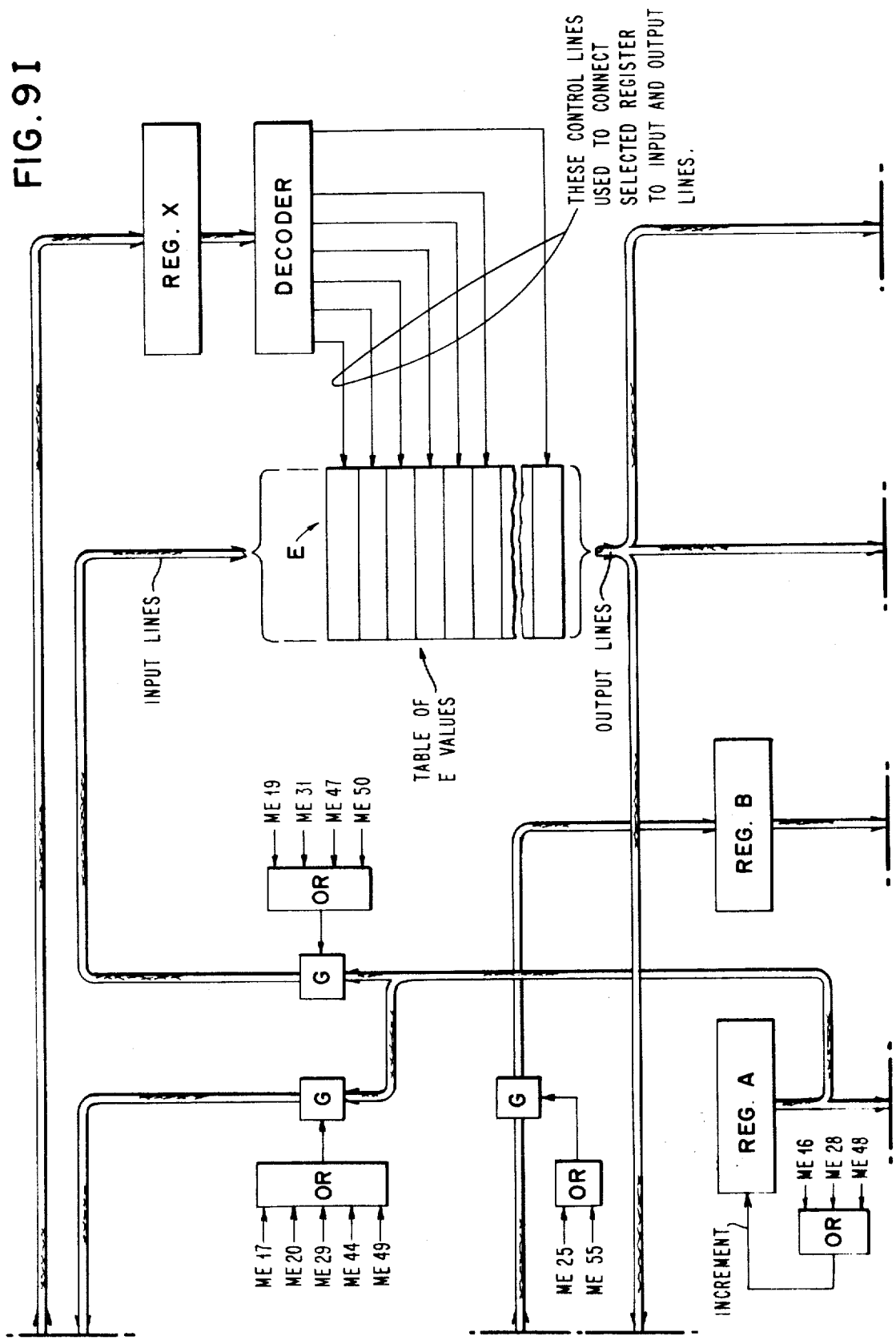

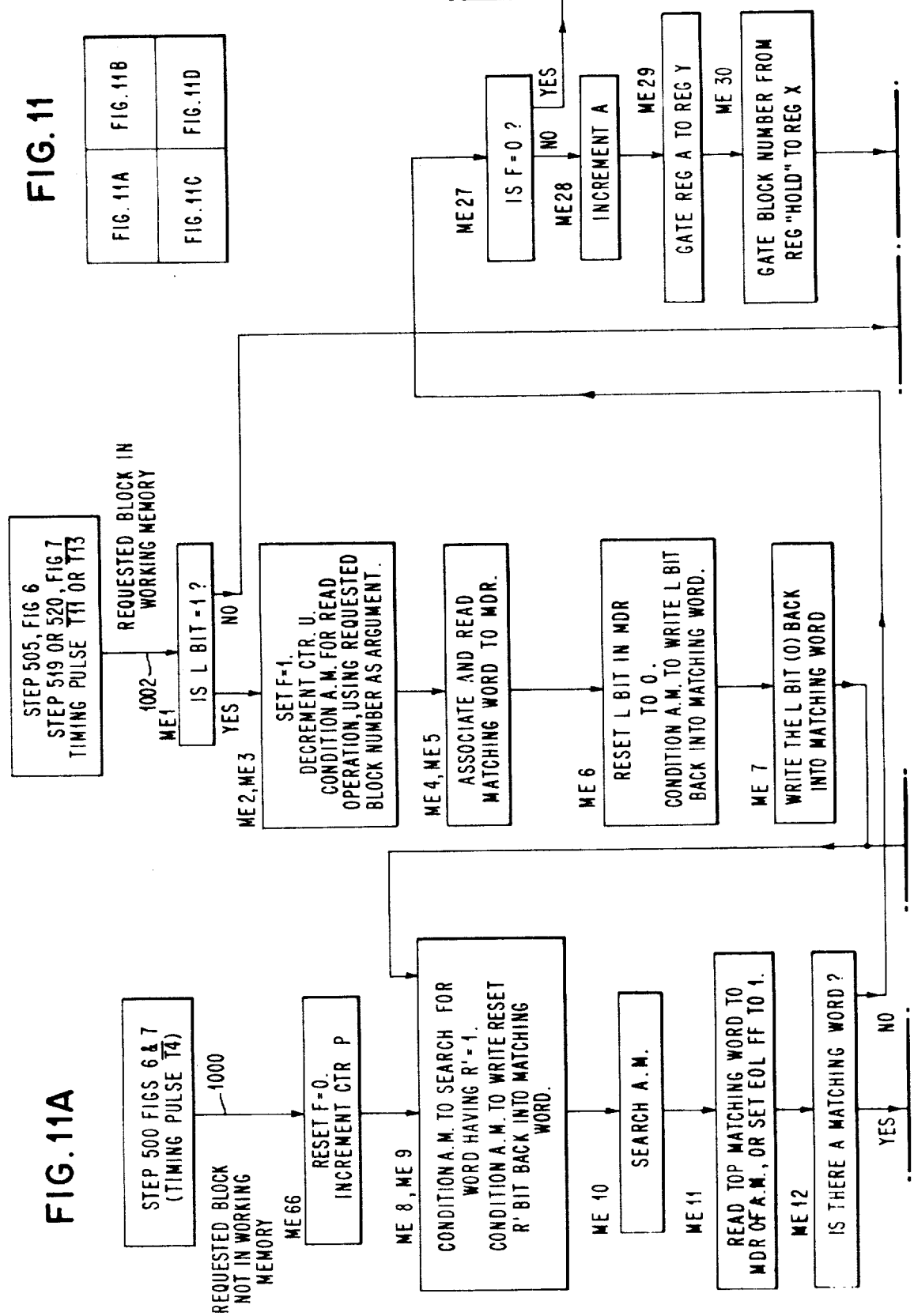

FIG. 12A

OPERATION: { REQUEST BL1 (NOT IN WM)
ENTER BL1 INTO WM
REFERENCE BL1 IN WM }

| INTERVAL NUMBER | |
|---|---|
| ACTUAL SEQUENCE | OPTIMAL SEQUENCE |
| 1 | 1 |

| REGISTERED COUNTS | INITIAL VALUE | FINAL VALUE |
|---|---|---|
| P | 0 | 1 |
| U | 0 | 0 |
| A | 0 | 1 |
| B | 1 | 1 |
| Q | 0 | 0 |

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | ---→ | 0 | 0 | 0 | 0 |
| 0 | 0 | 0 | 1 | → | 0 | BL1 | 0 | 1 |
| 0 | 0 | 0 | 0 | | 0 | 0 | 0 | 0 |

---→ = INITIAL OR INTERMEDIATE POSITION OF POINTER (IF MOVED)

→ = FINAL POSITION OF POINTER

E TABLE

| X POINTER | BLOCK NO. | E VALUE | |
|---|---|---|---|
| | | INIT. | FINAL |
| ↑ | BL1 | 0 | 1 |
| | BL2 | 0 | 0 |
| | BL3 | 0 | 0 |
| | BL4 | 0 | 0 |
| | BL5 | 0 | 0 |
| | BL6 | 0 | 0 |
| | BL7 | 0 | 0 |

C TABLE

| Y POINTER | C VALUE | | |
|---|---|---|---|
| | INIT. | INT'M. | FINAL |
| ↑ 1 | 0 | ✕ | 2 |
| 2 | 0 | ✕ | 0 |
| 3 | 0 | ✕ | 0 |
| 4 | 0 | ✕ | 0 |
| 5 | 0 | ✕ | 0 |
| 6 | 0 | ✕ | 0 |
| 7 | 0 | ✕ | 0 |
| 8 | 0 | ✕ | 0 |

FIG. 12B

OPERATION: { REQUEST BL2 (NOT IN WM) / ENTER BL2 IN WM / REFERENCE BL2 IN WM }

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | | 0 | 0 | 0 | 0 |
| 0 | 0 | 1 | 1 | ←--- | BL1 | BL1 | 1 | 0 |
| 0 | 0 | 0 | 1 | ←—— | 0 | BL2 | 0 | 1 |

---→ INITIAL OR INTERMEDIATE POSITION OF POINTER (IF MOVED)
——→ FINAL POSITION OF POINTER

INTERVAL NUMBER

| ACTUAL SEQUENCE | OPTIMAL SEQUENCE |
|---|---|
| 2 | 2 |

REGISTERED COUNTS

| | INITIAL VALUE | FINAL VALUE |
|---|---|---|
| P | 1 | 2 |
| U | 0 | 0 |
| A | 1 | 2 |
| B | 1 | 1 |
| Q | 0 | 0 |

E TABLE

| X POINTER | BLOCK NO. | E VALUE | |
|---|---|---|---|
| | | INIT. | FINAL |
| ←--- | BL1 | 1 | 1 |
| ←—— | BL2 | 0 | 2 |
| | BL3 | 0 | 0 |
| | BL4 | 0 | 0 |
| | BL5 | 0 | 0 |
| | BL6 | 0 | 0 |
| | BL7 | 0 | 0 |

C TABLE

| Y POINTER | C VALUE | | |
|---|---|---|---|
| | INIT. | INT'M | FINAL |
| 1 ←--- | 2 | | 2 |
| 2 ←—— | 0 | | 2 |
| 3 | 0 | | 0 |
| 4 | 0 | | 0 |
| 5 | 0 | | 0 |
| 6 | 0 | | 0 |
| 7 | 0 | | 0 |
| 8 | 0 | | 0 |

FIG. 12C

OPERATION: { REQUEST BL3 (NOT IN WM) / ENTER BL3 INTO WM / REFERENCE BL3 IN WM }

ASSOCIATIVE MEMORY

| AL BITS | | R BITS | | BLOCK NO. | | WORD POINTER | R' BITS | |
|---|---|---|---|---|---|---|---|---|
| INIT. | FIN. | INIT. | FIN. | INITIAL | FINAL | | INIT. | FIN. |
| 0 | 0 | 0 | 0 | 0 | BL3 | → | 0 | 1 |
| 0 | 0 | 1 | 0 | BL1 | BL1 | | 1 | 0 |
| 0 | 0 | 1 | 0 | BL2 | BL2 | → | 1 | 0 |

- - - → INITIAL OR INTERMEDIATE POSITION OF POINTER (IF MOVED)
——→ FINAL POSITION OF POINTER

E TABLE

| X POINTER | BLOCK NO. | E VALUE | |
|---|---|---|---|
| | | INIT. | FINAL |
| | BL1 | 1 | 1 |
| - - -→ | BL2 | 2 | 2 |
| ——→ | BL3 | 0 | 3 |
| | BL4 | 0 | 0 |
| | BL5 | 0 | 0 |
| | BL6 | 0 | 0 |
| | BL7 | 0 | 0 |

| INTERVAL NUMBER | |
|---|---|
| ACTUAL SEQUENCE | OPTIMAL SEQUENCE |
| 3 | 3 |

| REGISTERED COUNTS | INITIAL VALUE | FINAL VALUE |
|---|---|---|
| P | 2 | 3 |
| U | 0 | 0 |
| A | 2 | 3 |
| B | 1 | 1 |
| Q | 0 | 0 |

C TABLE

| Y POINTER | C VALUE | | |
|---|---|---|---|
| | INIT. | INT'M | FINAL |
| 1 | 2 | | 2 |
| - - -→ 2 | 2 | ✕ | 2 |
| ——→ 3 | 0 | | 2 |
| 4 | 0 | | 0 |
| 5 | 0 | | 0 |
| 6 | 0 | | 0 |
| 7 | 0 | | 0 |
| 8 | 0 | | 0 |

FIG. 12D

OPERATION: { REQUEST BL4 (NOT IN WM)
ENTER BL4 INTO WM, REPLACING BL1
REFERENCE BL4 IN WM }

| INTERVAL NUMBER | |
|---|---|
| ACTUAL SEQUENCE | OPTIMAL SEQUENCE |
| 4 | 4 |

| REGISTERED COUNTS | INITIAL VALUE | FINAL VALUE |
|---|---|---|
| P | 3 | 4 |
| U | 0 | 0 |
| A | 3 | 4 |
| B | 1 | 1 |
| Q | 0 | 0 |

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | - - -> | BL3 | BL3 | 1 | 0 |
| 0 | 0 | 0 | 1 | ⟶ | BL1 | BL4 | 0 | 1 |
| 0 | 0 | 0 | 0 | | BL2 | BL2 | 1 | 0 |

- - -> INITIAL OR INTERMEDIATE POSITION OF POINTER (IF MOVED)
⟶ FINAL POSITION OF POINTER

E TABLE

| X POINTER | BLOCK NO. | E VALUE | |
|---|---|---|---|
| | | INIT. | FINAL |
| | BL1 | 1 | 1 |
| | BL2 | 2 | 2 |
| - - -> | BL3 | 3 | 3 |
| ⟶ | BL4 | 0 | 4 |
| | BL5 | 0 | 0 |
| | BL6 | 0 | 0 |
| | BL7 | 0 | 0 |

C TABLE

| Y POINTER | C VALUE | | |
|---|---|---|---|
| | INIT. | INT'M. | FINAL |
| 1 | 2 | | 2 |
| 2 | 2 | | 2 |
| 3 - - -> | 2 | | 2 |
| 4 ⟶ | 0 | | 2 |
| 5 | 0 | | 0 |
| 6 | 0 | | 0 |
| 7 | 0 | | 0 |
| 8 | 0 | | 0 |

FIG. 12E

OPERATION: { REQUEST BL5 (NOT IN WM)<br>ENTER BL5 INTO WM, REPLACING BL2<br>REFERENCE BL5 IN WM }

ASSOCIATIVE MEMORY

| A1 BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | | BL3 | BL3 | 0 | 0 |
| 0 | 0 | 1 | 0 | ←--- | BL4 | BL4 | 1 | 0 |
| 0 | 0 | 0 | 1 | ← | BL2 | BL5 | 0 | 1 |

←--- INITIAL OR INTERMEDIATE POSITION OF POINTER (IF MOVED)
← FINAL POSITION OF POINTER

E TABLE

| X POINTER | BLOCK NO. | E VALUE | |
|---|---|---|---|
| | | INIT. | FINAL |
| | BL1 | 1 | 1 |
| | BL2 | 2 | 2 |
| | BL3 | 3 | 3 |
| ←--- | BL4 | 4 | 4 |
| ← | BL5 | 0 | 5 |
| | BL6 | 0 | 0 |
| | BL7 | 0 | 0 |

| INTERVAL NUMBER | |
|---|---|
| ACTUAL SEQUENCE | OPTIMAL SEQUENCE |
| 5 | 5 |

| REGISTERED COUNTS | INITIAL VALUE | FINAL VALUE |
|---|---|---|
| P | 4 | 5 |
| U | 0 | 0 |
| A | 4 | 5 |
| B | 1 | 1 |
| Q | 0 | 0 |

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 2 | 2 | 2 |
| 4 ←--- | 2 | 2 | 2 |
| 5 ← | 0 | ╳ | 2 |
| 6 | 0 | | 0 |
| 7 | 0 | | 0 |
| 8 | 0 | | 0 |

FIG. 12F

OPERATION: 
- REQUEST BL2 (NO LONGER IN WM)
- ENTER BL2 INTO WM, REPLACING BL3
- REFERENCE BL2 IN WM

| INTERVAL NUMBER | |
|---|---|
| ACTUAL SEQUENCE | OPTIMAL SEQUENCE |
| 6 | 5 |

| REGISTERED COUNTS | INITIAL VALUE | FINAL VALUE |
|---|---|---|
| P | 5 | 6 |
| U | 0 | 1 |
| A | 5 | 5 |
| B | 1 | 1 |
| Q | 0 | 0 |

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | → | BL3 | BL2 | 1 | 1 |
| 0 | 0 | 1 | 0 | | BL4 | BL4 | 0 | 0 |
| 0 | 0 | 1 | 0 | ↑ | BL5 | BL5 | 1 | 0 |

- - - → INITIAL OR INTERMEDIATE POSITION OF POINTER (IF MOVED)
——→ FINAL POSITION OF POINTER

E TABLE

| X POINTER | BLOCK NO. | E VALUE | |
|---|---|---|---|
| | | INIT. | FINAL |
| | BL1 | 1 | 1 |
| ↑ | BL2 | 2 | 5 |
| | BL3 | 3 | 3 |
| | BL4 | 4 | 4 |
| ↑ | BL5 | 5 | 5 |
| | BL6 | 0 | 0 |
| | BL7 | 0 | 0 |

C TABLE

| Y POINTER | C VALUE | | |
|---|---|---|---|
| | INIT. | INT'M. | FINAL |
| 1 | 2 | | 2 |
| 2 | 2 | ╳ | 2 |
| 3 | 2 | ╳ | 1 |
| 4 | 2 | ╳ | 1 |
| 5 | 2 | | 1 |
| 6 | 0 | | 0 |
| 7 | 0 | | 0 |
| 8 | 0 | | 0 |

FIG. 12G

OPERATION: {REFERENCE BL 4 (ALREADY IN WM)
ALTER CONTENTS OF BL4

ASSOCIATIVE MEMORY

| AL BITS | | R BITS | | WORD POINTER | BLOCK NO. | | R' BITS | |
|---|---|---|---|---|---|---|---|---|
| INIT | FIN | INIT | FIN | | INITIAL | FINAL | INIT | FIN |
| 0 | 0 | 0 | 0 | → | BL2 | BL2 | 1 | 1 |
| 0 | 0 | 0 | 1 | | BL4 | BL4 | 0 | 1 |
| 0 | 0 | 0 | 0 | | BL5 | BL5 | 0 | 0 |

- - → INITIAL OR INTERMEDIATE POSITION OF POINTER (IF MOVED)
— → FINAL POSITION OF POINTER

E TABLE

| X POINTER | BLOCK NO. | E VALUE | |
|---|---|---|---|
| | | INIT. | FINAL |
| | BL1 | 1 | 1 |
| → | BL2 | 5 | 5 |
| | BL3 | 3 | 3 |
| | BL4 | 4 | 4 |
| | BL5 | 5 | 5 |
| | BL6 | 0 | 0 |
| | BL7 | 0 | 0 |

| INTERVAL NUMBER | |
|---|---|
| ACTUAL SEQUENCE | OPTIMAL SEQUENCE |
| 6 | 5 |

| REGISTERED COUNTS | INITIAL VALUE | FINAL VALUE |
|---|---|---|
| P | 6 | 6 |
| U | 1 | 1 |
| A | 5 | 5 |
| B | 1 | 1 |
| Q | 0 | 0 |

C TABLE

| Y POINTER | C VALUE | | |
|---|---|---|---|
| | INIT. | INT'M. | FINAL |
| 1 | 2 | | 2 |
| 2 → | 2 | | 2 |
| 3 | 1 | | 1 |
| 4 | 1 | | 1 |
| 5 | 1 | | 1 |
| 6 | 0 | | 0 |
| 7 | 0 | | 0 |
| 8 | 0 | | 0 |

FIG. 12H

OPERATION: { REQUEST BL1 (NO LONGER IN WM)
ENTER BL1 INTO WM, REPLACING BL5
REFERENCE BL1 IN WM }

| INTERVAL NUMBER | |
|---|---|
| ACTUAL SEQUENCE | OPTIMAL SEQUENCE |
| 7 | 6 |

| REGISTERED COUNTS | INITIAL VALUE | FINAL VALUE |
|---|---|---|
| P | 6 | 7 |
| U | 1 | 1 |
| A | 5 | 6 |
| B | 1 | 5 |
| Q | 0 | 0 |

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | ↑ | BL2 | BL2 | 1 | 0 |
| 1 | 1 | 1 | 1 | | BL4 | BL4 | 1 | 0 |
| 0 | 0 | 0 | 1 | ↑ | BL5 | BL1 | 0 | 1 |

→ INITIAL OR INTERMEDIATE POSITION OF POINTER (IF MOVED)
↑ FINAL POSITION OF POINTER

E TABLE

| X POINTER | BLOCK NO. | E VALUE | |
|---|---|---|---|
| | | INIT. | FINAL |
| ↑ | BL1 | 1 | 6 |
| | BL2 | 5 | 5 |
| ↑ | BL3 | 3 | 3 |
| | BL4 | 4 | 5 |
| | BL5 | 5 | 5 |
| | BL6 | 0 | 0 |
| | BL7 | 0 | 0 |

COMPLETE SET: BL2, BL4, BL5

C TABLE

| Y POINTER | C VALUE | | |
|---|---|---|---|
| | INIT. | INT'M. | FINAL |
| 1 | 2 | | 2 |
| 2 ↓ | 2 | | 2 |
| 3 | 1 | | 1 |
| 4 | 1 | ✕ | 1 |
| 5 ↓ | 1 | | 0 |
| 6 ↑ | 0 | | 2 |
| 7 | 0 | | 0 |
| 8 | 0 | | 0 |

FIG. 12I

OPERATION: { REQUEST BL6 (NOT IN WM)
ENTER BL6 INTO WM, REPLACING BL2
REFERENCE BL6 IN WM }

ASSOCIATIVE MEMORY

| A L BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | → | BL2 | BL6 | 0 | 1 |
| 1 | 1 | 1 | 0 | | BL4 | BL4 | 0 | 0 |
| 0 | 0 | 1 | 0 | → | BL1 | BL1 | 1 | 0 |

→ INITIAL OR INTERMEDIATE POSITION OF POINTER (IF MOVED)
→ FINAL POSITION OF POINTER

E TABLE

| X POINTER | BLOCK NO. | E VALUE | |
|---|---|---|---|
| | | INIT. | FINAL |
| --→ | BL1 | 6 | 6 |
| | BL2 | 5 | 5 |
| | BL3 | 3 | 3 |
| | BL4 | 5 | 5 |
| | BL5 | 5 | 5 |
| →  | BL6 | 0 | 7 |
| | BL7 | 0 | 0 |

| INTERVAL NUMBER | |
|---|---|
| ACTUAL SEQUENCE | OPTIMAL SEQUENCE |
| 8 | 7 |

| REGISTERED COUNTS | INITIAL VALUE | FINAL VALUE |
|---|---|---|
| P | 7 | 8 |
| U | 1 | 1 |
| A | 6 | 7 |
| B | 5 | 5 |
| Q | 0 | 0 |

C TABLE

| Y POINTER | C VALUE | | |
|---|---|---|---|
| | INIT. | INT'M. | FINAL |
| 1 | 2 | | 2 |
| 2 | 1 | | 2 |
| 3 | 1 | | 1 |
| 4 | 1 | | 1 |
| 5 | 0 | | 0 |
| 6 --→ | 2 | × | 2 |
| 7 → | 0 | × | 2 |
| 8 | 0 | | 0 |

FIG. 12J

OPERATION: REFERENCE BL1 (ALREADY IN WM)

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | → | BL6 | BL6 | 1 | 1 |
| 1 | 1 | 0 | 0 | | BL4 | BL4 | 0 | 0 |
| 0 | 0 | 0 | 1 | | BL1 | BL1 | 0 | 1 |

- - → INITIAL OR INTERMEDIATE POSITION OF POINTER (IF MOVED)
——→ FINAL POSITION OF POINTER

| INTERVAL NUMBER | |
|---|---|
| ACTUAL SEQUENCE | OPTIMAL SEQUENCE |
| 8 | 7 |

| REGISTERED COUNTS | INITIAL VALUE | FINAL VALUE |
|---|---|---|
| P | 8 | 8 |
| U | 1 | 1 |
| A | 7 | 7 |
| B | 5 | 5 |
| Q | 0 | 0 |

E TABLE

| X POINTER | BLOCK NO. | E VALUE | |
|---|---|---|---|
| | | INIT. | FINAL |
| | BL1 | 6 | 6 |
| | BL2 | 5 | 5 |
| | BL3 | 3 | 3 |
| | BL4 | 5 | 5 |
| | BL5 | 5 | 5 |
| ↑ | BL6 | 7 | 7 |
| | BL7 | 0 | 0 |

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 1 | 1 | 1 |
| 4 | 1 | 1 | 1 |
| 5 | 0 | 0 | 0 |
| 6 | 2 | 2 | 2 |
| 7 ↑ | 2 | X | 2 |
| 8 | 0 | 0 | 0 |

FIG. 12K

OPERATION: REQUEST BL2 (NO LONGER IN WM)
ENTER BL2 INTO WM, REPLACING BL6
REFERENCE BL2 IN WM

ASSOCIATIVE MEMORY

| AL BITS | | R BITS | | WORD POINTER | BLOCK NO. | | R' BITS | | SS BITS | | | L BITS | |
|---|---|---|---|---|---|---|---|---|---|---|---|---|---|
| INIT. | FIN. | INIT. | FIN. | | INITIAL | FINAL | INIT. | FIN. | INIT. | INTM. | FIN. | INIT. | FIN. |
| 0 | 0 | 0 | 1 | → | BL6 | BL2 | 1 | 1 | 0 | 1 | 0 | 0 | 0 |
| 1 | 1 | 1 | 0 | | BL4 | BL4 | 0 | 0 | 0 | 1 | 0 | 1 | 1 |
| 0 | 0 | 1 | 1 | | BL1 | BL1 | 1 | 1 | 0 | 1 | 0 | 0 | 0 |

--- ▶ INITIAL OR INTERMEDIATE POSITION OF POINTER (IF MOVED)
——▶ FINAL POSITION OF POINTER

| INTERVAL NUMBER | |
|---|---|
| ACTUAL SEQUENCE | OPTIMAL SEQUENCE |
| 9 | 7 |

| REGISTERED COUNTS | INITIAL VALUE | FINAL VALUE |
|---|---|---|
| P | 8 | 9 |
| U | 1 | 2 |
| A | 7 | 7 |
| B | 5 | 7 |
| Q | 0 | 0 |

E TABLE

| X POINTER | BLOCK NO. | E VALUE | |
|---|---|---|---|
| | | INIT. | FINAL |
| --▶ | BL1 | 6 | 7 |
| --▶ | BL2 | 5 | 7 |
| | BL3 | 3 | 3 |
| --▶ | BL4 | 5 | 5 |
| | BL5 | 5 | 5 |
| | BL6 | 7 | 7 |
| | BL7 | 0 | 0 |

COMPLETE SET: BL1, BL2, BL6

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 1 | 1 | 1 |
| 4 | 1 | 1 | 1 |
| 5 | 0 | 0 | 0 |
| 6 --▶ | 2 | 2 | 2 |
| 7 ——▶ | 2 | 1 | 0 |
| 8 | 0 | 0 | 0 |

FIG. 12L

OPERATION: REFERENCE BL4 (ALREADY IN WM)

ASSOCIATIVE MEMORY

| AL BITS | | R BITS | | WORD POINTER | BLOCK NO. | | R' BITS | | L BITS | |
|---|---|---|---|---|---|---|---|---|---|---|
| INIT. | FIN. | INIT. | FIN. | | INITIAL | FINAL | INIT. | FIN. | INIT. | FIN. |
| 0 | 0 | 1 | 0 | → | BL2 | BL2 | 1 | 1 | 0 | 0 |
| 1 | 0 | 0 | 0 | | BL4 | BL4 | 0 | 1 | 1 | 0 |
| 0 | 0 | 1 | 0 | | BL1 | BL1 | 0 | 0 | 0 | 0 |

---→ INITIAL OR INTERMEDIATE POSITION OF POINTER (IF MOVED)
——→ FINAL POSITION OF POINTER

| INTERVAL NUMBER | |
|---|---|
| ACTUAL SEQUENCE | OPTIMAL SEQUENCE |
| 9 | 8 |

| REGISTERED COUNTS | INITIAL VALUE | FINAL VALUE |
|---|---|---|
| P | 9 | 9 |
| U | 2 | 1 |
| A | 7 | 8 |
| B | 7 | 7 |
| Q | 0 | 0 |

↑ DECREMENT
↓ INCREMENT

E TABLE

| X POINTER | BLOCK NO. | E VALUE | |
|---|---|---|---|
| | | INIT. | FINAL |
| ---→ | BL1 | 7 | 7 |
| | BL2 | 7 | 7 |
| | BL3 | 3 | 3 |
| ——→ | BL4 | 5 | 8 |
| | BL5 | 5 | 5 |
| | BL6 | 7 | 7 |
| | BL7 | 0 | 0 |

C TABLE

| Y POINTER | C VALUE | | |
|---|---|---|---|
| | INIT. | INT'M. | FINAL |
| 1 | 2 | | 2 |
| 2 | 2 | | 2 |
| 3 | 1 | | 1 |
| 4 | 1 | | 1 |
| 5 | 0 | | 0 |
| 6 | 2 | | 2 |
| 7 ---→ | 0 | | 0 |
| 8 ——→ | 0 | | 2 |

FIG. 13

BLOCK REFERENCING SEQUENCE: BL1, BL2, BL3, BL4, BL5, BL2, BL4, BL1, BL6, BL2, BL4, BL1, BL7
CAPACITY OF WORKING MEMORY WM ASSUMED TO BE 3 BLOCKS.

| P | ACTUAL SEQUENCE OF OPERATIONS | OPTIMAL SEQUENCE OF OPERATIONS | A | U | Q |
|---|---|---|---|---|---|
| 1 to 6 | SAME AS IN FIG. 4A | SAME AS IN FIG. 4A | 0 to 5 | 0 to 1 | 0 |
| 7 | REQUEST BL1 (NOT IN WM) ENTER BL1 INTO 3RD ADDRESS OF WM, REPLACING BL5. REFERENCE BL1 IN 3RD ADDRESS OF WM. ALTER BL1 = 1 | REQUEST BL1 (NOT IN WM) ENTER BL1 INTO 1ST ADDRESS OF WM, REPLACING BL5. REFERENCE BL1 IN 1ST ADDRESS OF WM | 6 | 1 | 0 |
| 8 | REQUEST BL6 (NOT IN WM) ENTER BL6 INTO 1ST ADDRESS OF WM, REPLACING BL2. REFERENCE BL6 IN 1ST ADDRESS OF WM (BL4 STILL IN 2ND ADDRESS OF WM) (BL1 STILL IN 3RD ADDRESS OF WM) | REQUEST BL6 (NOT IN WM) ENTER BL6 INTO 1ST ADDRESS OF WM, REPLACING BL1. REFERENCE BL6 IN 1ST ADDRESS OF WM REFERENCE BL2 IN 3RD ADDRESS OF WM REFERENCE BL4 IN 2ND ADDRESS OF WM COMPLETE SET FORMED B = 7 | 7 | 1 | 0 |
| 9 | REQUEST BL2 (NOT IN WM) ENTER BL2 INTO 1ST ADDRESS OF WM, REPLACING BL6. REFERENCE BL2 IN 1ST ADDRESS OF WM REFERENCE BL4 IN 2ND ADDRESS OF WM REFERENCE BL1 IN 3RD ADDRESS OF WM UNNECESSARY TRANSFER SPECIFIED BY OPTIMAL REPLACEMENT ALGORITHM. INCREMENT Q TO "1" | UNNECESSARY TRANSFER PERFORMED BY ACTUAL REPLACEMENT ALGORITHM. INCREMENT U TO "2" | 8 | 2 | 1 |
| 10 | REQUEST BL7 (NOT IN WM) ENTER BL7 INTO 1ST ADDRESS OF WM, REPLACING BL2. REFERENCE BL7 IN 1ST ADDRESS OF WM | REQUEST BL1 (NOT IN WM) ENTER BL1 INTO WM (ADDRESS UNDETERMINED) REFERENCE BL1 IN WM REQUEST BL7 (NOT IN WM) ENTER BL7 INTO WM (ADDRESS UNDETERMINED) REFERENCE BL7 IN WM | 9 | 2 | 1 |

FIG. 14A

OPERATION: 
- REQUEST BL1 (NO LONGER IN WM)
- ENTER BL1 INTO WM, REPLACING BL5
- REFERENCE BL1 IN WM
- ALTER CONTENTS OF BL1

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 0 | --→ | BL2 | BL2 | 1 | 0 |
| 1 | 1 | 1 | 1 | | BL4 | BL4 | 1 | 0 |
| 0 | 1 | 0 | 1 | ↑ | BL5 | BL1 | 0 | 1 |

--→ = INITIAL OR INTERMEDIATE POSITION OF POINTER (IF MOVED)

↑ = FINAL POSITION OF POINTER

INTERVAL NUMBER

| ACTUAL SEQUENCE | OPTIMAL SEQUENCE |
|---|---|
| 7 | 6 |

REGISTERED COUNTS

| | INITIAL VALUE | FINAL VALUE |
|---|---|---|
| P | 6 | 7 |
| U | 1 | 1 |
| A | 5 | 6 |
| B | 1 | 5 |
| Q | 0 | 0 |

C TABLE

| Y POINTER | C VALUE | | |
|---|---|---|---|
| | INIT. | INT'M. | FINAL |
| 1 | 2 | | 2 |
| 2 --→ | 2 | | 2 |
| 3 | 1 | | 1 |
| 4 | 1 | | 1 |
| 5 ↑ | 1 | | 0 |
| 6 | 0 | | 2 |
| 7 | 0 | | 0 |
| 8 | 0 | | 0 |

E TABLE

| X POINTER | BLOCK NO. | E VALUE | |
|---|---|---|---|
| | | INIT. | FINAL |
| ↑ | BL1 | 1 | 6 |
| --→ | BL2 | 5 | 5 |
| | BL3 | 3 | 3 |
| | BL4 | 4 | 5 |
| | BL5 | 5 | 5 |
| | BL6 | 0 | 0 |
| | BL7 | 0 | 0 |

COMPLETE SET: BL2, BL4, BL5

FIG. 14B

OPERATION: { REQUEST BL6 (NOT IN WM)
ENTER BL6 INTO WM, REPLACING BL2
REFERENCE BL6 IN WM }

ASSOCIATIVE MEMORY

| AL BITS | | R BITS | | BLOCK NO. | | R' BITS | |
|---|---|---|---|---|---|---|---|
| INIT. | FIN. | INIT. | FIN. | INITIAL | FINAL | INIT. | FIN. |
| 0 | 0 | 0 | 0 | BL2 | BL6 | 0 | 1 |
| 1 | 1 | 1 | 0 | BL4 | BL4 | 0 | 0 |
| 1 | 1 | 1 | 0 | BL1 | BL1 | 1 | 0 |

- - - → INITIAL OR INTERMEDIATE POSITION OF POINTER (IF MOVED)
──→ FINAL POSITION OF POINTER

E TABLE

| X POINTER | BLOCK NO. | E VALUE | |
|---|---|---|---|
| | | INIT. | FINAL |
| - - → | BL1 | 6 | 6 |
| | BL2 | 5 | 5 |
| | BL3 | 3 | 3 |
| | BL4 | 5 | 5 |
| | BL5 | 5 | 5 |
| ──→ | BL6 | 0 | 7 |
| | BL7 | 0 | 0 |

| INTERVAL NUMBER | |
|---|---|
| ACTUAL SEQUENCE | OPTIMAL SEQUENCE |
| 8 | 7 |

| REGISTERED COUNTS | INITIAL VALUE | FINAL VALUE |
|---|---|---|
| P | 7 | 8 |
| U | 1 | 1 |
| A | 6 | 7 |
| B | 5 | 5 |
| Q | 0 | 0 |

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 1 | 1 | 1 |
| 4 | 1 | 1 | 1 |
| 5 | 0 | 0 | 0 |
| 6 | 2 | ╳ | 2 |
| 7 | 0 | ╳ | 2 |
| 8 | 0 | | 0 |

FIG. 14C

OPERATION: { REQUEST BL2 (NOT IN WM)
ENTER BL2 INTO WM, REPLACING BL6
REFERENCE BL2 IN WM }

| INTERVAL NUMBER | |
|---|---|
| ACTUAL SEQUENCE | OPTIMAL SEQUENCE |
| 9 | 7 |

| REGISTERED COUNTS | INITIAL VALUE | FINAL VALUE |
|---|---|---|
| P | 8 | 9 |
| U | 1 | 2 |
| A | 7 | 7 |
| B | 5 | 5 |
| Q | 0 | 0 |

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 1 | → | BL6 | BL2 | 1 | 1 |
| 1 | 1 | 0 | 0 | | BL4 | BL4 | 0 | 0 |
| 1 | 1 | 0 | 0 | | BL1 | BL1 | 0 | 0 |

——→ INITIAL OR INTERMEDIATE POSITION OF POINTER (IF MOVED)
———→ FINAL POSITION OF POINTER

E TABLE

| X POINTER | BLOCK NO. | E VALUE | |
|---|---|---|---|
| | | INIT. | FINAL |
| | BL1 | 6 | 6 |
| ↑ | BL2 | 5 | 7 |
| | BL3 | 3 | 3 |
| | BL4 | 5 | 5 |
| | BL5 | 5 | 5 |
| ↑ | BL6 | 7 | 7 |
| | BL7 | 0 | 0 |

C TABLE

| Y POINTER | C VALUE | | |
|---|---|---|---|
| | INIT. | INT'M. | FINAL |
| 1 | 2 | | 2 |
| 2 | 2 | | 2 |
| 3 | 1 | | 1 |
| 4 | 1 | | 1 |
| 5 | 0 | ✕ | 0 |
| 6 ↑ | 2 | | 1 |
| 7 ↑ | 2 | | 1 |
| 8 | 0 | | 0 |

FIG. 14D

OPERATION: REFERENCE BL4 (ALREADY IN WM)

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 1 | 1 | → | BL2 | BL2 | 1 | 1 |
| 1 | 1 | 0 | 1 | | BL4 | BL4 | 0 | 1 |
| 1 | 1 | 1 | 0 | | BL1 | BL1 | 1 | 0 |

--→ INITIAL OR INTERMEDIATE POSITION OF POINTER (IF MOVED)
→ FINAL POSITION OF POINTER

E TABLE

| X POINTER | BLOCK NO. | E VALUE | |
|---|---|---|---|
| | | INIT. | FINAL |
| | BL1 | 6 | 6 |
| → | BL2 | 7 | 7 |
| | BL3 | 3 | 3 |
| | BL4 | 5 | 5 |
| | BL5 | 5 | 5 |
| | BL6 | 7 | 7 |
| | BL7 | 0 | 0 |

| INTERVAL NUMBER | |
|---|---|
| ACTUAL SEQUENCE | OPTIMAL SEQUENCE |
| 9 | 7 |

| REGISTERED COUNTS | INITIAL VALUE | FINAL VALUE |
|---|---|---|
| P | 9 | 9 |
| U | 2 | 2 |
| A | 7 | 7 |
| 5 ↑ | 5 | 5 |
| 0 | 0 | 0 |

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 1 | 1 | 1 |
| 4 | 1 | 1 | 1 |
| 5 ↑ | 0 | ✕ | 0 |
| 6 | 1 | 1 | 1 |
| 7 | 1 | 1 | 1 |
| 8 | 0 | 0 | 0 |

FIG. 14E

OPERATION: REFERENCE BL1 (ALREADY IN WM)

ASSOCIATIVE MEMORY

| A1 BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 1 | → | BL2 | BL2 | 1 | 1 |
| 1 | 1 | 1 | 1 | | BL4 | BL4 | 1 | 1 |
| 1 | 1 | 1 | 0 | | BL1 | BL1 | 0 | 1 |

- - → INITIAL OR INTERMEDIATE POSITION OF POINTER (IF MOVED)
— → FINAL POSITION OF POINTER

E TABLE

| X POINTER | BLOCK NO. | E VALUE | |
|---|---|---|---|
| | | INIT. | FINAL |
| | BL1 | 6 | 6 |
| → | BL2 | 7 | 7 |
| | BL3 | 3 | 3 |
| | BL4 | 5 | 5 |
| | BL5 | 5 | 5 |
| | BL6 | 7 | 7 |
| | BL7 | 0 | 0 |

| INTERVAL NUMBER | |
|---|---|
| ACTUAL SEQUENCE | OPTIMAL SEQUENCE |
| 9 | 8* |

| REGISTERED COUNTS | INITIAL VALUE | FINAL VALUE |
|---|---|---|
| P | 9 | 9 |
| U | 2 | 2 |
| A | 7 | 7* |
| B | 5 | 5 |
| Q | 0 | 0 |

* UPDATING OF "A" DEFERRED

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 1 | 1 | 1 |
| 4 | 1 | 1 | 1 |
| 5 ↑ | 0 | ✕ | 0 |
| 6 | 1 | 1 | 1 |
| 7 | 1 | 1 | 1 |
| 8 | 0 | 0 | 0 |

FIG. 14F

| INTERVAL NUMBER | |
|---|---|
| ACTUAL SEQUENCE | OPTIMAL SEQUENCE |
| 10 | 9 |

| REGISTERED COUNTS | INITIAL VALUE | FINAL VALUE |
|---|---|---|
| P | 9 | 10 |
| U | 2 | 2 |
| A | 7 | 9 |
| B | 5 | 7 |
| Q | 0 | 1 |

C TABLE

| Y POINTER | C VALUE | | |
|---|---|---|---|
| | INIT. | INT'M. | FINAL |
| 1 | 2 | 2 | 2 |
| 2 | 2 | 2 | 2 |
| 3 | 1 | 1 | 1 |
| 4 | 1 | 1 | 1 |
| 5 | 0 | 0 | 0 |
| 6 | 1 | 1 | 1 |
| 7 | 1 | 0 | 0 |
| 8 | 0 | 2 | 2 |
| 9 | 0 | 2 | 2 |

OPERATION: { REQUEST BL7 (NOT IN WM)
ENTER BL7 INTO WM, REPLACING BL2
REFERENCE BL7 IN WM }

ASSOCIATIVE MEMORY

| AL BITS | | R BITS | | WORD POINTER | BLOCK NO. | | R' BITS | |
|---|---|---|---|---|---|---|---|---|
| INIT. | FIN. | INIT. | FIN. | | INITIAL | FINAL | INIT. | FIN. |
| 0 | 0 | 0 | 1 | → | BL2 | BL7 | 1 | 1 |
| 1 | 1 | 0 | 0 | | BL4 | BL4 | 1 | 0 |
| 1 | 1 | 0 | 0 | | BL1 | BL1 | 1 | 0 |

---→ INITIAL OR INTERMEDIATE POSITION OF POINTER (IF MOVED)
——→ FINAL POSITION OF POINTER

E TABLE

COMPLETE SET: BL2, BL4, BL6

| X POINTER | BLOCK NO. | E VALUE | |
|---|---|---|---|
| | | INIT. | FINAL |
| ---→ | BL1 | 6 | 8 |
| ---→ | BL2 | 7 | 7 |
| | BL3 | 3 | 3 |
| ---→ | BL4 | 5 | 7 |
| | BL5 | 5 | 5 |
| ---→ | BL6 | 7 | 7 |
| →  | BL7 | 0 | 9 |

3,577,185

ON-LINE SYSTEM FOR MEASURING THE EFFICIENCY OF REPLACEMENT ALGORITHMS

BACKGROUND OF THE INVENTION

An increasing number of computer designs are based upon the concept of using a high-speed, low-capacity data store (such as a core memory) in conjunction with a low-speed, high-capacity backup store (such as tape, disc or drum storage units) and operating the system in such a way that a relatively small number of blocks or pages of information which are currently being used by the processor reside in the high-speed store (sometimes referred to as the "working memory") where they are more readily accessible, while most of the blocks or pages of information which are not currently being used by the processor remain in the backup store. Initially all of the information blocks or pages are in the backup store, and as a block is demanded by the processor, it is transferred to the high-speed store on the assumption (usually valid) that there probably will be more demands for the information contained in this block as the program proceeds. However, the block continues to be identified by its original address (block number) in the backup store, even though its real address in working memory is different. Data processing systems of this kind are known under various names, such as "virtual memory" systems, "dynamic storage allocation" systems, "paging machines," or "one-level-store" machines. Such systems have the advantage that most of their information storage capacity can be in the form of addressable, low-speed memories, which are much less expensive than high-speed stores, whereby a considerable economy can be realized.

When the high-speed store in a system of this kind becomes filled, and a demand is made for a block of information not already in the high-speed store, the system must decide which of the blocks presently in high-speed storage is to be replaced by the newly demanded block. The procedure for making this decision is called a "replacement algorithm." Ideally a replacement algorithm should function so that the number of block transfers between the backup store and the high-speed store is at the irreducible minimum for the particular program being executed. That is to say, a replacement algorithm preferably should function so that it does not maintain little-used blocks of data in high-speed storage for an unduly high percentage of the time while causing frequently used blocks of data to be transferred back and forth between the high-speed and backup stores an undue number of times. All of these unnecessary transfers represent a waste of computer time, thereby detracting from the inherent economical advantage of a virtual memory system.

In practice, it is not possible to achieve ideal operation, and since the replacement algorithm must make its decisions "in real time" without knowing what will take place during the remainder of the program, there will be occasional replacement decisions that later result in unnecessary transfers, each of which partially defeats the purpose of the virtual memory system. Many replacement algorithms are available at the present time, and not all of them are equally well suited to any particular program or class of programs. The choice of replacement algorithm therefore has a direct bearing upon how efficiently the data processing system is used.

It is not a simple matter, using conventional methods, to judge whether a given replacement algorithm is giving optimum performance. Usually this involves a time-consuming off-line interpretive procedure that the computer user may regard as burdensome and which he probably would forego in most instances. Without a ready means for measuring replacement efficiency, there has been no practical way for computer users to make meaningful comparisons between replacement algorithms; consequently they are apt to continue using algorithms that in many cases are not best suited to the conditions of their particular problems. What is needed at present is a feasible way of dynamically measuring the efficiency of a replacement algorithm while it is being executed, without causing any significant degradation of computer performance.

SUMMARY OF THE INVENTION

The present invention makes it possible to measure the efficiency of a replacement algorithm while it is being used and without thereby causing any substantial loss of computer time. To carry out this objective, there is provided an online measuring technique whereby a replacement decision made at any given time is automatically compared at some convenient future time with the decision as it would have been made by an assumed optimal replacement algorithm, taking into account the events that have occurred between the two points in time. In making such comparisons, the central processor is used during "interrupt" intervals while the program is waiting for some page exchange to take place between the high-speed and backup stores, so that the processor is not being used repeatedly to make replacement efficiency measurements at times when it is merely accessing information in the high-speed store and is not calling for new page replacements. Hence, the execution of the program is not materially delayed by the progressive computation of the replacement efficiency, which usually occurs during those intervals when the high-speed store is not being accessed by the processor.

The invention thus enables the actual replacement algorithm to be intermittently checked retroactively against a simulated optimal replacement algorithm which lags slightly behind it in time. The present system yields a reliable measure of the replacement efficiency without requiring off-line interpretation of the program behavior.

To state the foregoing more specifically, the invention utilizes data indicating the sequence in which references actually have been made to blocks of stored information by the computer for constructing, in progressive stages, an optimal replacement algorithm which tends to minimize the number of times that blocks of information need be transferred into a high-speed store of given capacity in order to satisfy the actual block referencing sequence. The computer continuously and automatically assembles certain tabular data (herein designated E and C tables) and other cumulative values (herein designated A and B values) which at any given instant reflect the workings of the optimal replacement algorithm up to the present point in time, and from such data the system then determines the minimum number of block or page replacements that should have been needed up to that point in time. This "minimum" number of replacements is the number that would have been effected by the optimal replacement algorithm if it could have assumed control of the system. To provide a practical online measuring system, the optimal algorithm makes an arbitrary assumption about the ordering of the pages or blocks that have been referenced between replacements, and because of this, it occasionally may specify a block transfer that the real replacement algorithm does not find necessary. Automatic provisions are made herein to adjust the "unnecessary transfer" count accordingly if and when this occurs. On the whole, however, the optimal algorithm defines a more efficient operation than any working algorithm could achieve, and the "minimum" number of replacements determined by the optimal algorithm, therefore, can be compared with the number of replacements actually made to give a measure of the replacement efficiency.

By introducing certain new features into the scheme for referencing the blocks in high-speed storage, (utilizing a kind of stored reference indicia herein designated the R' bits), the system embodying this invention is able to make the efficiency measurement in a dynamic or online fashion while operating under an actual program. Each time the operation of the central processor is interrupted in response to a demand for a page or block of information that is not in high-speed storage, there is an opportunity to use the processor for making an updated determination of the number of replacements that would have been made up to that time by the optimal replacement algorithm, taking into account any references made to pages in the high-speed store during the intervening period. Thus, the updating process is performed at times when the processor is awaiting block replacements, so that it does not substantially interfere with the execution of the program. When the end of the program is reached, a final updating immediately gives the information an overall replacement efficiency. This technique enables the respective efficiencies of a large number of replacement algorithms to be comparatively tested in much less time than would be required to measure the replacement efficiency of an algorithm just once by the use of conventional methods.

The above-mentioned "optimal" replacement algorithm is based upon, but for practical reasons is not identical with, a MIN algorithm disclosed in an article by L. A. Belady entitled "A Study of Replacement Algorithms for a Virtual-Storage Computer," published in the IBM Systems Journal, Vol. 5, No. 2, 1966, pages 78—101. The present efficiency measurement system operates each time the processor is interrupted for a new block replacement to determine automatically whether such a replacement would have been necessary if the optimal algorithm just mentioned had been followed up to that point in the program. Of course, this determination as to what the optimal algorithm would have done must necessarily be made in a belated fashion, since it must await identification of the block that currently is being demanded and which is about to be entered into the working memory, by which time the actual replacement decision already has been made. The optimal algorithm moreover must make some arbitrary assumption about the order of referencing between replacements, as mentioned above, whereas the MIN algorithm would rely upon complete referencing information.

Occasionally, as already mentioned, depending upon the nature of the replacement algorithm which is being used and the specific sequence in which the blocks are demanded, it may happen that the optimal replacement algorithm would have found it necessary to transfer into working memory a block that already was there by virtue of the actual replacement algorithm. Under these conditions, whenever they may occur, the present measurement system is able to give the actual replacement algorithm credit for having avoided making a block transfer that the optimal replacement algorithm would have deemed necessary. As mentioned above, the optimal replacement algorithm does not necessarily make a decision as good as, or better than, the decision made by the actual replacement algorithm in each and every instance. Sometimes the optimal algorithm may have to make a choice that at the moment appears to be the superior one but which subsequently may turn out to have no advantage over the choice made by the actual replacement algorithm, or actually be inferior to such choice, according to the order in which the blocks have been demanded by the program. In a situation of this kind the present system may automatically adjust its measurement to reflect more accurately the true state of affairs. In most if not all cases, however, the replacement decision formulated by the optimal algorithm would, in the long run, have turned out to be better than, or at least as good as, the one made by the actual replacement algorithm, and under these circumstances it is not necessary to make any such adjustment.

There may be other situations in which, due to the arbitrary assumption about the order of referencing between replacements, it may be doubtful whether the optimal replacement algorithm would in all instances have functioned more effectively than the actual replacement algorithm to prevent unnecessary block transfers. Where such a situation exists, the present system is able to manifest this doubt by specifying a possible margin of variation for the "unnecessary transfer" count.

DESCRIPTION OF THE DRAWINGS

FIGS. 2, 3, 4A, 4B and 5 are tables depicting exemplary measurement procedures conducted in accordance with the teachings of the invention.

FIGS. 6 and 7 are general block diagrams or flowcharts which indicate the functional relationships between the actual replacement algorithm that is being used and the efficiency measuring procedure that is being applied to it.

FIGS. 9A to 9K, when assembled in the manner indicated by FIG. 9, constitute an overall circuit diagram of a system embodying the invention.

FIGS. 11A to 11D, when assembled in the manner indicated by FIG. 11, constitute a flowchart of this system.

FIGS. 12A to 12L, when considered in the order indicated, progressively illustrate the sequence of operations depicted in FIGS. 4A and 4B.

FIG. 13 is a table depicting still another type of operation that may be performed by the system.

FIGS. 14A to 14F, when considered in the order indicated, progressively illustrate the sequence of operations depicted in FIG. 13.

GENERAL DESCRIPTION OF INVENTIVE PRINCIPLE

In this portion of the description, the organization of a virtual-memory data processing system will be generally explained. Then, by a series of elementary examples, the functions of the "optimal" replacement algorithm will be compared with those of an actual replacement algorithm, which for the present purpose is assumed to be the replacement algorithm disclosed in the copending patent application of Robert A. Nelson, Ser. No. 859,784, filed Sept. 22, 1969. The present measurement system is, of course, adapted to work with many types of replacement algorithms which are in existence at the present time.

Figure 1:
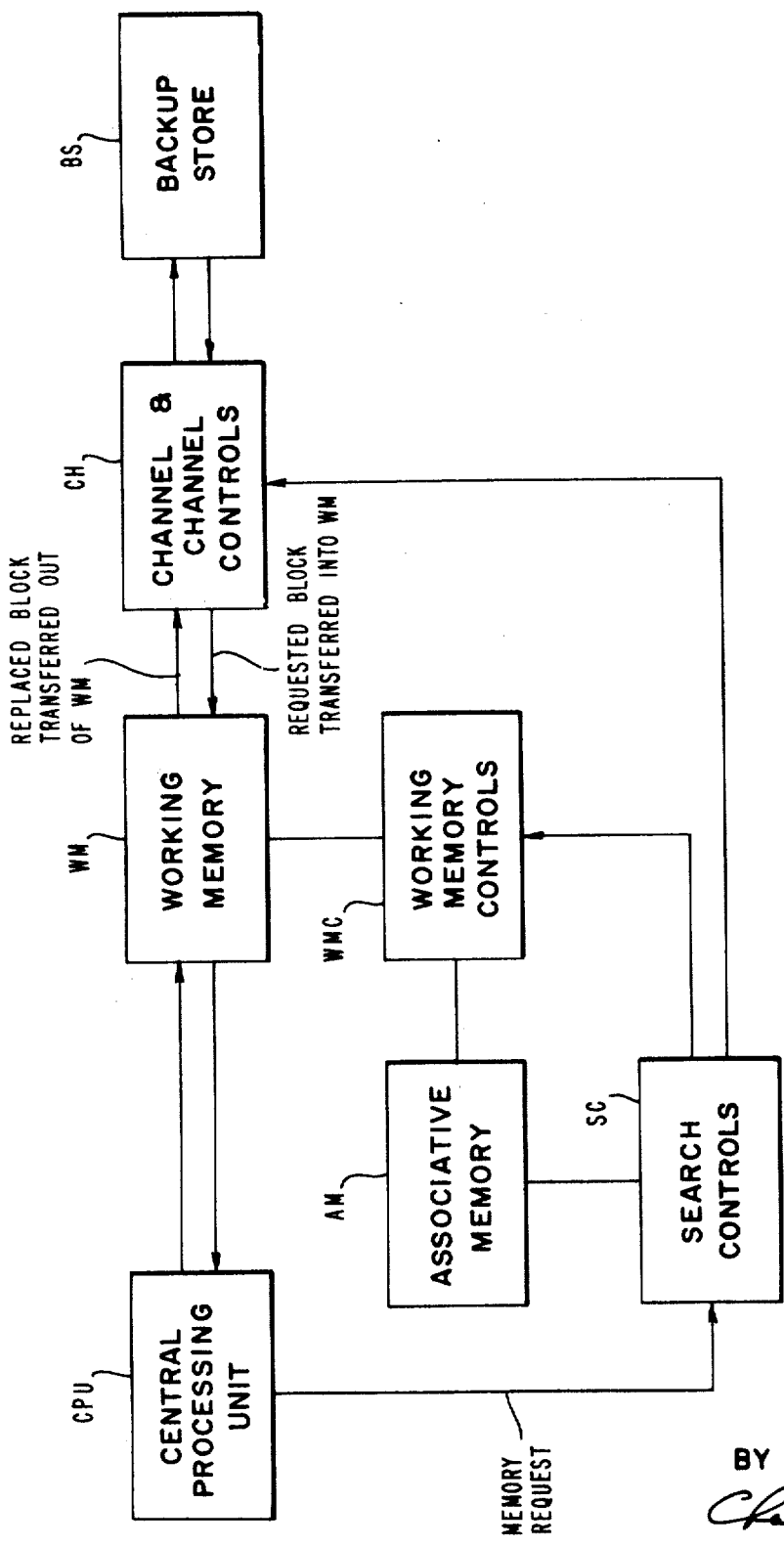
FIG. 1 is a general schematic diagram of a typical virtual-memory data processing system in which the invention is intended for use.

FIG. 1 is a block diagram depicting a so-called "virtual memory" data processing system wherein the central processing unit CPU communicates directly with (and only with) a high-speed, low-capacity working memory WM. This memory WM, for example, may constitute a random-access core memory of limited size. A virtual-memory data processing system is distinguished by the fact that the CPU does not communicate directly with the channel CH through which information is obtained from or passed to the high-capacity, low-speed backup store BS. In other words, the only storage apparatus which the CPU "sees" is the working memory WM. Each time the CPU requests a block or page of information, this memory request is sent to the search controls SC. As a first step, the search controls SC cause an associative memory AM (or equivalent storage mapping scheme) to be searched in order to determine whether the requested block of information already has a counterpart in the working memory WM. If no such counterpart is found, the search controls SC then route the memory request to the channel controls CH, which extract the requested block from backup store BS and place it in working memory WM, where it now becomes accessible to the CPU. After being entered into the memory WM, the requested block of information has two addresses, one being its virtual address or block number in the backup store BS, and the other being its real working address in the working memory WM. Both addresses are appropriately stored in one of the rows or "words" of the memory AM, along with certain other useful data which will be described presently. By means of the working memory controls WMC, in conjunction with the associative memory AM and search controls SC, a logical connection is established between the virtual address or block number and the working address of the block while it is in the working memory. As long as the aforesaid block remains in working memory WM, a request from the CPU for information contained in that block (identified by its block number) will be referred directly to the working memory WM, and the backup store BS and channel CH will not become involved in the resulting information transfer. Similarly, when information processed by the CPU is to be written into a block having an address in the working memory WM, such information will be transferred from the CPU directly to the working memory WM without involving the channel CH and backup store BS.

Since the high-speed working memory WM is of much more expensive construction (per unit of stored information) than the low-Speed backup store BS, most of the information storing capacity of the system is in the large backup store, and the working memory WM has only a limited storage capacity. When the memory WM is full, and the CPU requests a block of information that currently exists only in the backup store BS, it then becomes necessary to replace one of the blocks in memory WM with the newly requested block. Replacement may consist simply of deleting or overwriting the designated block in working memory, or in the event that the contents of the block were altered while the block was in the working memory, replacement may involve transferring the altered block to the backup store BS, where it overwrites the original block contents. The choice of which block is to be replaced in the working memory is the function of the particular replacement algorithm that the user happens to be employing at the time. This replacement algorithm operates through the medium of the various controls SC, WMC and CH to effect such block replacements as may be needed. Whether the algorithm performs this task efficiently or inefficiently is a matter that heretofore has been quite difficult or impractical to determine. With the present invention, however, this determination is greatly facilitated and made practicable.

Whenever reference is made herein to the "actual replacement algorithm," or simply the "replacement algorithm," this denotes the replacement algorithm that actually is being used in the system, as distinguished from the "optimal replacement algorithm," which is assumed to be the replacement algorithm that would have the best overall efficiency for the particular program that is being run on the machine. The optimal algorithm endeavors to find the minimum number of block replacements which need be performed. By definition it is 100 percent efficient. If one takes the total number of block transfers into working memory effected by the actual replacement algorithm and subtracts from this figure the total number of block transfers to working memory that would have been effected by the optimal algorithm during the execution of an identical program, the difference (as a rule) will be the number of unnecessary transfers U. If P represents the total number of times that blocks of information were pulled from the backup store, then the replacement efficiency is P−U/P.

In the absence of any reliable method of making a judicious selection among the many available replacement algorithms on the basis of comparative efficiency measurements, replacement efficiencies in practice are apt to measure quite low (e.g., 30 to 50 percent). An aim of the present invention is to expedite the making of replacement efficiency measurements so that the user may rapidly compare replacement algorithms in a precise way and need not trust to chance or intuition in selecting a replacement algorithm for the particular type of programs he may wish to run. intervals,"

As mentioned above, the block replacement decisions that should have been made by the data processing system up to any given point in the execution of a program usually cannot be determined until the time for changing any of those decisions has passed. Hence, optimal block replacement decisions cannot always be made "in real time," desirable as this would be. As the next most desirable thing, the present invention makes it feasible to determine automatically, at convenient "interrupt" intervals, the minimum number of block replacements that could have been made prior to some checkpoint in time if the optimal replacement sequence had been followed up to that point, and by continually updating this information during the course of a program, it is possible to generate a cumulative count of "unnecessary transfers" by the time the end of the program is reached. If the computed replacement efficiency seems low, then on the next occasion when the same or a similar program is run, one can try a different replacement algorithm and compare its efficiency with that of its predecessor. It is a feature of the present invention that these cumulative measurements are made without significantly impeding the normal use of the data processing system. This is made possible by a novel control technique that enables blocks of information located in the high-speed store to be repeatedly referenced without the necessity of any interruptions in reading and writing operations for measurement updating purposes, so long as no demand is being made for information which is not presently contained in the high-speed store, postponing the measurement updating operations until the next request is made for information out of backup storage, whereupon the replacement tables then are automatically updated.

In FIG. 2 there is presented an illustrative tabular comparison of the respective ways in which two replacement algorithms would handle a very simple sequence of block or page requests, one being an actual replacement algorithm of the kind already mentioned and the other being the "optimal" replacement algorithm. The operation is divided into a series of numbered "intervals" each interval commencing just before a block of information is transferred into the working memory WM in response to a request for a block that is not presently there. It is assumed that the working memory initially is clear of all information and that the system requests a series of information blocks in the sequence BL1, BL2, BL3, BL4, BL5, BL2. For illustrative purposes, the working memory is assumed to have a capacity of three blocks. (In practice, of course, the high-speed storage capacity would be much greater.) The "actual replacement algorithm" that is being used in the present example is the one disclosed in the aforesaid patent application of Robert A. Nelson, which is diagrammatically represented in FIG. 7 and other drawings of the present application.

Without going into the details of the actual replacement algorithm, it will suffice for the present to point out that when the working memory is completely filled by blocks BL1, BL2, and BL3, and a request then is made for block BL4 (interval No. 4, FIG. 2), a decision must be made to replace one of the other three blocks in working memory. In this instance the choice quite probably would be that block which has stayed the longest in working memory without having been referenced therein, namely, block BL1. Hence, during interval number 4, BL1 is replaced by BL4. Now, when block BL5 is requested in interval 5, a choice must be made between replacing block BL2 or BL3. Not having any other basis for choosing between BL2 and BL3, the actual replacement algorithm chooses BL2 for replacement, because BL3 was referenced more recently than was BL2. Hence, in interval 5, BL2 is replaced by BL5. However, this choice later turns out to have been the wrong one from an efficiency viewpoint, because at the next instant (i.e., during interval 6) block BL2 again is requested. It is necessary now to bring BL2 back into working memory almost immediately after it was transferred out of there.

In retrospect, it would have been better (following the optimal replacement algorithm) to have replaced block BL3 or BL1 instead of block BL2 at the time when block BL5 was being brought in, i.e., during interval 5. Then BL2 would have remained in working memory, where it later became needed, and the time spent in retrieving it from backup storage would have been saved. Thus, one of the six block transfers effected by the actual replacement algorithm proved to be unnecessary, and the replacement efficiency of this algorithm up to that point is only 83.3 percent.

It may be noted, however, that at the beginning of interval 5, when the replacement decision actually had to be made, there was no data then in existence by which one logically could have determined that block BL3 or BL1 was a better choice for replacement than block BL2. Such knowledge had to be acquired retrospectively, and it could have been advantageously utilized only if one were able to delay making the required replacement decision. Since it is not feasible in practice to delay making replacement decisions, such decision has to be executed promptly when called for, in accordance with the replacement algorithm actually being used. At a later time, one may be able to scan the most recent block replacement actions and determine that the actual replacement algorithm called for an unnecessary transfer, if such were the case.

In the present description, wherever references are made to blocks being "replaced" under the control of the optimal replacement algorithm, this should be understood to mean a figurative replacement rather than a literally executed block replacement. The optimal algorithm, being constructed empirically out of replacement decisions that already have been made by the system, merely determines, in effect, which blocks should have been retained in the working memory during previously executed replacement operations, in the light of current block referencing requirements. Moreover, the optimal algorithm, unlike the actual replacement algorithm, is able, under many conditions, to recognize options or alternatives. For instance (referring again to FIG. 2), during interval 4 of the optimal sequence, either block BL1 or block BL3 could have been replaced by block BL4. Similarly, during interval 5, the optimal algorithm would have been satisfied by replacing either BL3, BL1 or BL4, whichever happened to be in the working memory at that time. In other words, the optimal algorithm requires that block BL2 somehow be retained in the working memory until it can be referenced again during interval 5, and how this may be accomplished is not critical under the conditions herein stated. For convenience, however, it will be assumed in the description which follows that the optimal algorithm does, in fact, decide that a particular block should be replaced, even though several options may be open in this regard. In some instances, the optimal algorithm really does narrow the choice down to a particular block, these being the occasions when the optimal algorithm defines a "complete set," that is, a condition under which it would have been possible, by following a particular pattern of block replacements, to have filled the working memory to capacity with selected blocks all of which could have been referenced during the same interval or within a limited number of intervals thereafter (i.e., N-1 intervals, where N is the capacity of the working memory). This will be explained in greater detail hereinafter.

If one should happen to know the particular sequence in which blocks were requested by the processor during the execution of a specific program, one can determine the minimum number of block replacements needed for that program by using a MIN algorithm described in the above-mentioned article entitled "A Study of Replacement Algorithms for a Virtual-Storage Computer," by L. A. Belady, published in the IBM Systems Journal, Vol. 5, No. 2, 1966, pages 78—101. Such a determination also can be made dynamically in the course of executing the program, as will be disclosed herein. The present invention provides a way of automatically comparing the number of replacement decisions that would have been made by an assumed optimal algorithm (derived from the aforesaid MIN algorithm), as based upon intermittently updated block referencing information, with the number of replacement decisions made at earlier points in time, when these block replacements actually were required to occur. This automatic comparison is accomplished by utilizing a novel way of generating significant block referencing information during the intervals between actual replacement operations. As previously mentioned herein, and also explained in greater detail hereinafter, the present method involves the generation of stored indicia (designated herein as reference bits R') to identify the blocks in high-speed storage which are referenced by the processor during that portion of an interval when no new blocks are being called out of backup storage by the processor. The next time a block is demanded from the backup store, thereby causing a type of machine interrupt known as a "page exception" or "block exception" to occur, there will first occur a very rapid updating operation wherein the stored reference bits R' are scanned (along with the above-mentioned E and C tables) to furnish data for making a determination as to which blocks properly should have been present in the high-speed working memory WM at the time when the next most recent block replacement operation occurred, taking into account the number of the block that currently is being demanded from the backup store. If this currently demanded block number (not presently in the working memory) coincides with the number of one of the blocks that would have been left continually in the working memory by the optimal replacement algorithm from some previous block replacement operation, the actual replacement algorithm then is charged with having made an unnecessary transfer (FIG. 2).

FIG. 3 depicts the manner in which certain useful data can be assembled by the present efficiency measurement system in order to determine those instances in which the optimal replacement decisions, if executed, would have differed from the replacement decisions actually made by the algorithm that is being used. As mentioned before, the replacement algorithm actually being used is assumed to be the one disclosed in the aforesaid Nelson patent application, and the optimal replacement algorithm is based upon the MIN algorithm described in the aforesaid published article by L. A. Belady. The sequence in which the blocks are requested is assumed in the present example to be: BL1, BL2, BL3, BL4, BL5, BL2, BL4, this block request sequence differing from the example given in FIG. 2 only in that the sequence of FIG. 3 includes at its end an additional reference to BL4.

The "Actual Sequence of Operations" in FIG. 3 depicts the block transfer and referencing operations as they actually are performed. For example, the notation "Enter BL4; replace BL1" means that block BL4 has been entered into the working memory at the address that formerly was occupied by block BL1 therein. "Reference BL4" means that block BL4, sometime after being entered into the working memory, is referenced by the processor CPU (FIG. 1) so that the information stored in BL4 can be read out and used in a data processing operation or so that BL4 can receive and store the output of a data processing operation, as the case may be. The "Optimal Sequence of Operations" in FIG. 3 depicts various block transfer and referencing operations that could be performed under control of the optimal replacement algorithm in order to execute the same block referencing sequence in fewer intervals (i.e., with fewer block entries). The column U indicates the extent to which the number of block entries required by the actual replacement algorithm differs from the number of block entries that would be required by the optimal replacement algorithm.

One of the problems to which the present invention is addressed is to determine cumulatively, and with the least delay, whether each of the replacement decisions actually made by the system is in fact the best decision that could have been made from an overall efficiency standpoint. This determination is aided by progressively developing certain variables respectively designated P, A, E, C, and B, more particularly described hereinafter, which serve as convenient indicia for representing the comparative status of the two operational sequences. As in the case of FIG. 2, each of these sequences is viewed as consisting of a series of "intervals," each interval beginning when the central processor requests a block of information not presently located in the working memory and continuing until next time that the processor requests a block that is not in the working memory. During this interval, the processor may reference one or more of the blocks located in the working memory singly or repeatedly. Hence, these "intervals" may have varying durations depending upon how many block referencing actions are performed within each such interval. The performance of the actual replacement algorithm is compared with that of the optimal replacement algorithm by noting the difference between the respective numbers of intervals in the two sequences, this difference, as a rule, being the count of unnecessary transfers U.

There now remains to be explained the specific procedure by which, according to the teachings of the present invention, one can arrive at a determination that a particular one of the "actual" intervals (e.g., interval 6, FIG. 3) is an "unnecessary" interval from the viewpoint of the optimal replacement algorithm. A related question (discussion of which will be deferred until later in this description) is how the aforesaid determination can be made efficiently, that is, without unduly protracting the machine operation. Obviously, there would be little point in measuring the efficiency of a replacement algorithm if the efficiency measurement process itself were to consume an undue amount of machine operating time. One of the important objectives of this invention is to enable the efficiency measurement to be made efficiently as well as accurately.

In the table of operations, FIG. 3, as mentioned above, certain variable values represented by the symbols P, A, E, C, B, and U are developed as the operation progresses. These variables may be defined approximately as follows:

P is the number of "pulls," that is, the number of times that blocks of information have been pulled from the backup store in response to memory requests. It also is the number of each interval in the actual sequence of operations.

A is the number of each interval in the optimal sequence of operations, or the number of times that it would have been necessary to pull information blocks from the backup store if the optimal replacement algorithm had been followed.

E is an incrementable index value assigned to each addressable block number, corresponding generally to the number of the interval in which that block would have been most recently referenced if the optimal replacement algorithm had been followed.

C is a decrementable counter value assigned to each of the intervals in the optimal sequence of operations the first time a block is referenced in that interval. Initially each C value is N−1, where N is the number of blocks that can be stored concurrently in the working memory. Thereafter, the C value for each "optimal" interval may be reduced by 1 for each separate block that is referenced in working memory at a time corresponding to that interval. When a C value goes to zero from a higher value, this indicates that all N blocks in working memory would have been referenced at some time during a period including the corresponding interval and not more than N−1 succeeding intervals of the optimal sequence. In each instance where C goes to zero, a "complete set" of block references is defined for that interval. The C value of an interval becomes significant only if and when it is reduced to zero, at which point it excludes from further consideration by the efficiency measuring system those events that took place during the interval before this "complete set" was defined. The system then starts to look for the next "complete set" to be defined in some subsequent interval. The significance of the term "complete set" will become more apparent as the description proceeds.

B is a pointer value which, when it exceeds its arbitrary starting value of 1, indicates the number of the most recent interval in which the optimal replacement algorithm would have defined a complete set of block references. As will be explained in detail hereinafter, the relationship between the E and B values is an important factor in some of the logical decisions that are made by the measurement system.

U is the unnecessary transfer count. Usually, it equals the number of block "pulls" P made by the actual replacement algorithm minus the number A that would have been required by the optimal replacement algorithm. In some instances, however, this relationship is modified by an "uncertainty" factor Q, the nature of which will be explained hereinafter.

Referring again to FIG. 3, the operations performed under the control of the actual replacement algorithm (left-hand portion of the FIG.) and identical with those that would have been specified by the optimal replacement algorithm (right-hand portion of the FIG.) during the first four intervals in both sequences. (The working memory, it will be recalled, is assumed to have a capacity of three blocks in the present description.) During interval 5, when faced with a choice of replacing either block BL2 or block BL3 in order to make room for the entry of block BL5, the actual replacement algorithm decides to replace BL2, since BL3 was referenced more recently. However, during interval 6 which immediately follows, the actual replacement algorithm now finds it necessary to transfer BL2 back into the working memory, this time replacing BL3.

The optimal replacement algorithm, not being required to make its replacement decision at the same time that the actual replacement algorithm does, awaits the request for the next block following block BL5 before deciding which of the blocks then residing in the working memory should be designated for replacement at the time when BL5 enters that memory. Thus, the optimal algorithm indicates that it would have retained BL2, not BL3, in the working memory during interval 5, knowing that BL2 would be requested immediately after BL5. One should understand, of course, that the optimal replacement algorithm (being empirically constructed "after the fact," so to speak) cannot actually effect the replacement of any block in working memory. The notation "Replace BL3" in interval 5 of the optimal sequence, FIG. 3, merely means that this is the block replacement operation that would have been performed during interval 5 if the data processing system could have delayed its aforesaid block replacement action long enough to ascertain that BL2 would be the next block demanded by the central processor after block BL5 had been referenced. In practice, of course, it is not feasible to delay replacement decisions in this manner, and so the block replacement operation must be performed according to whatever rules may have been selected by the operator to govern these choices.

To recapitulate, the actual replacement algorithm causes BL2 to be referenced during interval 6 (i.e., following the sixth block-exception interrupt of the processor), whereas the optimal algorithm would have permitted BL2 to be referenced during the fifth interval, thereby avoiding the necessity of a sixth interrupt for block replacement purposes. Hence, the actual replacement operation attained less than optimal efficiency by reason of having called for this sixth replacement, and a U count of 1 accordingly is registered against it.

As a final step in the block referencing sequence illustrated in FIG. 3, the system makes reference to block BL4, which in either sequence of operations would concurrently be residing in the working memory. Hence, in both cases, BL4 is merely referenced in the working memory without necessitating any block replacement operation. One can note a difference, however, in the fact that during the sixth interval of the actual sequence, only two of the three blocks currently stored in the working memory are referenced (BL2 and BL4), whereas in the optimal sequence all three of the blocks currently stored in working memory (BL2, BL4, and BL5) are referenced. Hence, one may say that a "complete set" of block references has been defined for interval 5 of the optimal sequence. This fact becomes significant if the referencing sequence should be continued with additional block requests inasmuch as the appearance of each new "complete set" signals a new starting point in the process for determining the optimal block replacement choices. The optimized determination effectively "forgets" any block requests that might have been made before the current "complete set" of blocks was formed.

Let us now consider the manner in which various data tables represented by the columns headed P, A, E, C and B, FIG. 3, may be progressively built up by the system in order to facilitate the measurement of the replacement efficiency in the illustrated example. (These variables P, A, E, C and B will be involved also in the more detailed description of the system which follows this general description.) P is simply the count of actual block replacements performed by the system, being identical with the actual interval number. Similarly, A is the count of optimal block replacements, or the optimal interval number. E is an incrementable value assigned to each block according to the number of the interval in which it would have been most recently referenced according to the optimal replacement algorithm. In the case of block BL2, for example, the E value initially assigned to this block is 2, this being the number of the interval in which BL2 was referenced for the first time. Then, when BL2 is referenced again during the optimal interval 5, (corresponding to the actual interval 6), the E value of BL2 is raised to 5. Similarly, when BL4 is referenced for the second time during optimal interval 5 (actual interval 6), its E value is raised from 4 to 5. The E value of BL5 already is 5; hence, we now have a "complete set" of blocks, all bearing E values of 5, in the optimal interval numbered 5.

It would be appropriate at this point to consider briefly the significance of a "complete set." Usually, the function of the optimal replacement algorithm is to look back over the block replacements that actually have been effected by the working algorithm and determine whether any replaced blocks should have been retained in the working memory in order to be available for future referencing. Intuitively, one may recognize that this process is useful only up to a certain practical limit, beyond which the search becomes fruitless and there is nothing to be gained in causing the system to look further through the block referencing history to see whether a more perfect collection of blocks could have been assembled in the working memory. By identifying a "complete set," one thereby establishes a condition in which any previously referenced block not a member of that set, when demanded by the processor, is treated as though it were a new block which is now being demanded for the first time, making it unnecessary for the system to consider what might have happened if this block formerly had been saved instead of having been replaced. This greatly reduces the amount of searching that has to be done and makes it feasible to perform the optimal replacement calculations in the limited times that are available to it for that purpose. Thus, in a sense, the formation of each "complete set" signals a new start in the procedure of determining the optimal replacement pattern for future block requests.

The C value initially assigned to each interval in the optimal sequence (at the time when a block is first referenced in that interval) is 2, this being N−1, or one less than the block storage capacity, 3, of the working memory. Thus, in FIG. 3, an initial C value of 2 is assigned to interval 5 at the time when BL5 is referenced therein. Then, when BL2 is referenced subsequent to the referencing of BL5, the C value of interval 5 is decremented to 1. Concurrently with this action, the C values of all preceding intervals down to, but not including, interval 2 are decremented from 2 to 1. Decrementing the C values of intervals 3 and 4 to 1 is without significance at this particular time, merely denoting that it might have been possible, under certain conditions which did not actually materialize, to have defined a "complete set" including BL2 in either interval 3 or interval 4. This information is of only academic interest now. However, the decrementing of C from 2 to 1 in that portion of interval 5 when BL2 is being referenced is quite significant, because when BL4 is referenced during a subsequent portion of interval 5 in the optimal sequence, the C value of interval 5 is reduced to zero, thereby defining a "complete set" for interval 5. In other words, if the optimal block replacement decisions had in fact been executed, one would have reached a condition in the fifth interval where N of the demanded blocks could have been referenced in the working memory without having to bring any of these blocks into the working memory for that purpose. This is considered to be a state of optimum efficiency.

In the present scheme, as will be explained in greater detail hereinafter, determinations of what would constitute optimal replacement operations are made progressively from one "complete set" interval to the next "complete set" interval (interval 1 being arbitrarily treated as the first complete set interval for this purpose). Thus, in each new interval following interval 5, the C value for that interval is set initially to 2, and the system looks for conditions to develop under which any of these C values can be decremented to zero in accordance with the logic explained above, thereby defining a new complete set interval. Each time a new complete set is defined, the value of B is set equal to the number of the optimal interval in which such a set is found to exist. B then becomes a reference point or marker, with which the E values of the various demanded blocks are compared for various various purposes which will be explained in the detailed description following the present general description.

Whenever a complete set is being defined, as during interval 5 of the optimal sequence (FIG. 3), this may cause the value of P (the actual interval number) to increase more rapidly than A (the optimal interval number). Thus, in the present example, the actual interval number P increases from 5 to 6 while the optimal interval number A remains at 5. Whenever the margin of P with respect to A increases, the unnecessary transfer count U is incremented, since U is usually the difference between P and A. In this particular instance, intervals 5 and 6 of the actual sequence are said to be "contemporary" with interval 5 of the optimal sequence. It is possible to have several actual intervals "contemporary" with a single optimal interval, depending upon the particular conditions which are encountered at the time. Thus, in the present example, where the capacity N of the working memory is assumed to be three blocks, it is possible to have from one to three intervals of the actual sequence contemporary with a single interval of the optimal sequence. (An instance of three contemporary intervals will be considered later in connection with the example shown in FIG. 5.)

FIGS. 4A and 4B depict a more comprehensive example than the ones treated in FIGS. 2 and 3, respectively. In this example, the following block referencing sequence is assumed to occur (the working memory capacity N being three blocks as before):

BL1
BL2
BL3
BL4
BL5
BL2
BL4 (Alter BL4)
BL1
BL6
BL1
BL2
BL4

The replacement algorithm disclosed in Nelson patent application, which in the present case is assumed to be the "actual replacement algorithm" whose efficiency is being measured, gives to any block in the working memory whose contents have been altered a status which is different from that of all unaltered blocks stored in the working memory at that time. If a system operating under this algorithm must choose between replacing a block which has been altered and one which is unaltered, it may choose the unaltered block for replacement for the reason that a duplicate of the unaltered block already is residing in the backup store, making it unnecessary to write such a block into the backup store when it is displaced from the working memory. In the case of a block which has been altered while residing in the working memory, however, the information contained in that block is unique, and when such a block is to be replaced in the working memory, its contents must be written into the corresponding address of the backup store, superseding the original contents of that block. Since the operation of writing a block of information into the low-speed backup store consumes much more time than simply overwriting a block in the high-speed working memory, preference usually is given to altered blocks in deciding which blocks are to be retained in the working memory during a replacement operation. It can be assumed in the present example that block BL4 has this preferred status.

This "alteration" feature of the Nelson replacement algorithm just described can cause an altered block such as BL4 to remain in the working memory far beyond the time when it otherwise would have been replaced. Hence, it is possible that the block already will be in the working memory the next time it is demanded, even though the optimal replacement algorithm (which does not accord a special status to altered blocks) would have called for the replacement of this block during the period intervening between successive demands for such block. This creates a special situation in which it is possible for the actual replacement algorithm to operate more efficiently than the optimal replacement algorithm during a particular phase of a block referencing sequence. A case of this kind will be considered in the description which follows.

Up to the time when alteration of the block BL4 (FIG. 4A) occurs in the sequence of operations presently being considered, the system behaves in the manner depicted by FIG. 3. Then, when BL4 is altered by the processor, its corresponding "alteration bit" (stored in the associative memory AM, FIG. 1) is set to 1. This function will be described in greater detail hereinafter. During the next succeeding interval (7 in the actual sequence; 6 in the optimal sequence, FIG. 4B), block BL1 is demanded by the processor and is entered into the working memory WM, replacing BL5, which is the oldest block now in WM. Then, during the following interval (8 in the actual sequence; 7 in the optimal sequence) block BL6 is requested by the processor and is entered into the working memory. At this point, a critical choice must be made between BL2 and BL4 in the course of selecting a block to be replaced by the incoming block BL6. Ordinarily, if BL4 were unaltered, it would be the one chosen for replacement because it is the oldest block now residing in the working memory. However, the replacement algorithm actually being used in this case will cause the altered block BL4 to be "passed over" for replacement and instead will cause block BL2 to be replaced by BL6. The optimal algorithm, on the other hand, would have chosen BL4 as the block to be replaced, retaining BL1 and BL2 in the working memory because of the fact that it knows BL1 and BL2 are going to be referenced immediately after BL6 is referenced. (The optimal algorithm, it will be recalled, can delay its replacement decisions until it sees what blocks are going to be referenced immediately afterward).

It should be explained that whenever the optimal algorithm is described herein as "replacing" a block, this is to be construed as a figurative or symbolic replacement only. What really happens is that the optimal algorithm designates which blocks ought to have been retained in the working memory under the rules of its own logic, and from this information one may deduce which block the optimal algorithm would have replaced had it been the real working algorithm. Hence, the interval 7 of the optimal sequence, we can draw the inference that the optimal algorithm would have replaced BL4, if it had the power to do so, from the fact that BL2 is represented as being still present in the working memory during interval 7 of the optimal sequence. Therefore, when BL2 is requested by the processor, the optimal algorithm would not have found it necessary to initiate a new interval (i.e., a block replacement operation) in order to have BL2 available in the working memory. Hence, the A value remains unchanged when BL2 is requested by the processor. However, the actual algorithm finds it necessary now to start a new interval 9 when BL2 is requested, in order to bring BL2 into the working memory. Thus, P is incremented to 9, while A remains at 7, and the U count accordingly is incremented to 2. Moreover, a new "- complete set" of block references is defined (BL6, BL1, BL2) in the optimal interval 7, and the value of B accordingly is increased from 5 to 7.

It is significant to note that the present measurement system (which utilizes an optimal replacement algorithm that closely approximates but is not necessarily identical with the MIN algorithm previously mentioned) recognizes the implications of permitting a block such as BL4, which was a member of the preceding complete set (interval 5), to remain continually in the working memory where it can readily be referenced at the end of interval 9 even though it is not a member of the latest complete set defined by the optimal algorithm (interval 7 of the optimal sequence), FIG. 4B. The processor, if it should happen to request that particular block at this time, will find the block already in working memory when, according to the logic of the optimal algorithm, it should not have been there. Hence, in this particular instance, the actual replacement algorithm will have performed more efficiently than the optimal replacement algorithm. The efficiency measurement system gives credit to the actual replacement algorithm for having accomplished this by decrementing the U count and incrementing the A count, thereby enabling a true measurement of replacement efficiency to be obtained. This type of action is represented in the latter part of interval 9, FIG. 4B. Having requested BL4 and found it already in the working memory at a time when, according to the logic of the optimal replacement algorithm, it would not properly be there, the processor merely references the block without calling for a block replacement action. Then, following the logic of the efficiency measurement algorithm, the processor decrements the U count from 2 to 1 and increments the A count from 7 to 8. Thus, the actual replacement algorithm is given credit for having avoided a block replacement action which the optimal algorithm would have found necessary in order to reach that same point in the program.

In order to detect the possibility that a situation of this kind may arise, the measurement system provides an indicator which is set whenever the E value of a block presently located in the working memory remains at a value at least equal to the previous value of B but less than the new value of B, as in the present case where the E value of BL4 remained at 5 while the value of B went from 5 to 7. This condition denotes that BL4 has remained in the working memory since prior to the formation of the current complete set and therefore would not have to be transferred from the backup store in order to be available for further referencing in the working memory, even though BL4 is not a member of the current complete set (BL6, BL1, BL2) which has been figuratively defined by the optimal replacement algorithm. The indicator just mentioned is herein termed an "L bit," one of which is provided in each of the word-storing rows of the associative memory AM. The setting of an L bit to 1 conditions the system to decrement the U count if the block in question should be referenced by the processor before such block leaves the working memory. Thus, when the L bit of BL4 is set to 1 during interval 9, FIG. 4B, this conditions the system to decrement the U count in the event that BL4 is referenced while it is still in the working memory. This action will be explained in greater detail in the description which follows.

The foregoing example shows that those block assembling and replacement actions which are prescribed by the optimal replacement algorithm are figurative or symbolic transactions only and have no physical effect upon the workings of the actual replacement algorithm, which is permitted to operate freely. Thus, in interval 7 of the optimal sequence, FIG. 4B, it would appear that a "complete set" of blocks BL6, BL1 and BL2 simultaneously occupied the working memory. In fact, however, no such complete set ever existed at any one time. During the contemporary interval 8 of the actual sequence of operations, the working memory was occupied by blocks BL6, BL1 and BL4, and during the contemporary interval 9 it was occupied by blocks BL2, BL1 and BL4. The optimal algorithm simply ignored the presence of BL4, since it was not "logically" present in the working memory. The use of the "L bit," as described briefly above and more fully hereinafter, enables the logic of the optimal replacement algorithm to be reconciled with the real life situation in those occasional instances where a discrepancy may be found to exist.

The example shown in FIG. 5 brings out an additional feature of the optimal replacement algorithm, namely, that a "complete set" may be defined for a particular interval in the optimal sequence even though not all of the blocks in this complete set are referenced during that same interval. The working memory capacity, N, is assumed to be three blocks as in the preceding examples. The blocks are referenced in the following order:

BL1
BL2
BL3
BL4
BL5
BL2
BL3
BL6
BL1
BL2
BL7
BL4
BL6

During interval 7 of the optimal sequence, corresponding to contemporary intervals 9 and 10 of the actual sequence, a "complete set" of blocks BL6, BL1 and BL2 may be deemed to exist. However, this fact does not become apparent until interval 9 of the optimal sequence, when BL6 again is referenced. The point to be observed here is that the optimal replacement algorithm, if it had been in control of the system, would have assembled during interval 7 a set of blocks BL6, BL1 and BL2, all of which have been referenced before they left the working memory during the period occupied by intervals 7 to 9 of the optimal sequence, which is to say, during a period of N optimal intervals commencing with interval 7. The C-table recognized this fact by causing the C value of interval 7 to be decremented to zero at the time when BL6 is demanded by the processor at the beginning of interval 13 in the actual sequence, which is contemporary with interval 9 in the optimal sequence. Inasmuch as it is the C value of interval 7 which has gone to zero, the value of the B pointer is reset to 7, even though such action does not occur until interval 9 of the optimal sequence (N—1 intervals later). Seven now becomes the new complete set reference value against which the E index values of demanded blocks are compared and/or updated.

DETAILED DESCRIPTION OF PREFERRED EMBODIMENT

The preferred embodiment illustrated in FIGS. 6 et seq. shows the invention as it would be utilized for measuring the efficiency of the block or page replacement algorithm disclosed in the aforesaid patent application of Robert A. Nelson, Ser. No. 859,784, filed Sept. 22, 1969. The principle of the invention is not limited to measuring the efficiency of a single replacement algorithm, however, and no such inference should be drawn from the fact that the drawings show an apparatus ostensibly designed for this particular purpose only.

Certain portions of the illustrated system which correspond or relate to Nelson's replacement scheme are identified in FIG. 6 and the subsequent drawings herein by timing or operational symbols that bear the prefix T (e.g., T0, T5, T6). Those portions of the system herein disclosed which uniquely embody the present efficiency measuring concept are identified by operational symbols bearing the prefix ME (e.g., ME1, ME8, ME66). The actual replacement algorithm (i.e., the Nelson replacement algorithm in this case) is permitted to function freely, the efficiency measuring operation being performed in such a manner that it does not impose any significant delay upon the actual replacement operations.

The aforesaid Nelson replacement algorithm, operation of which is diagrammatically illustrated in FIG. 7, generally selects for replacement one of the blocks which has not recently been referenced and which has not been altered during its stay in the working memory. Any block that recently has been referenced is, as a rule, entitled to remain in the working memory regardless of how long it might have resided there prior to such referencing. If a block is altered when it is referenced, it acquires a special status which entitles it to remain in the working memory so long as the memory contains at least one unaltered block that has not recently been referenced. When the "reference bit" (R bit) associated with a block has a value of 1, this indicates that the block was recently referenced. When the R bits of all the blocks in the working memory attain a concurrent 1 status, all of them are automatically reset to 0, and under these conditions, it is not possible to tell which block was most recently referenced; hence, none are assumed to have been recently referenced. Alteration of a block is indicated by setting its "alteration bit" (AL bit) to 1. No block whose AL bit is 1 can be replaced as long as the working memory contains a block whose AL and R bits are zero. If all of the unaltered blocks have R bits equal to 1, the system then selects for replacement, a block having its AL bit set to 1 and its R bit set to 0. Due to the fact that the R bits of the blocks are not permitted to maintain an all-1 status, as explained above, there will be at least one block whose R bit is 0. When a block leaves the working memory, the AL and R bits associated with that working address are reset to 0. The operation of this particular replacement algorithm will be explained in greater detail subsequently in connection with FIG. 7.

Care should be taken not to confuse the above-mentioned R bits with the other type of reference bits herein designated the R' bits. Both the R bit and the R' bit associated with the working address of a block are set to 1 the first time this block is referenced following its entry into the working memory, and each subsequent referencing of this block leaves its reference bits R and R' in a 1 state, as a rule. However, the R and R' bits are not always set to 1 or reset to 0 simultaneously. A 1 R bit will be automatically reset to 0 if and when the R bits associated with all of the other blocks in the working memory attain a 1 setting. The R' bits are not reset under such conditions. When a block replacement is performed, the R' bits of the blocks remaining in the working memory ultimately are reset to 0, if they do not already have that value, but the R bits of such blocks are unaffected by this action. The respective functions of the R and R' bits will become clarified as the description proceeds.

Some of the symbols and terms used in the present disclosure have been employed with different meanings in the aforesaid Nelson application. For example, the symbol A, which in the present disclosure represents the number of the current interval in the optimal sequence of operations, has been used in the Nelson application to represent the value of the "alteration bit." To avoid confusion, the value of the alteration bit is herein designated AL instead of A. As already mentioned, the Nelson replacement system makes use of certain reference bits which are designated by the symbol R; whereas the present system uses additional reference bits having a somewhat different function, these being designated R' bits. Still other modifications of Nelson's nomenclature will be specifically pointed out hereinafter.

As an introduction to the more detailed description of the system which follows, reference now is made to the general system layout shown in FIG. 6, which shows how the present efficiency measurement procedure (identified by the ME symbols) is related to the actual (i.e., Nelson) replacement scheme (identified by the T symbols). Considering FIG. 6 in conjunction with FIG. 1, each block referencing action of the system is initiated by a memory request coming from the central processor CPU. This request is directed to the portion of the system represented generally by the rectangle or box 500, FIG. 6, which performs the initial step of determining whether the requested block is or is not in the working memory. If the requested block is not then present in the working memory, the operation branches through the flow line 1000 to step 501, which represents an updating procedure that is performed whenever a block is to be transferred from the backup store to the working memory. Using the stored reference bits R' (the nature of which will be described more fully hereinafter) the system automatically updates the variables denoted by the symbols P, A, E, C, B, U, L and Q, respectively, which are involved in the aforesaid efficiency measurement process whereby a comparison is made between the number of block replacements actually effected and the number of replacements that would have been specified by the optimal replacement algorithm. The functions of most off of these variables have been explained in a general way hereinabove. The Q value is an "uncertainty" indicator, the purpose of which will be explained at the appropriate point in the following description.

When the value updating step 501, FIG. 6, has been performed, depending upon the conditions which have been encountered therein, the operation proceeds along either flow line 1004 or 1006 to step 502, which causes the requested block to be entered into the working memory at an address therein selected by the replacement algorithm. In replacing the block which formerly was stored at that working address, the R' and L bits associated with such address are set to zero. The operation then returns through flow line 1007 to the interrogation step 500, where inquiry again is made to determine whether the requested block is in the working memory.

If the requested block is present in the working memory, either as the result of the current memory request or some previous memory request, the operation then branches from step 500 through flow line 1001 to steps 503, 504 and 505. Step 503 merely causes the block number and L bit value of the requested block to be stored in a HOLD register for possible future use (such use occurring under certain conditions that are described hereinafter). In step 504 the working address of the requested block and the particular address of the information desired within that block are placed in the left-hand and right-hand portions of the memory address register MAR of the working memory WM. This makes the information stored at the chosen address available for reading in the memory data register MDR of the working memory WM, or alternatively it enables the MDR to receive information which is to be written into that particular working address, as the case may happen to be. In either case, whether the particular operation thus performed is reading or writing, it will be described herein as "referencing" the addressed block.

At step 505 certain additional updating functions are performed as a prelude to referencing the requested block. These functions consist of marking the R bit associated with the requested block to show that this block is being referenced and also marking the AL bit in the event that the block is being altered (rewritten). The operation then proceeds through flow line 1002 to step 506.

At step 506, FIG. 6, if the L bit associated with the requested block happens to be 1, an adjustment is made in the values of A and U as explained above in connection with FIGS. 4A and 4B. Following this, or immediately at the beginning of step 506 in the event that L=0, the word associated with the requested block is referenced in the memory data register MDR of the associative memory AM, and the R' bit associated with the referenced block is set to 1. This ends the block referencing operation which was initiated by the current memory request, and the operation returns through flow line 1008, FIGS. 6 and 9A, to the CPU.

FIG. 7 is a general diagrammatic illustration of the system similar to FIG. 6 but presenting a more detailed showing of the functions performed within the steps generally numbered 502 and 505 of FIG. 6. The remaining steps of FIG. 6 (500, 501, 503, 504 and 506) will be broken down into their constituent functions during a subsequent portion of this description. Referring to FIG. 7, attention now will be given to the specific mode of operation of the aforesaid Nelson replacement algorithm, this being the "actual replacement algorithm" assumed for illustrative purposes herein. The operational symbols with T prefixes (e.g., T0, T1, T2, etc.), associated with the various steps of this replacement algorithm, refer to corresponding portions of the more detailed flow charts and circuit diagrams which are presented subsequently herein.

If the requested block is not presently located in the working memory WM (FIG. 1), it will have to be transferred into this memory WM from the backup store BS. This means that the system must select a working location or address within the working memory WM into which the block identified by the requested block number is to be entered, and from which the block presently there stored is to be deleted. The manner in which the replaced block is handled during this operation depends upon whether or not it was altered during its stay in the working memory. If the block to be replaced was not altered then it can simply be overwritten by the incoming block, since a duplicate of the replaced block already is in the backup store. If the block to be replaced has been altered, however, it must be written into the backup store before it is deleted from the working memory. Since the writing of information into the backup store is a relatively slow process, it is preferred to avoid this wherever possible. For this reason, preference is given to those locations in the working memory whose stored blocks have not been altered when seeking a place in which to store the incoming block. On the other hand, it is not desirable as a rule to replace an unaltered block which only recently was referenced in the working memory, since there is a strong likelihood that such a block soon may be referenced again by the processor.

The various considerations just mentioned are satisfied by the address selection process depicted in steps 510 to 515 of the general flow chart shown in FIG. 7. If the test performed at step 510 indicates that associative memory AM (FIG. 1) contains at least one word whose AL and R bits both equal zero, then a word pointer (described hereinafter) is advanced to the next word in AM whose AL bit and R bit combination is 0–0 (step 511). The block stored at the location or address in the working memory corresponding to this word in AM is the block to be replaced (step 512). Since its AL bit is zero this block is replaced simply by overwriting it with the incoming block, it being unnecessary to transfer the contents of an unaltered block to the backup store. The operation then returns via flow line 1007 to step 500, where inquiry again is made to determine whether the requested block now is present in the working memory, the answer of course being "Yes" in this particular instance.

If the test at step 510 indicates that none of the words in the associative memory AM has both its AL and R bits equal to zero, then a further test is made (step 513) to determine which of the words in AM has an AL bit equal to 1 and an R bit equal to 0. There is bound to be at least one word in AM whose R bit is 0, inasmuch as all R bits are reset automatically to 0 whenever they reach an all-1's setting. Hence, among the words having AL bits of 1, at least one of these words will have a zero R bit. The word pointer now is advanced to the next word whose AL bit and R bit combination is 1–0 (step 514). The block located at the corresponding address in WM is the one to be replaced, and since this block has been altered, its contents must be rewritten into the backup store BS when it is replaced (step 515). Following this the operation returns to step 500 as before.

When the requested block is found to be present in the working memory WM, preparations are made to update the AL and R bits in the corresponding word of the associative AM. At step 516, FIG. 7, the R bit of this word is set to 1, thereby indicating that the respective block is being referenced. Then, at step 517, inquiry is made whether the block is to be altered while it is referenced. If so, its AL bit is set to 1 (step 518). If not, the AL bit remains at 0. The operation then proceeds to step 519, where a test is made to determine whether the R bits of all words in the associative memory now stand at 1. If they do, then all of these R bits are reset to 0 (step 520). If not, no change is made in the R bits. This completes the updating of the AL and R bits, and the operation then proceeds via flow line 1002 to step 506 (FIG. 6).

Although FIGS. 6 and 7 are concerned particularly with the interrelationship between the present efficiency measurement system (designated by the ME steps) and the Nelson replacement algorithm (designated by the T steps), these diagrams also indicate how the present efficiency measurement technique can be applied to other replacement algorithms as well. All replacement algorithms have certain common features, one of which is the so-called "page exception" or "block exception" whereby the system calls for an interruption of the central processor CPU whenever a demanded block or page cannot be found in the working memory. The efficiency measurement process disclosed herein is adapted to be operated intermittently during these interrupt periods while the central processor is waiting for the demanded blocks to be made available in the working memory. In a sense, therefore, the efficiency measurement procedure and the replacement algorithm utilize the central processor on a time-shared basis which does not significantly degrade the replacement operations.

ASSOCIATIVE MEMORY

The associative memory AM, FIG. 1, is a convenient storage mapping scheme for relating the real block addresses in the working memory WM to the virtual block addresses in the backup store BS. In effect, it is a permanently wired storage mapping scheme. This is not meant to imply that the storage mapping function necessarily must be carried out by a special apparatus such as an associative memory. Since this type of apparatus is well suited for the purpose and lends itself to ease of description, however, it is incorporated as a part of the disclosed system.

Figure 8D:
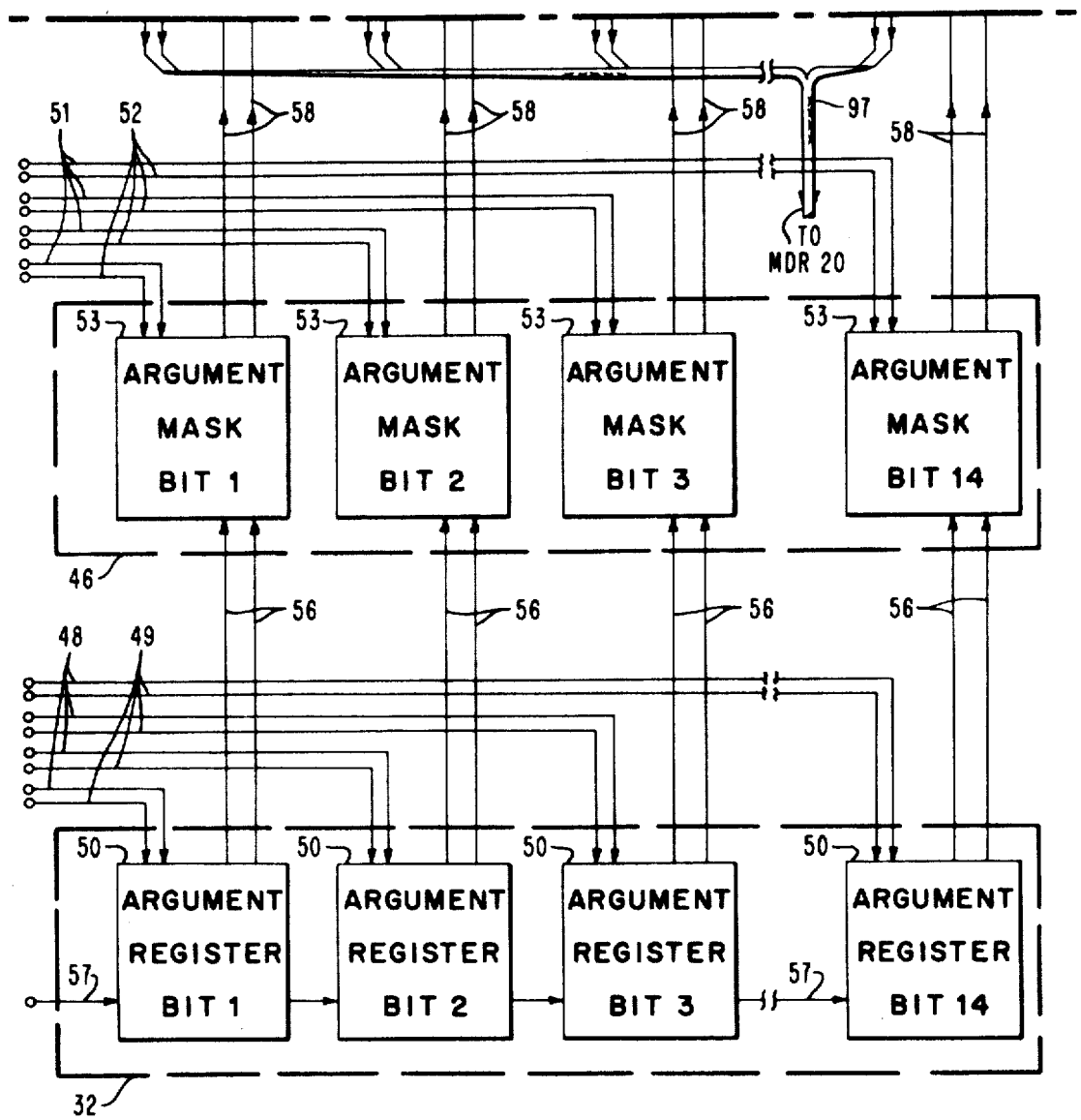
FIGS. 8A to 8D, when assembled in the manner indicated by FIG. 8, constitute a circuit diagram of an associative memory that may be employed in the present system.
Figure 8:
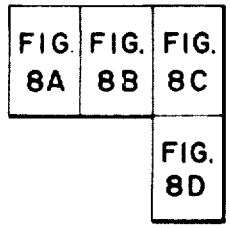
Figure 8A:
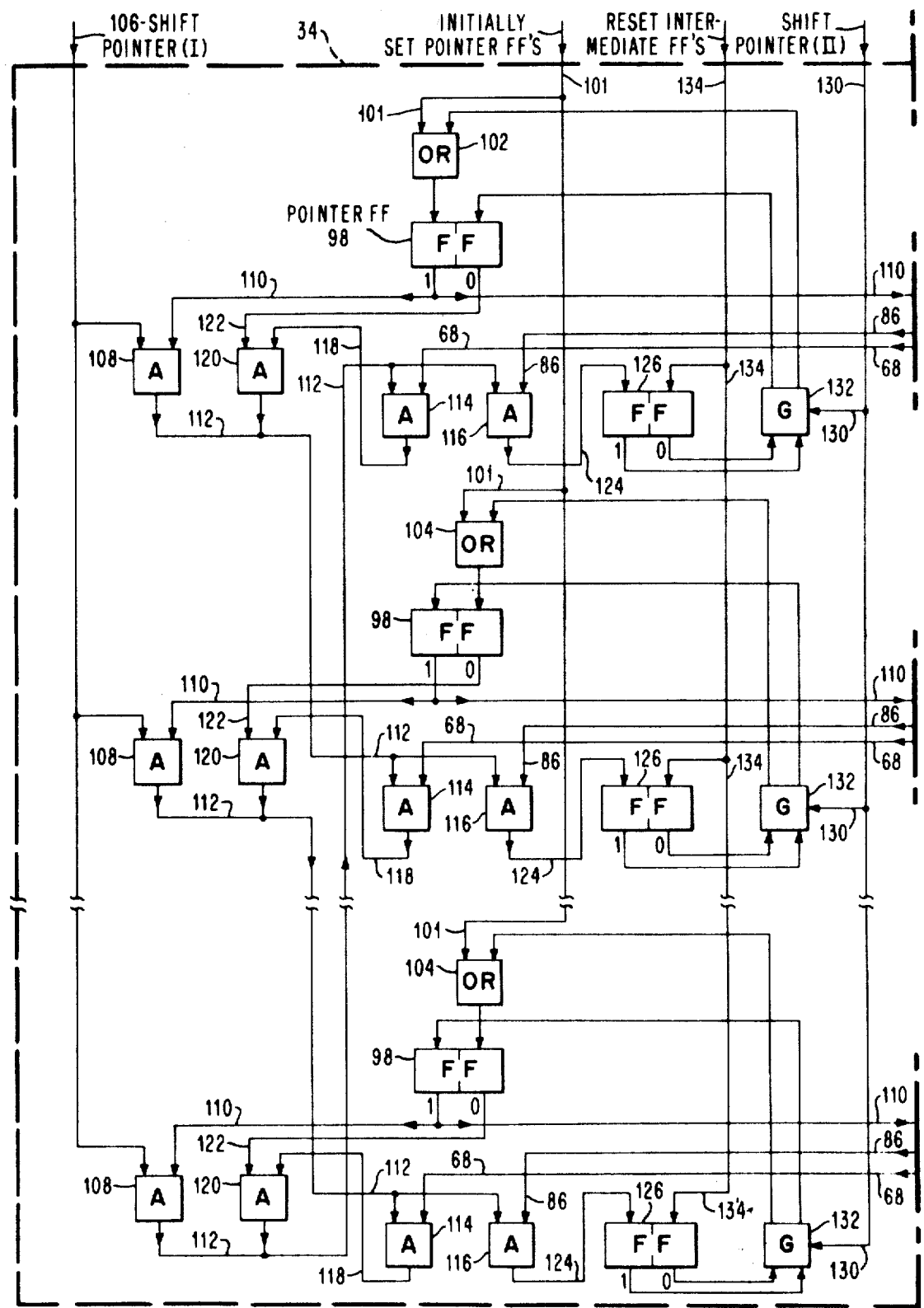
Figure 8B:
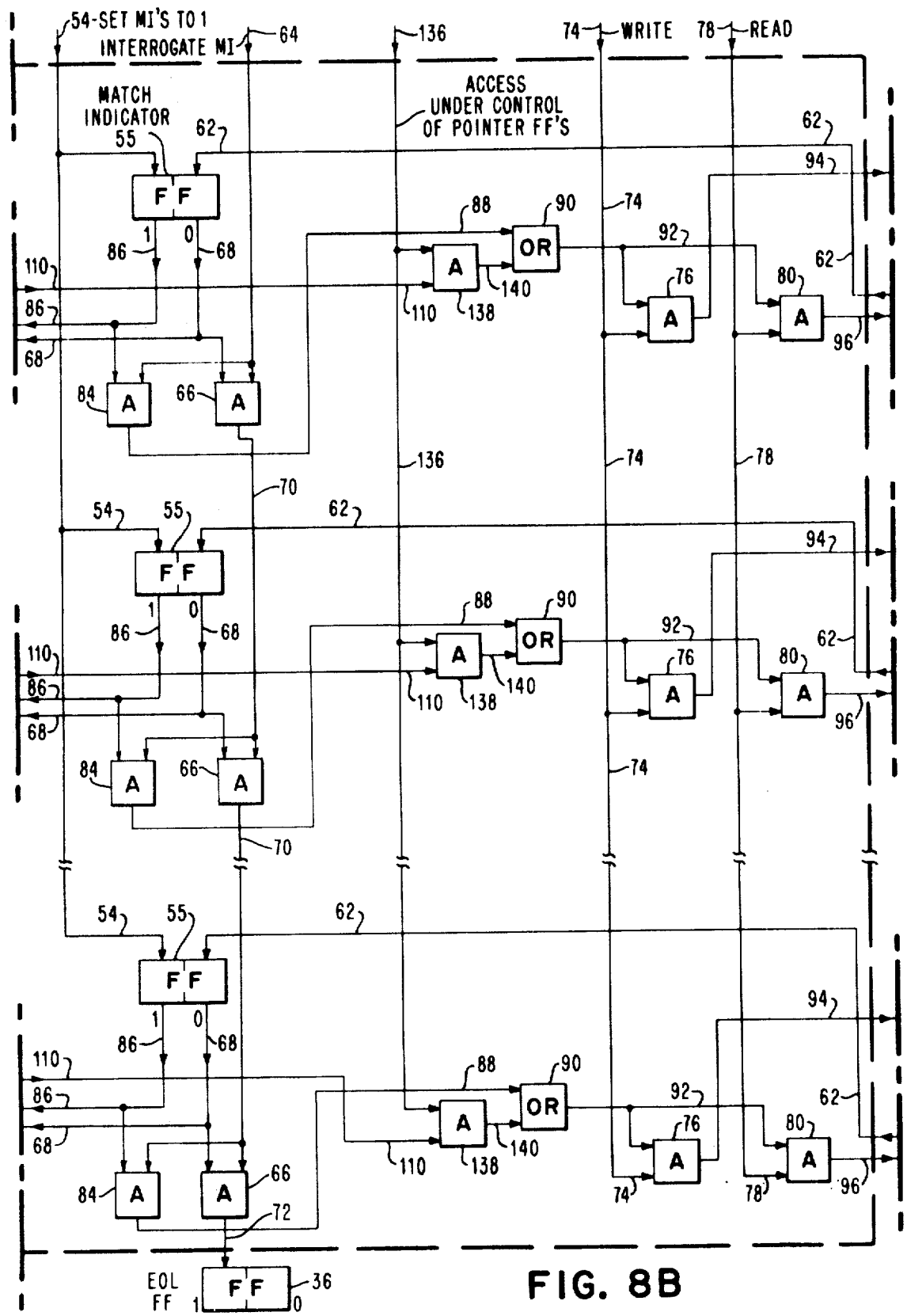
Figure 8C:
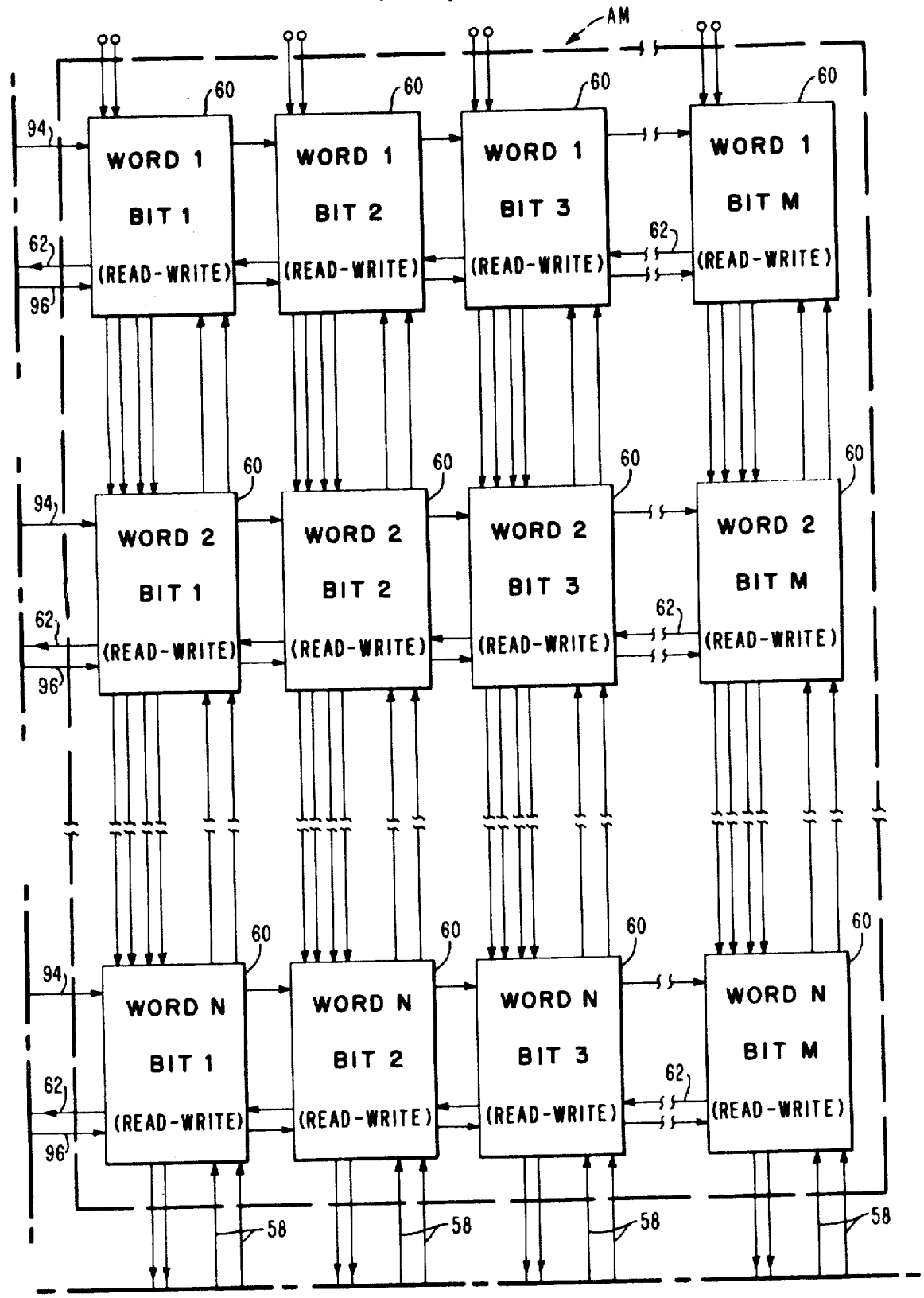
Figure 9B:
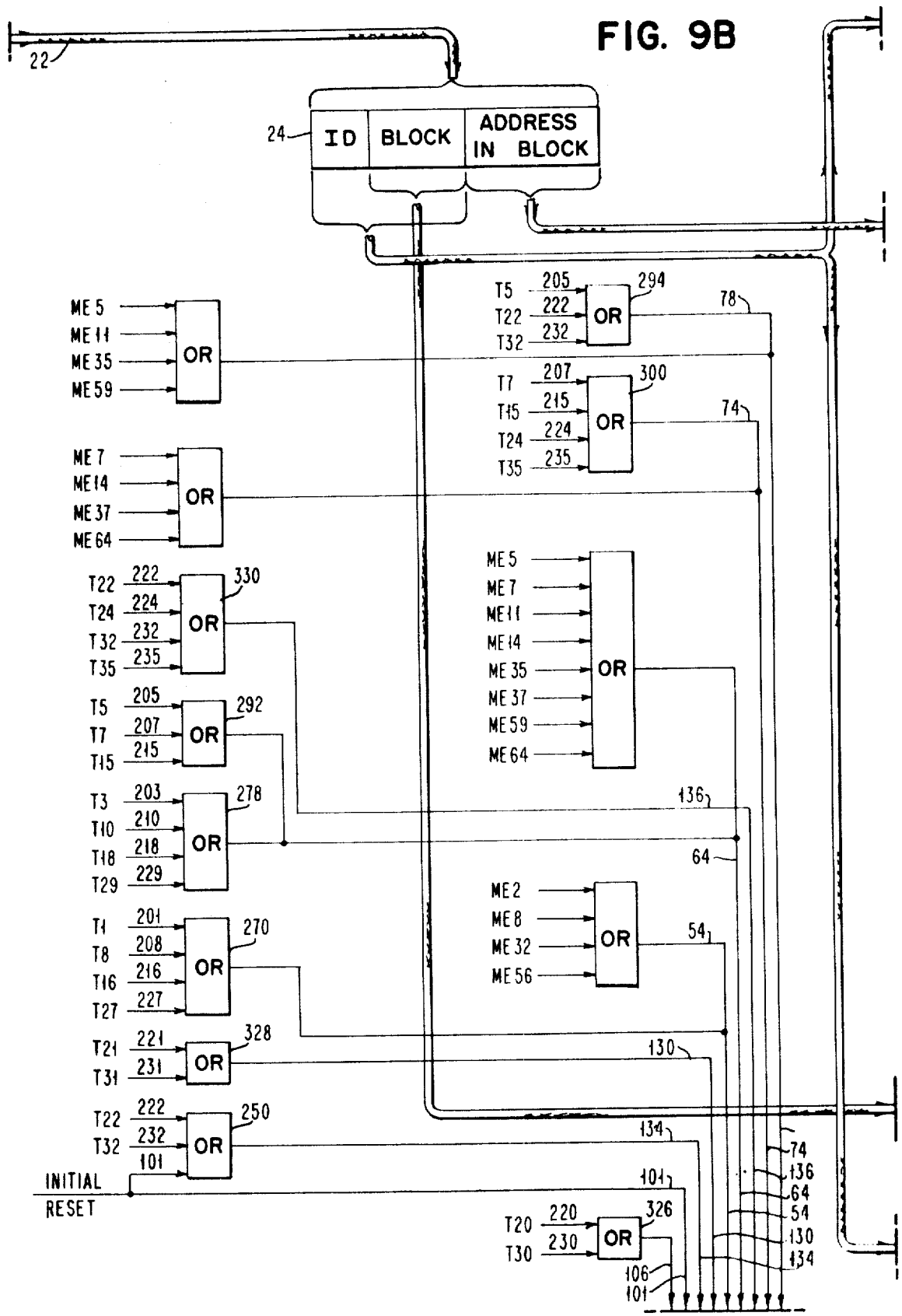
Figure 9C:
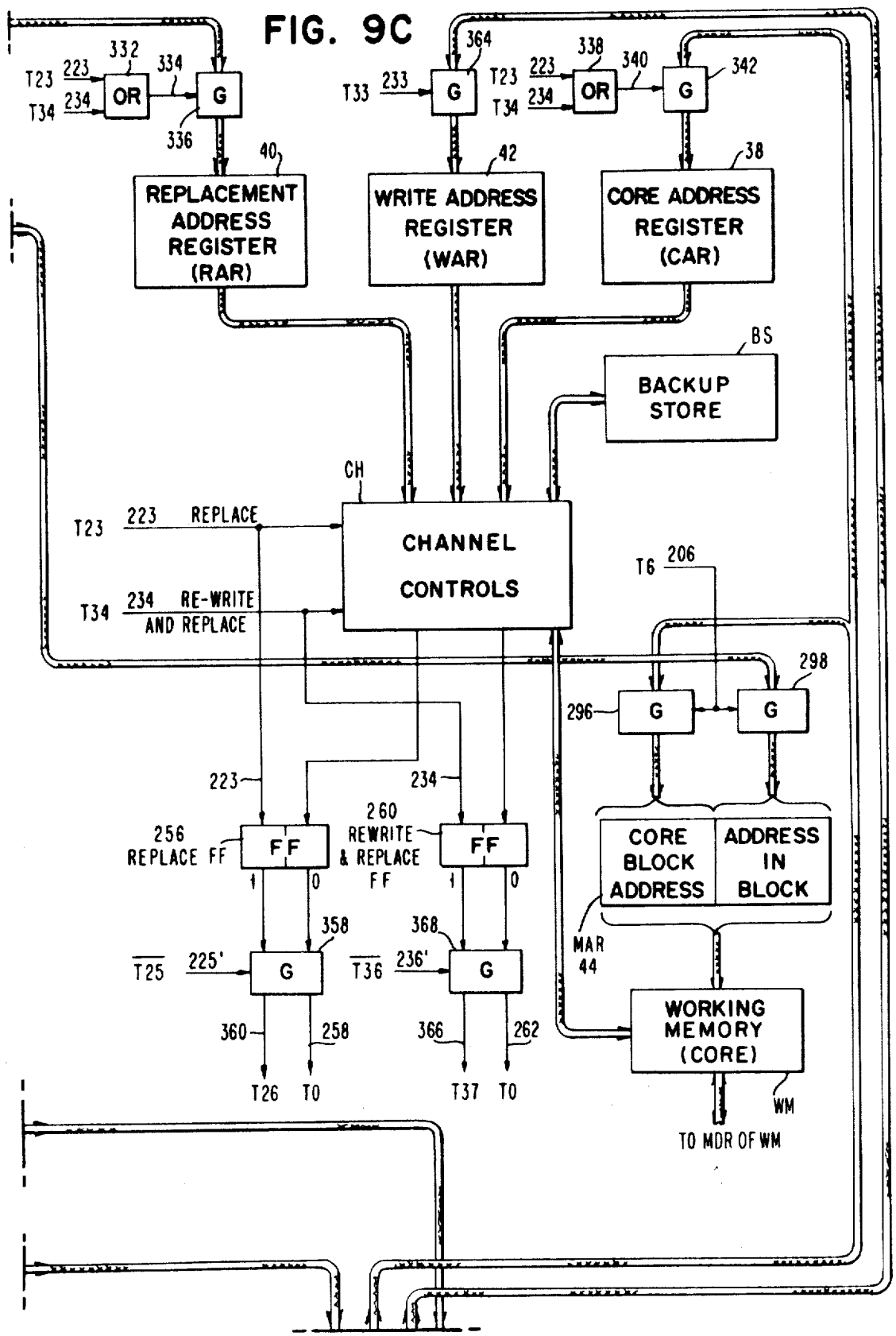
Figure 9E:
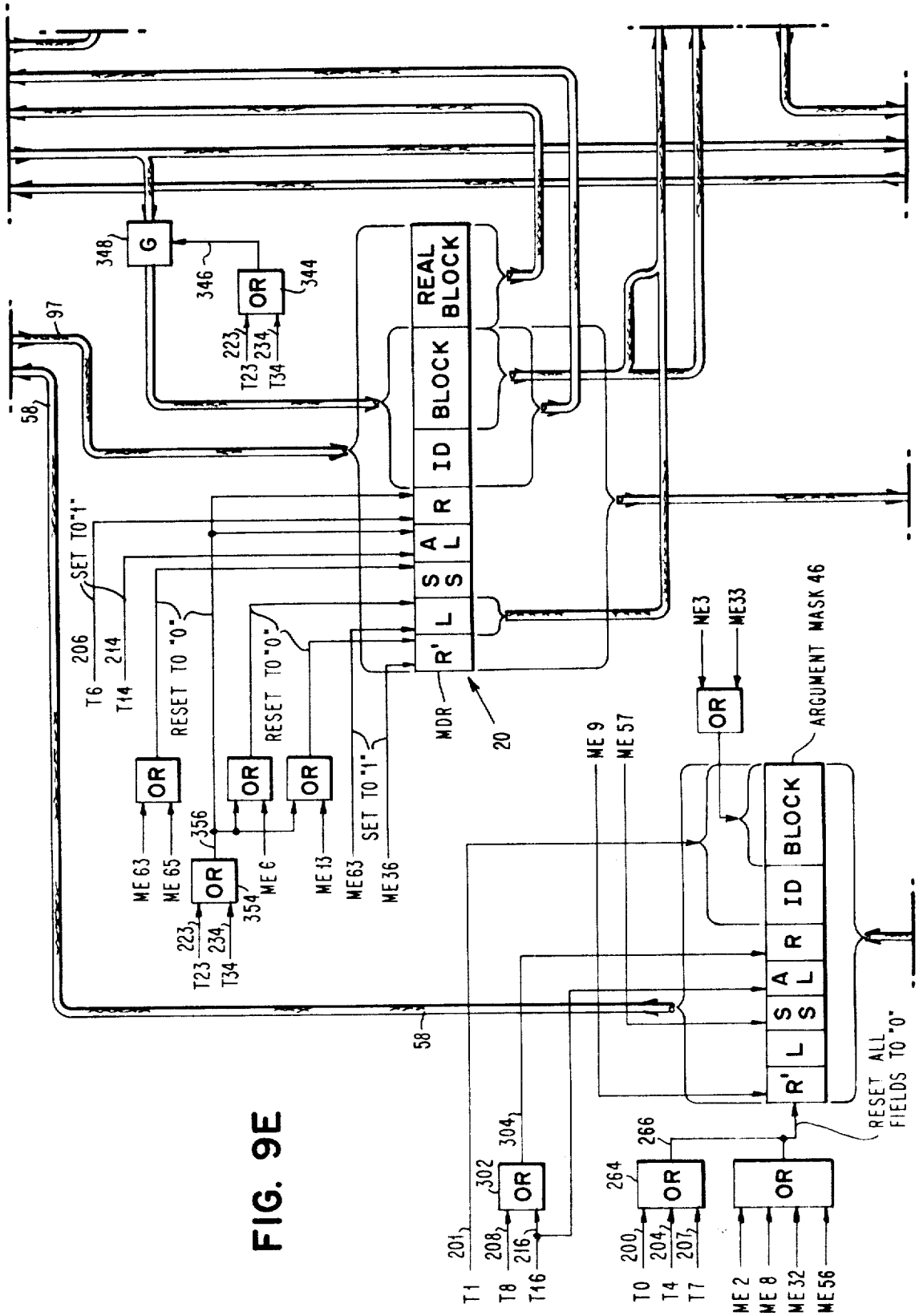
Figure 9F:
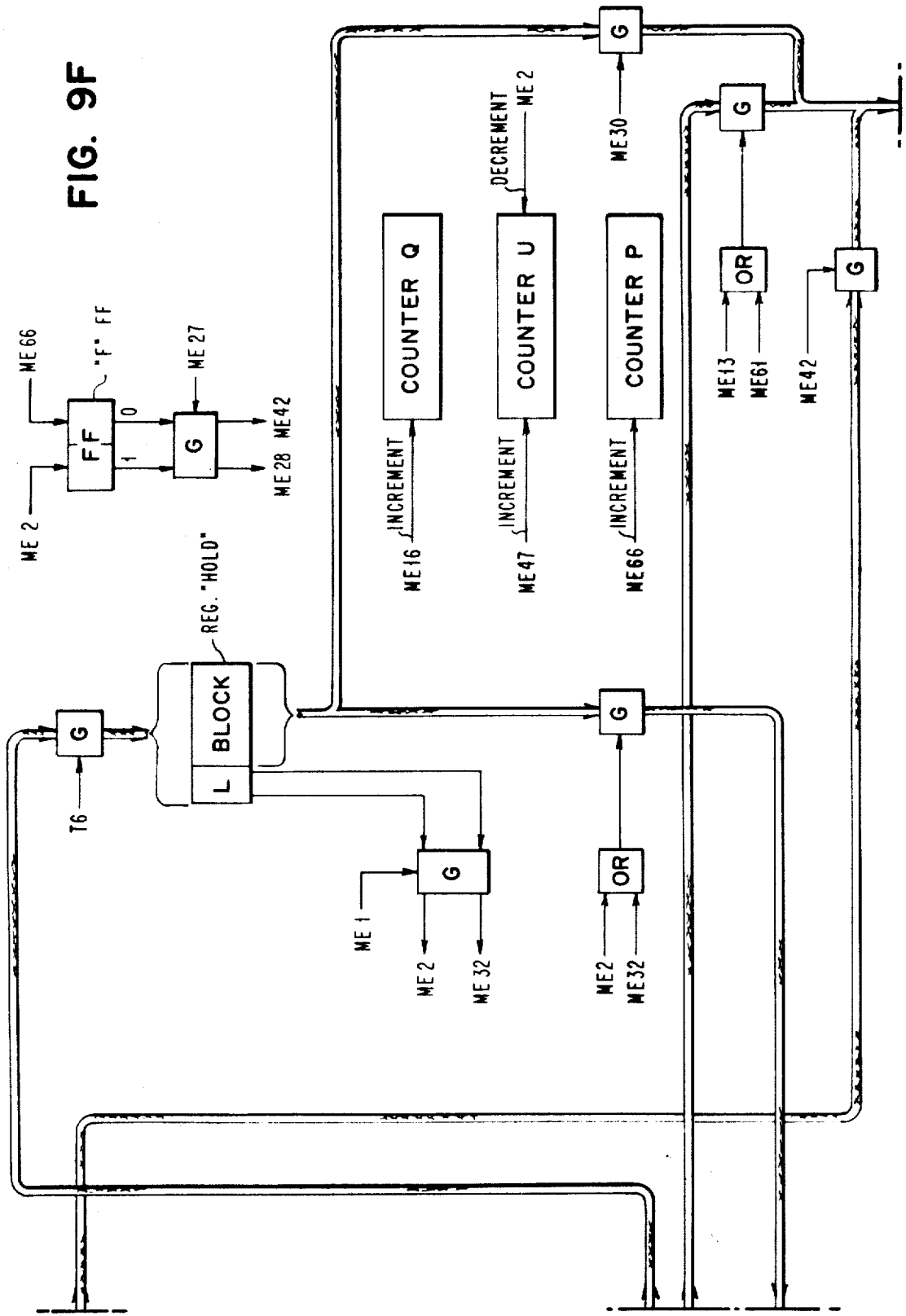
Figure 9G:
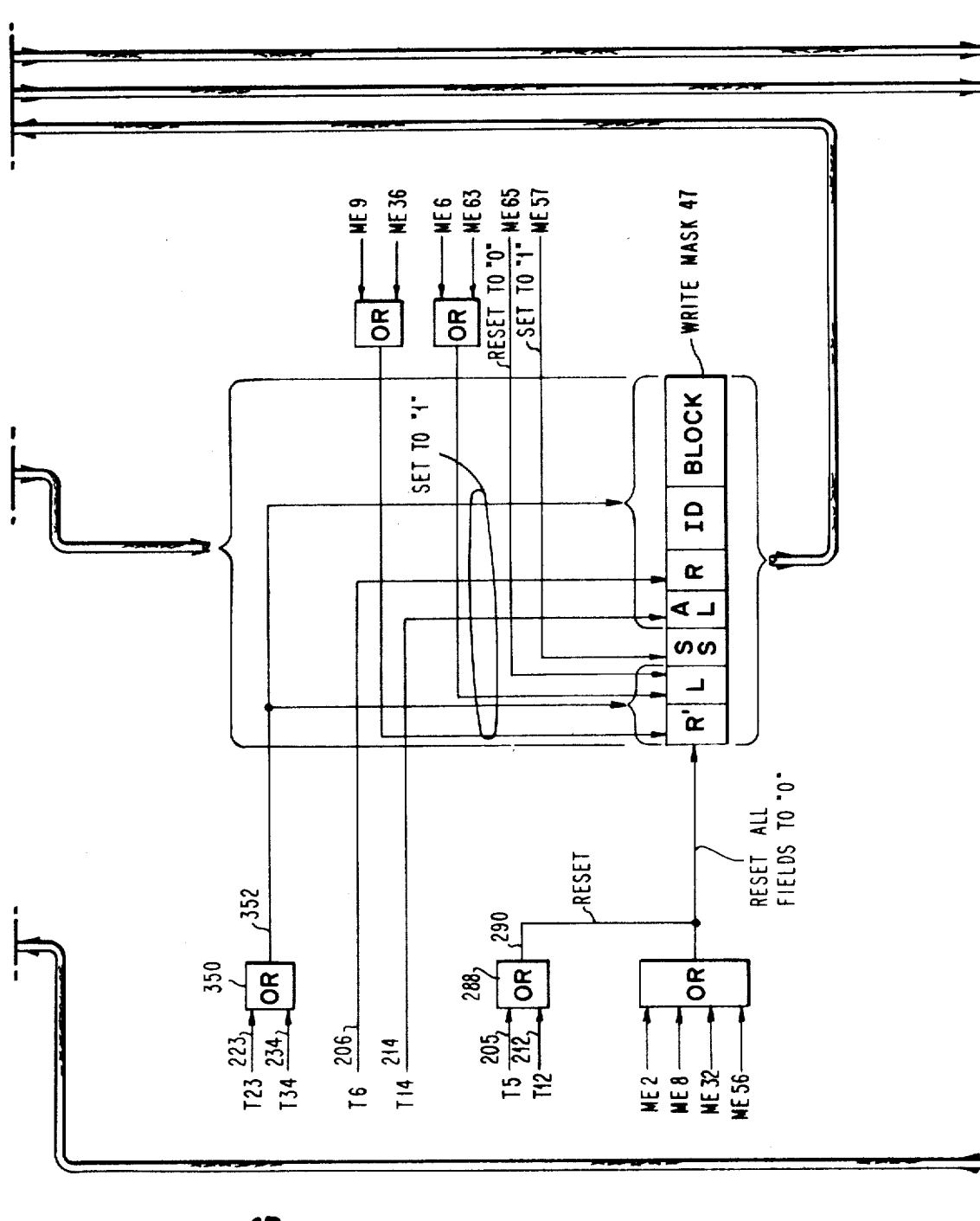
Figure 9H:
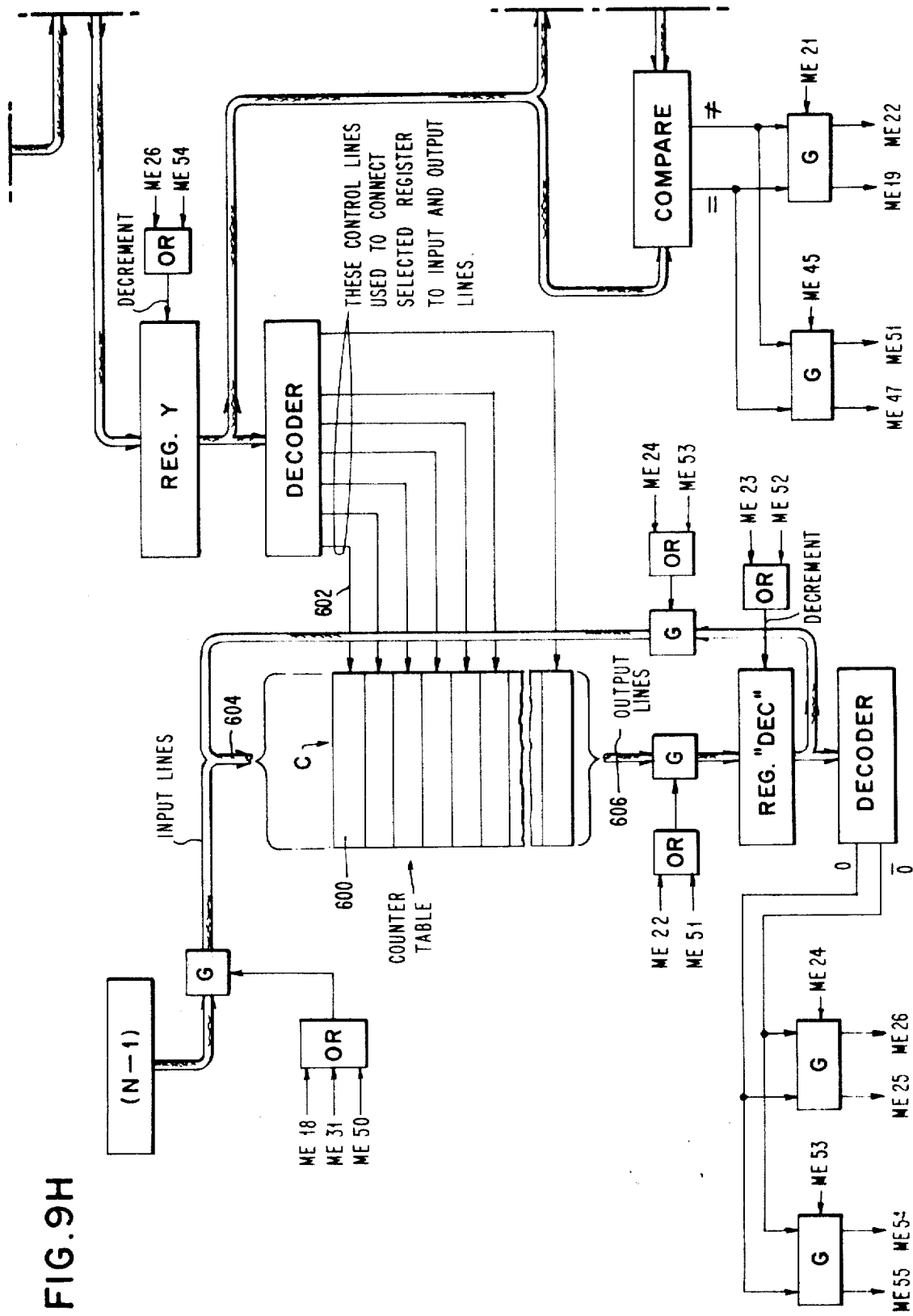
Figure 9J:
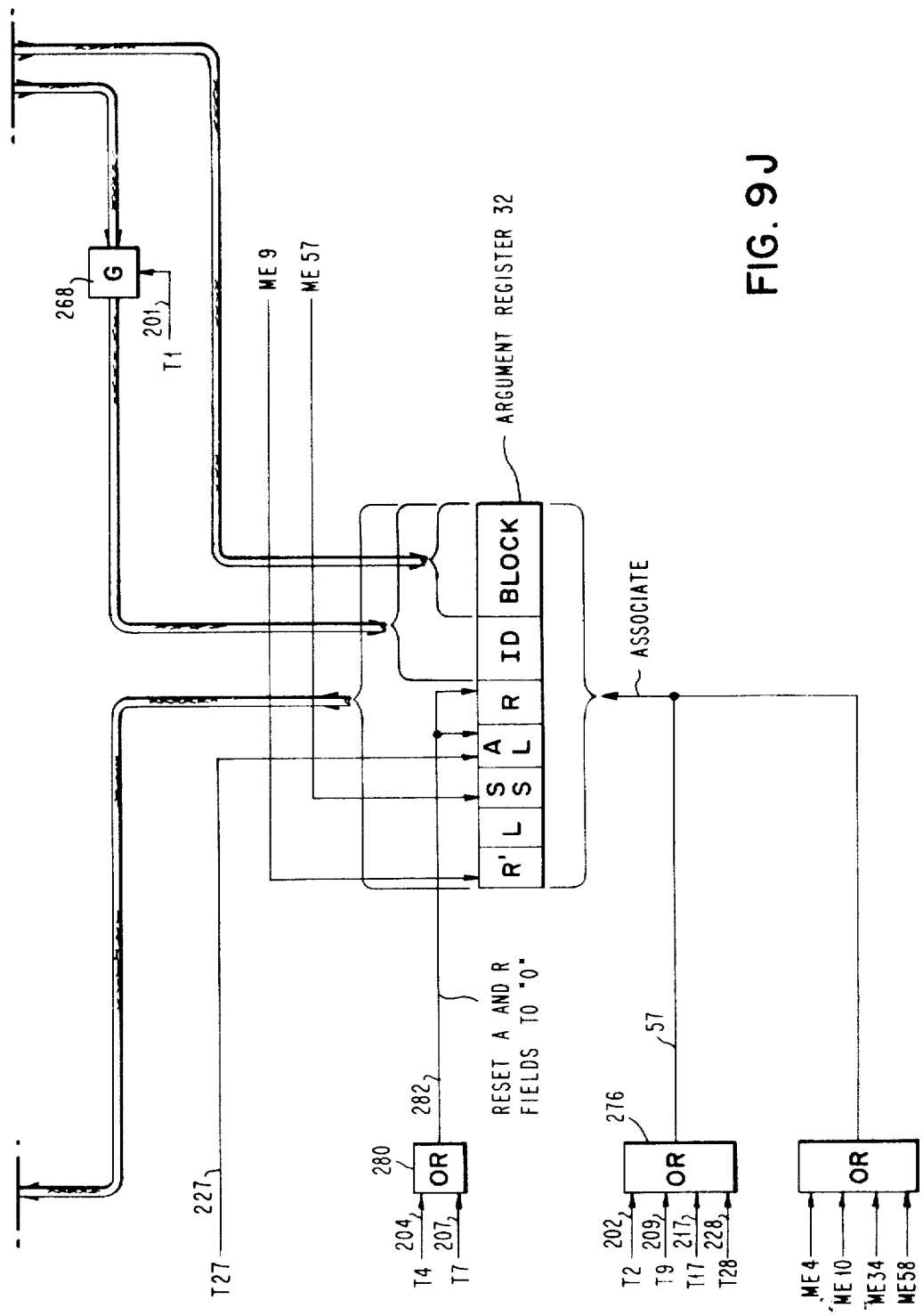

FIGS. 8A—8D illustrate associative memory AM, argument register 32, associative memory controls 34 and argument mask 46, all of which are shown more generally in FIGS. 9D, 9E and 9J. Associative memory AM, MDR 20 (shown only in FIG. 9E), write mask 47 (shown only in FIG. 9G), argument register 32, and argument mask 46 are of a type shown in U.S. letters Pat. No. 3,317,898, issued on May 2, 1967 to H. Hellerman and assigned to the assignee of the instant application. The operations of these elements will be described hereinafter, and a still more detailed understanding of them may be obtained from the above mentioned patent. Associative memory controls 34 are to some extent the same as those shown in the Hellerman patent, differing primarily in the presence of the pointer flip-flops and in the controls associated with these flip-flops. A detailed description of the operation of controls 34 will follow.

A number of operations may be performed with the associative memory AM. The first operation to be described is an associate operation to determine which entries in associative memory AM have a field (or fields) that match a particular field (or fields) in argument register 32. This is accomplished by applying the desired bit combination through appropriate ones of the control lines 48 and 49, FIG. 8D, to the bistable bit-storing elements 50 of the desired field of argument register 32. A signal on a line 48 sets the corresponding bistable element 50 to its 0 state and a signal on a line 49 sets the corresponding bistable element to its 1 state. The argument register is reset by simultaneously applying signals to all lines 48. When signals are applied to control lines 48 and 49 of the argument register 32, as aforesaid, signals also are applied to the control lines 52, FIG. 8D, for setting the bistable elements 53 of argument mask 46 which are in the field or fields being matched on. All of the bistable elements 53 have previously been reset by a signal applied simultaneously to all the lines 51. The signals on lines 52 are then effective to set the bistable elements 53 for the desired fields to their 1 state. As a further preliminary operation, a signal is applied through line 54 to set all of the match indicator MI flip-flops 55 (FIG. 8B) to their 1 state. When a signal is applied to the associate line 57, FIG. 8D, the contents of the argument bit-storing elements 50 are read out through lines 56 to bistable elements 53 which store the bits of the argument mask 46. Those bit-storing elements 53 of the argument mask which are set to 1 will pass the information applied thereto through lines 58 to the corresponding bistable bit-storing element 60 (FIG. 8C) in each word or row of the associative memory 16. As long as the contents of each word-bit element 60 are the same as the contents of the corresponding argument bit element 50, associative memory AM generates no outputs. However, when the binary signal applied through a line 58 to a word-bit element 60 differs from the bit actually stored in element 60, the element 60 generates an output signal on the corresponding mismatch line 62. The signal on line 62 is applied to reset the corresponding match indicator flip-flop 55 to its 0 state.

Readout of a matching word is accomplished as follows:

Match indicators 55 (FIG. 8B) are interrogated by a signal applied to line 64. The signal on line 64 is applied as one input to AND gates 66 and 84 for the first word in the associative memory. The other input to AND gate 66 is the 0 output of flip-flop 55 and the other input to AND gate 84 is the 1 output of flip-flop 55. If flip-flop 55, for the topmost word in the Associative Memory, is in its 1 state, the signal on line 64 will pass through AND gate 84 via wire 88 and be applied to the OR gate 90 for the topmost word in the associative memory. If flip-flop 55, for the topmost word in the associative memory, is in its 0 state, the signal on line 64 will pass through AND gate 66 and will be applied to AND gates 66 and 84 for the next lower word in the associative memory. If all flip-flops 55 are in their 0 state, the signal on line 64 will appear on line 72 and set the EOL flip-flop to its 1 state.

Information may be either read out of or written into a word in associative memory 16 under control of match indicator flip-flops 55. For a write operation, a signal is applied through line 74 to one input of each of the AND gates 76 (FIG. 8B), and for a read operation a signal is applied through line 78 to one input of each of the AND gates 80. The signal on the interrogation line 64, FIG. 8B, is applied to one input terminal of an AND gate 84 associated with the topmost word in the associative memory AM. A similar AND gate 84 is associated with each of the other words in the memory AM, and one input of each AND gate 84 in the latter group is connected by conductor 70 to the output of the AND gate 66 associated with the preceding word. The other input terminal of each AND gate 84 is connected by a conductor 86 to the number 1 output terminal of the match indicator 55 associated with the same word in the associative memory AM. Of those AND gates 84, FIG. 8B, which are being conditioned by 1 output signals from their respective match indicators 55 at the time when a signal is applied to the interrogate line 64, only the topmost one of these conditioned AND gates 84 is effective to pass a signal from line 84 through an associated output line 88, OR gate 90 and line 92 to the second input terminal of each of the corresponding AND gates 76 and 80. If a write operation is being performed, the corresponding AND gate 76 is conditioned to generate an output signal on line 94, which signal is effective to permit the contents of MDR 20 (FIG. 9E), for those fields which have 1 bits stored in write mask 47, to be written into the bit-storing elements 60 of the corresponding word in associative memory 16. Write mask 47 is thus effective to determine which fields of a word in associative memory AM will be written into during a write operation. If there is a signal on read line 78 at the time a signal appears on line 64, the corresponding AND gate 80 (FIG. 8B) is fully conditioned to generate an output signal on line 96 which is effective to cause the contents of the corresponding word in associative memory 16 to be read out through lines 97 into MDR 20.

The controls 34 shown in FIGS. 8A and 8B also include a pointer flip-flop 98 (FIG. 8A) for each word in the associative memory AM. An initializing signal is applied to line 101 to set the pointer flip-flops to an initial condition wherein the pointer flip-flop for the first word is in its 1 state and the pointer flip-flops for the remaining words are in their 0 state. Specifically, this is accomplished by applying the signal on line 101 through OR gate 102 to the 1 input side of the pointer flip-flop for the first word and through OR gates 104 for each of the remaining words in the associative memory to the 0 input side of the corresponding pointer flip-flop. The initial reset signal is applied to line 101 at the beginning of a machine run and is not thereafter repeated while the same program is in process.

When it is desired to change the setting of the pointer flip-flops, a conditioning signal is applied through line 106 to one input of the AND gate 108 (FIG. 8A) for each word in the memory. The other input of each of the AND gates 108 is supplied by the output line 110 from the 1 side of the corresponding pointer flip-flop. Since only one of the pointer flip-flops is in its 1 state at any given time, only one of the AND gates 108 will be fully conditioned by the signal on line 106 to generate an output signal on corresponding output line 112. The signal on an output line 112 from AND gate 108 of a given word position is applied as one input to AND gates 114 and 116 of the next following word position. It is seen that this is a closed loop with the output line 112 from AND gate 108 for word N constituting one input to AND gates 114 and 116 for the first or topmost word. The other inputs to AND gates 114 and 116, respectively, are output line 68 from the 0 side and output line 86 from the 1 side of the corresponding match indicator 55. Output line 118 from AND gate 114 is connected as one input to AND gate 120, the other input to this AND gate being output line 122 from the 0 side of the corresponding pointer flip-flop 98. AND gate 120 shares output line 112 with AND gate 108 for each word position. Output line 124 from each of the AND gates 116 is connected to the 1 input side of corresponding intermediate flip-flop 126.

The effect of the connections just described is to permit a signal applied to line 106 to pass through the AND gate 108 for the position having its pointer flip-flop 98 in its 1 state to the corresponding line 112. The signal on line 112 is applied to AND gates 114 and 116 for the following word position. If the match indicator for that word position is in its 0 state, the signal propagates through AND gate 114, line 118, AND gate 120 and line 112 for that word to AND gates 114 and 116 for the next following word. The signal propagates in this manner until a word is reached for which the corresponding match indicator is in its 1 state. When this word is reached, the corresponding AND gate 116 is fully conditioned to generate an output signal which is applied to set the corresponding intermediate flip-flop 126 to its 1 state. If the pointer shift signal is applied to line 106 at a time when the lowermost pointer flip-flop 98, FIG. 3A, is set to 1, or if this shift signal is propagated to the lowermost gate 114 at a time when both the lowermost pointer flip-flop 98 and the lowermost match indicator 55 (FIG. 3B) are in their 0 states, the shift signal then is propagated to the uppermost gates 114 and 116, FIG. 8A.

The signal on line 106 is followed by a signal on line 130. The signal on line 130 is applied to condition each of gates 132 (FIG. 8A) to transfer the contents of the corresponding flip-flop 126 into the corresponding pointer flip-flop 98. This effectively resets the pointer flip-flop corresponding to that one of the intermediate flip-flops 126 which was set to its 1 state by the signal on line 106, so that said pointer flip-flop is set to its 1 state. The pointer-change operation is completed by a signal applied from any of several sources through OR gate 250, FIG. 9B and line 134 to reset all the intermediate flip-flops 126 to their 0 state. It is possible for the pointer to be completely recycled back to its starting word position, if no other matching word can be found.

Just as a read or write operation may be controlled by the match indicator flip-flops 55 in a manner previously described, the read and write operations may also be controlled by the pointer flip-flops. In order to accomplish this, the desired read or write input is applied to the appropriate line 74 or 78 at the same time that a signal is applied to access under control of pointer flip-flops line 136. The signal on line 136 is applied as one input to AND gates 138 (FIG. 8B), the other input to each of these AND gates being output line 110 from the 1 side of the corresponding pointer flip-flop 98. Since only one of the pointer flip-flops will be in its 1 state at any given time, only one of the AND gates 138 will generate an output signal when a signal is applied to line 136. The signal on output line 140 from that AND gate is applied through the corresponding OR gate 90 to energize the appropriate AND gate 76 or 80 to cause the desired write or read operation to be performed in a manner identical to that previously described for an access under control of match indicator flip-flops 55.

When the associative memory initially is being loaded, the topmost pointer flip-flop 98, (FIG. 8A), is set to 1, while the other pointer flip-flops 98 are set to 0. Under these conditions, the first word to be loaded into the associative memory actually will be entered into the second row or word address in that memory. The second word will be loaded into the third address, and (if we assume that the associative memory is limited to a capacity of three words) the third word will enter the first address or position in the associative memory. Correspondingly, the first block to be stored in the working memory WM, FIGS. 1 and 9C, actually will be entered into the second block address; the second block will be loaded into the third address or position, and the third block will enter the first address or position in the working memory WM. These relationships will be more graphically illustrated hereinafter when the operations of the system are described in detail.

Circuit Diagram

FIGS. 9A through 9K, when assembled in the manner designated by FIG. 9, constitute a circuit diagram of a system embodying the present invention. The disclosed system embodies both the replacement algorithm disclosed in the aforesaid Nelson Pat. application, Ser. No. 859,784, filed Sept. 22, 1969, and the efficiency measurement algorithm which constitutes the subject matter of the present invention. Those portions of the overall system which relate particularly to the Nelson replacement algorithm are controlled by a T clock 198, FIG. 9A, which has a plurality of timing pulse generators or single-shots individually designated as TO–T37 to correspond with their respective outputs. Each of the single-shots TO–T37 generates a signal on an output line 200—237 respectively when it is set. When the single-shot switches from its set to its reset state (i.e., when the single-shot "times out"), it generates a "not" signal (e.q., $\overline{T4}$). In some instances, these "not" signals appear on "time-out" lines such as 204' leading from the clock 198. In other instances, they are utilized internally of the clock only. In order to simplify the drawings, no attempt has been made to connect the outputs from clock 198 to the various points in the system where they are utilized. Instead, at each point in the system where a clock line is utilized, a line appears with the number and letter designations for the appropriate clock line.

In most instances, when a single-shot in clock 198 times out, the single-shot following it is set. In some instances, however, a single-shot is set by an output signal from some point in the system. These signals have been shown as inputs to the left side of the clock 198, FIG. 9A. The internal connections of clock 198 are functionally described in the aforesaid Nelson application, Ser. No. 859,784, to which reference is made for a more complete understanding thereof.

Those portions of the disclosed system that uniquely embody the efficiency measurement algorithm with which the present invention is particularly concerned are identified by various timing signals or process steps bearing the prefix ME, FIGS. 6, 7 and 9E—9K. The clock for generating these signals is not shown herein, but it would be similar to the clock 198, FIG. 9A, described hereinabove. That is to say, various pulse generators or single-shots in this clock will generate the ME pulses in a sequence which is in part predetermined beforehand and in part determined by the particular conditions encountered during the operation of the system. The functions of the ME clock signals or process steps will be explained as the description proceeds and also will be summarized hereinafter.

Referring now to FIGS. 9A—9E, it is seen that the system of the preferred embodiment of the invention includes as basic elements a central processing unit CPU, FIG. 9A, a high-speed, low-capacity, working memory WM, FIG. 9C, which could be a core memory, and an associative memory AM (FIG. 9D). Backup store BS (which may, for example, be an IBM 1301 disc file) communicates with working memory WM (which could be the high-speed magnetic core memory associated with any digital computer system) through channel CH. Channel CH, which includes a variety of controls, would, for example, be the channel of the IBM 7040 computer system, where this is the CPU being used, or any of a variety of other channel devices which are capable of performing the required buffering and control functions. The channel CH accepts the serially applied information from the low-speed store BS, assembles the bits into words, and applies these words in parallel to working memory WM. The channel is also capable of accepting words in parallel from memory WM and of applying the bits thereof serially to backup store BS. The channel also contains control circuitry for suitably incrementing the addresses from which information is being taken or to which information is being applied and for indicating when the transfer of a block of information has been completed.

Associative memory AM, FIG. 9D, has an entry of word storage row for each of the block positions in core memory WM. Each of these entries contains eight fields, which are illustrated in memory data register MDR 20, FIG. 9E. Reading from left to right these fields are: a 1-bit R' field (the function of which has been explained above); a 1- bit L field, which also has been referred to hereinabove; a 1-bit SS (serial search) field (the function of which will be explained subsequently); a 1-bit AL field (alteration field) which is set to 1 each time the corresponding block in core memory WM has its contents altered; a 1-bit R (reference) field, which is set to 1 each time the corresponding block in core memory WM is utilized and is reset to 0 when all of the entries in the associative memory AM have their R fields set; an ID field which identifies the program in the central processor CPU with which the block in the corresponding position in core memory WM is associated; the block address in backup store BS for the block in the corresponding block position in core memory WM; and the block address in core memory WM which the entry corresponds to. The rightmost field of each entry in associative memory WM may be read but not written into. The other fields in associative memory AM may be altered from time to time in a manner to be described later.

The central processing unit CPU, FIGS. 1 and 9A, starts the operation by requesting an information block from memory WM. When this occurs, the program ID and the address of the requested block in backup store BS are applied through lines 22 to address register 24 (FIG. 9B), and a signal is applied by CPU through either line 26 or line 28 to suitably set the alteration flip-flop 30. Flip-flop 30 is set to its 1 state if the word sought is to be altered.

After the preliminary loading operations have been completed, the system is ready to perform step 500 of FIGS. 6 and 7. During this step a determination is made as to whether the block containing the word which it is desired to utilize is stored in working memory WM (FIG. 9C). Such determination is accomplished by reading the ID and block number information from register 24 (FIG. 9B) into the appropriate fields of argument register 32 (FIG. 9J) of associative memory AM and performing an associate operation on these fields to determine if this ID and block number are contained in the associative memory. To briefly review the associate operation, associative memory controls 34 (FIGS. 9D, 8A and 8B) contain a bistable match indicator 55 (FIG. 8B) for each entry in the memory. The match indicators are all set to 1 prior to an associate operation. The fields in argument register 32 which are being matched on are then applied to associative memory AM and compared against the corresponding fields in each entry therein. Each mismatch causes the corresponding match indicator 55 in controls 34 to be reset. The match indicators 55 are then interrogated, and end-of-line EOL flip-flop 36 is set to 1 if all the match indicators are reset to 0. If no match is found in the associative memory AM on the indicated ID and block information, this indicates that the required block is not in core memory WM, and the circuit proceeds to perform step 501 of FIGS. 6 and 7. The steps which are performed if the required block is found in core memory 14 will be described later.

The actions which occur within step 501 will be described in considerable detail hereinafter when an illustrative problem is considered. For the present, it will suffice to explain that such actions are governed by the ME operational controls designated adjacent to the box 201 in FIGS. 6 and 7. After step 501 is completed, the process advances to step 510, FIG. 7.

During step 510 of the operation, FIG. 7, a determination is made as to whether there are entries in associative memory AM (FIG. 9D) for which the bits in both the A and the R fields are 0. The R bit of such an entry being 0 indicates that this entry has not recently been utilized. The A bit of the entry being 0 indicates that the entry has not been altered during its residence in core memory. From previous discussion it is apparent that a block for which these characteristics exist is a prime candidate for replacement. Step 510 is performed by setting both the A and R fields in argument register 32 (FIG. 9J) to 0 and performing an associate operation in associative memory controls 34 corresponding to each entry in the associative memory having both a "0" A field and a "0" R field, and to reset any other match indicator to 0. If there are no entries with "0" A and "0" R fields, end-of-line flip-flop 36 is set to its 1 state at tee end of the associate operation.

Assume initially that there is at least one entry in associative memory AM for which both the A and R bits are 0. Under these conditions the system proceeds from step 510 (FIG. 7) to step 511. Since it is possible that there will be more than one entry in the associative memory having 0 bits in both their A and R fields, it is necessary to provide an additional criterion to select, from among these entries, the entry whose corresponding block is to be replaced. This selection is performed during step 511 of the operation. To review this operation briefly, there is a pointer flip-flop 98, FIG. 8A, in associative memory controls 34 for each entry in associative memory AM. All of the pointer flip-flops 98 are reset except the one corresponding to the last block that was replaced in memory WM. During step 511 of the operation, a search is started, beginning with the entry following that for which the pointer flip-flop is set, to find an entry for which the match indicator 55 in controls 34 is set. When the entry is found, the pointer flip-flop for this entry is set and the pointer flip-flop which was set is reset, provided it is not at the matching word position. (It is possible under some circumstances for the matching word search to end at the same word position from which it started, as has been noted hereinabove).

From step 511 of the operation, the circuit proceeds to step 512, FIG. 7, to cause the block in working memory WM corresponding to the entry selected in associative memory AM during step 511 to be replaced. This is accomplished by reading the core block address of the selected entry into core address register CAR 38, FIG. 9C, by reading the ID and block information for the new block which is to be applied to working memory WM from register 24 (FIG. 9B) into replacement address register RAR 40, FIG. 9C, and by applying a "replace" input signal to channel CH. The effect of these inputs on channel CH is to cause the channel to read the block of information starting at the address indicated in RAR 40 into working memory WM at addresses beginning at the address indicated in CAR 38. When a complete block of information has been transferred, this fact is indicated (in a manner to be described later) by channel CH. When step 512 of the operation has been completed, the operation returns through flow line 1007, FIG. 7, to step 500.

Assume now that during step 510 of the operation, a determination was made that there are no entries in associative memory AM for which both the A and R bits are 0. Under these conditions, the system proceeds from step 510 to step 513. In the algorithm on which the system is based, utilization is the prime replacement criterion and alteration is only an additional criterion. Therefore, if no entry can be found for which both the A and R bits are 0, an entry is selected for which the A bit is 1 and the R bit 0. Since, as will be seen presently, when all of the R bits are 1, the R-bit fields for all the entries in associative memory AM are reset to 0, there will always be at least one entry having a "0" R bit. Step 513 of the operation is accomplished substantially in the same manner as step 510 with the exception that argument register 32 is initially loaded with a 1 bit in the A field and a 0 bit in the R field. An associate operation is then performed, with the result that the match indicators in controls 34 for entries having a 1 bit in the A field and a 0 bit in the R field being left in their 1 state, while the other match indicators are reset to 0.

From step 513, the system proceeds to step 514 (FIG. 7) of the operation. Since it is possible that more than one match indicator will be set during step 513 of the operation, step 514 is required in order to make a final determination as to which block in working memory WM is to be replaced. The pointer flip-flops 98 in controls 34 are utilized to perform step 514 of the operation in a manner identical to that previously described for step 511 of the operation. The operation will therefore not be described again at this point.

From step 514, the system proceeds to step 515 (FIG. 7). Since the block which has now been selected for replacement in working memory WM has been altered during its residence therein, it is necessary to rewrite this block into backup store BS (FIG. 9C) before replacing it. Therefore, during step 515 of the operation, a rewrite and replace operation are performed. In performing step 515, the address of the selected block position in working memory WM is read into CAR 38, FIG. 9C, the address in backup store BS at which the block of information presently stored in the selected core block is to rewritten (which address is obtained from associative memory AM) is read into write address register WAR 42, the address in backup store BS of the new block which is to be read into working memory WM is read into RAR 40, and a signal is applied to the "rewrite and replace" input terminal of channel CH. The channel then functions in a standard fashion to rewrite the block of data from the selected block in working memory into backup store BS at an address beginning with the address in WAR 42 and to then read the block of data starting at the address indicated in RAR 40 into the selected block in working memory WM. When the complete block has been written into core memory WM, the channel CH generates an output signal indicating the end of step 515 of the operation and causing the system to return via flow line 1007 (FIG. 7) to step 500.

Assume now that during step 500 of the operation a determination is made that the desired block is now stored in working memory WM. This determination may be made either initially when the request for information is made by the CPU, or it may arise as a result of the block of information being read into working memory WM during step 512 or 515 (FIG. 7) of the operation. When the desired block is found in working memory WM during step 500 of the operation, the system may proceed simultaneously to perform steps 503, 504 and 505 of the operation, FIG. 6. During step 503 of the operation, the block address in working memory WM at which the desired block of information is stored and the L bit value of the associated word in memory AM (now registered in memory data register MDR, FIG. 9E) are entered into a HOLD register, FIG. 9F, for possible future reference. During step 504, FIG. 6, the block address in memory WM of the requested block is read from register 24 (FIG. 9B) into the left-hand portion of memory address register MAR 44, FIG. 9C, and the particular address within the block is read from register 24 (FIG. 9B) into the right-hand portion of MAR 44. The processor CPU may now retrieve the desired word from working memory WM and utilize it as required.

When the word associated with a block stored in working memory WM is utilized, certain housekeeping operations on the A and R fields of the corresponding entry in associative memory AM (FIG. 9D) are required. These housekeeping operations are performed during steps 516—520 (FIG. 7) of the operation. During step 516 of the operation the reference R bit for the entry corresponding to the block whose word was just utilized is set to 1. This is accomplished by setting the R field of the associative memory data register MDR 20, FIG. 9E, to 1 and then writing only this field into the proper entry in the associative memory in the manner described above.

From step 516 the system proceeds to step 517 of the operation. During step 517 of the operation, alteration flip-flop 30, FIG. 9A is interrogated to determine if the block just utilized was altered. The alteration flip-flop is set to its 1 state prior to the start of the operation if the block is to be altered. If the block is not altered, the system proceeds directly to step 519 of the operation, FIG. 7. If the block has been altered, the system proceeds to step 518 of the operation. During step 518 the alteration bit for the entry in associative memory 16 corresponding to the block just utilized in core memory WM has its alteration bit (i.e., A field) set to 1. This is accomplished by setting a 1 bit into the A field of MDR 20, (FIG. 9E) and writing this field into the selected entry in associative memory AM, as explained above.

From step 518 the operation proceeds to step 519, FIG. 7. During step 519 a determination is made as to whether all of the reference R bits are set to 1. This is accomplished by setting the R field of argument register 32 (FIG. 9E) to 0 and associating on this field in associative memory AM. If no matches are found during this associative operation, it means that all of the R bits are set to 1. From previous discussion it will be remembered that, if all the R bits are set to 1, these R bits then are to be reset to 0. Therefore, when this occurs, the system proceeds from step 519 to step 520 of the operation. During step 520, a signal T13 is applied to associative memory AM, FIG. 9D, to reset the R fields of all of the entries therein to 0. When step 520 has been completed, an ME1 signal is applied through line 1002, FIGS. 7 and 9A, to an output gate for the HOLD register, FIG. 9F. The same action also occurs directly if, during step 519, FIG. 7, a determination is made that all the R reference bits are not set to 1. In either case, the action progresses next to step 506, FIG. 6, which commences with a test to determine whether the L bit associated with the block that is being referenced has been set to 1.

In the foregoing description attention has been given primarily to the actions that take place within the major steps 500, 502, 503, 504, and 505, FIGS. 6 and 7, of the replacement procedure. Consideration of what occurs within the major steps 501 and 506, which relate more to the efficiency measurement procedure, will be deferred until some practical examples are presented for analysis hereinafter. Before proceeding to a consideration of these illustrative examples, a description will be presented of certain elements shown in FIGS. 9F, 9H, 9I and 9K that do not have counterparts in the above-mentioned Nelson application and which are unique to the present system.

Mention already has been made of the register HOLD shown in FIG. 9F, which stores the L bit value and block number of the block that currently is being referenced in the working memory WM. Also shown diagrammatically in FIG. 9F are the counters P, R and Q, which respectively maintain counts of the actual number of block transfers P, the unnecessary block transfers U, and the "uncertain" or "questionable" transfers Q (use of the last-mentioned count being illustrated by an example hereinafter). An F flip-flop, the function of which will be explained, also is shown in FIG. 9F.

Figure 9K:
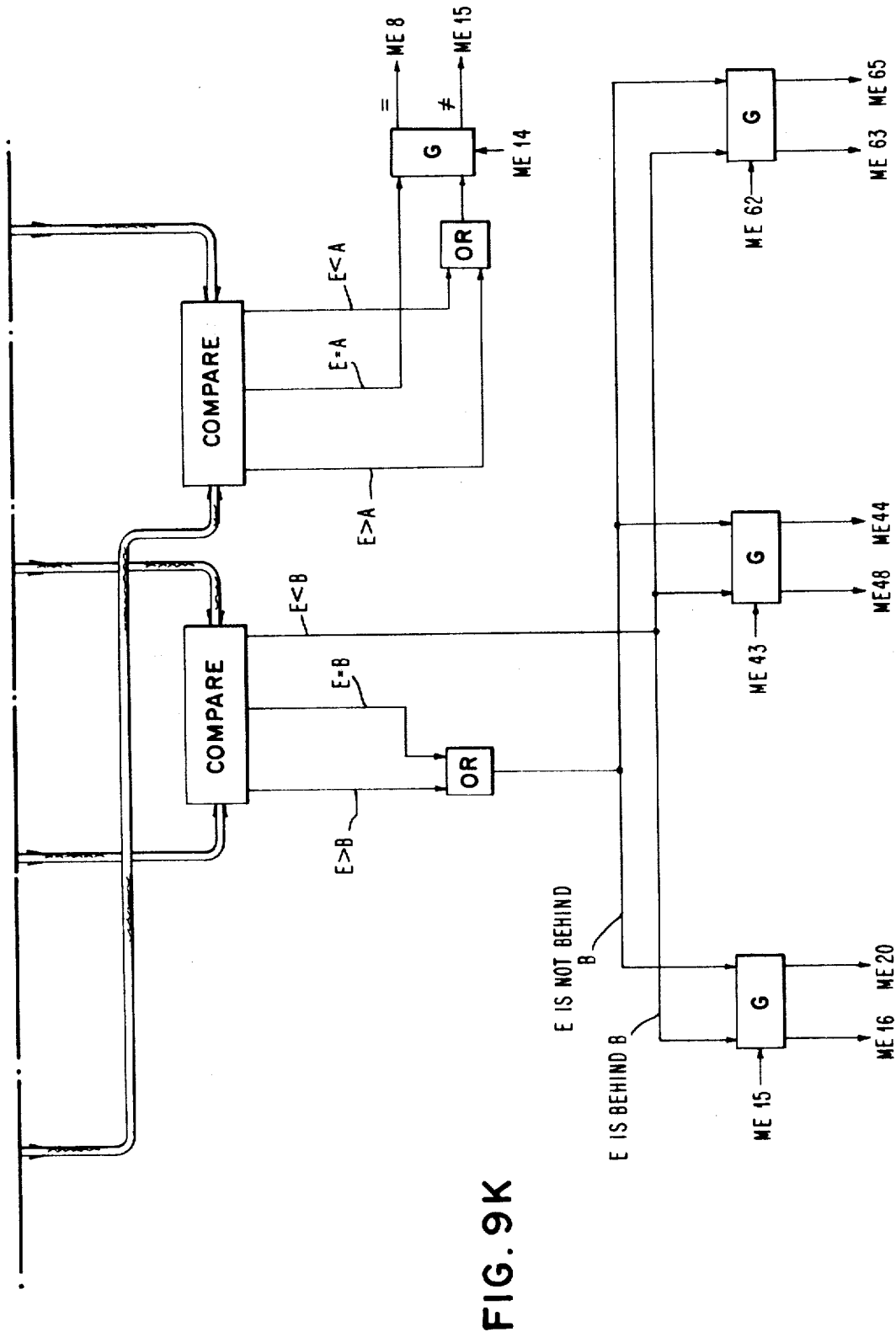

Registers A and B, FIG. 9I, are adapted to register the current values of the variables A and B, respectively. Register A is a counter which is incremented each time a new interval is defined in the optimal sequence of operations. Register B has an initial setting of 1 and is reset to a new value each time a "-complete set" is defined in the optimal sequence. In FIGS. 9H and 9I, the tables which store the C and E values are themselves labeled C and E, respectively, for ready identification. The sense in which the symbols C and E are used herein will be apparent from the context. The C and E tables are multiple-entry registers, the respective entries of each such table being addressable by a decoder for both input and output purposes. The decoder for table C is set under the control of a register Y. In other words, register Y "addresses" Table C. Similarly, a register X addresses the table E. The settings of the X and Y registers will be referred to hereinafter as X and Y "pointers." The output of table C is fed to a register DEC the setting of which may be selectively decremented under certain conditions as hereinafter described. Whenever the DEC setting reaches zero, the contents of register Y are gated to register B for a purpose to be described. Various "compare" units illustrated in FIGS. 9H and 9K are provided for making comparisons among the values of E, A, B, and Y for reasons that will be explained.

Figure 10:
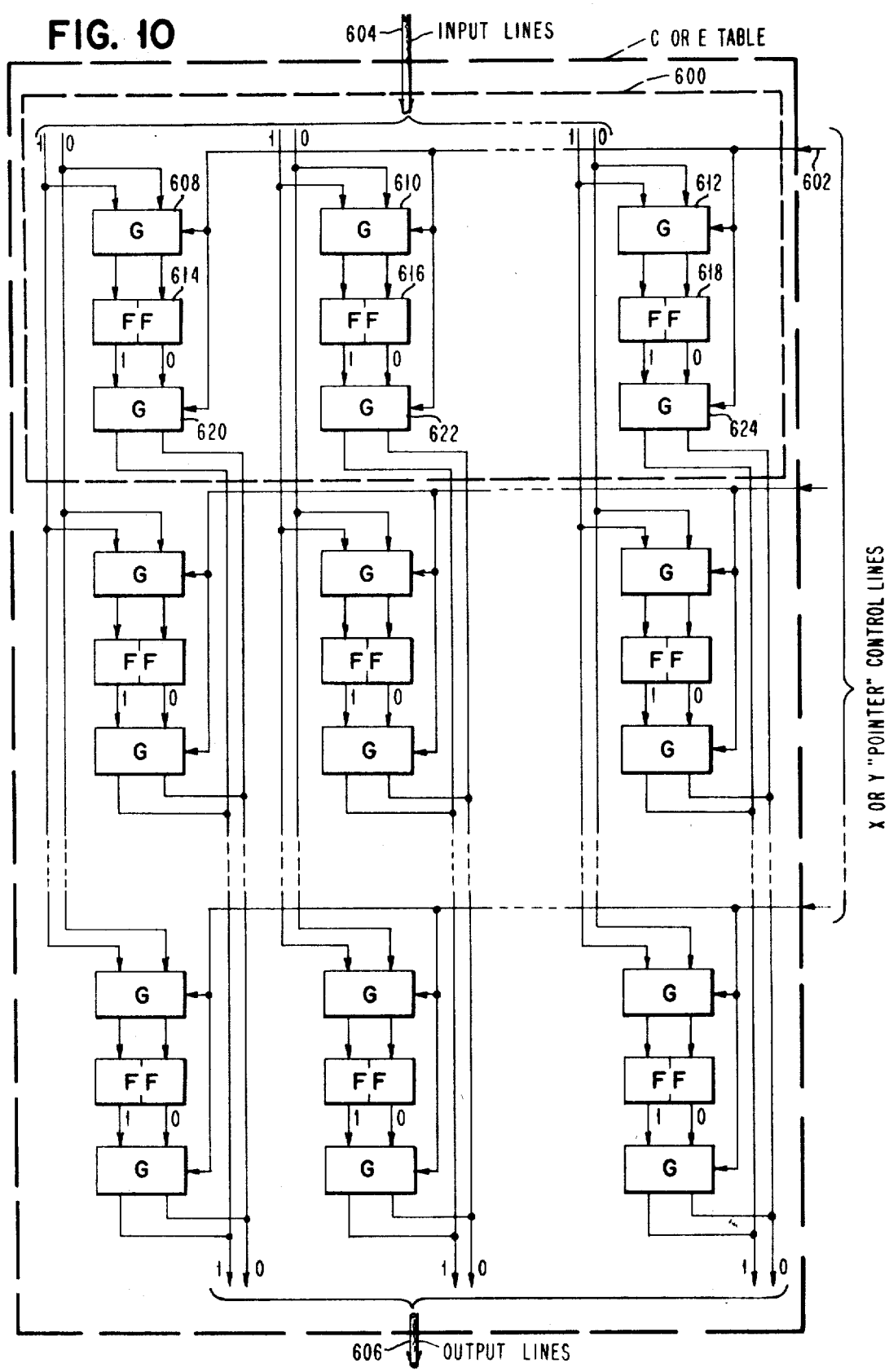
FIG. 10 is a circuit diagram showing a type of storage table that is employed in the aforesaid system.

FIG. 10 illustrates in detail the construction of the C table or the E table, these two tables being of substantially identical construction. Each of these tables consists of a plurality of registers, the number of registers depending upon the number which can be contained in either register Y (in FIG. 9H) or register X (In FIG. 9I). Referring to FIG. 9H, it will be noted that the setting of register Y is decoded by the decoder shown in FIG. 9H, this decoder having a plurality of output lines equal in number to the maximum number of the just-mentioned registers. For example, if register Y is adapted to contain a 3-bit binary number, the decoder then will have eight output lines. In actual practice, the number of output lines could be greater. For convenience, the registers in table C are hereinafter identified by the addresses 1, 2, 3, etc., to correspond with the significant settings that can be assumed by the register Y, the zero setting of Y having no significance. In table E, the addresses of the respective registers correspond with block numbers registered in register X.

FIG. 10 shows in detail three registers such as the one labeled 600 in FIG. 9H. The "pointer" control line labeled 602, FIGS. 9H and 10, coming in this instance from the Y decoder, is energized when it is desired to connect the register 600 to both the input lines 604 and the output lines 606 of table C. Referring to FIG. 10, it will be noted that if line 602 is active, the gates 608, 610 and 612 will be enabled in order to permit the input lines in cable 604 to set the flip-flops 614, 616 and 618. In this manner, the "pointer" control line 602 is effective to connect the flip-flops such as 614, 616 and 618, which are exemplary of the flip-flops that comprise register 600, to the input line 604. Also referring to FIG. 10, it will be noted that line 602 is effective to enable the gates 620, 622 and 624. In this manner, the contents of the flip-flops 614, 616 and 618 are placed on the output lines 606. The E table is essentially the same as the C table, although the number of registers in the E table may be different from the number of registers in the C table.

As mentioned above, the ME clock stages, the respective outputs of which are referred to in the circuit diagram, FIGS. 9A—9K, control the timing and sequence of the various steps in the efficiency measurement process. The ME clock is not shown in detail herein, being similar to the T clock, FIG. 9A, which controls the block replacement procedure. Below are listed the various ME functions, each of which is initiated by an appropriate ME pulse as indicated. These ME functions are depicted also in the flow chart, FIGS. 11A—11D:

ME1: Test L bit in HOLD register, FIG. 9F.
If L=0, go to ME 32.
If L=1, go to ME 2.
ME2: Set F flip-flop to 1, FIG. 9F.
Decrement counter U, FIG. 9F.
Reset argument mask 46, FIG. 9E.
Reset write mask 47, FIG. 9G.
Set all match indicators to 1 (line 54, FIGS. 9B & 9D).
Gate block number from HOLD register, FIG. 9F, to block number field of argument register 32, FIG. 9J.
When ME2 times out, go to ME3.

ME3: Set block number field of argument mask 46 to all 1's, FIG. 9E.
When ME3 times out, go to ME4.
ME4: Associate on block number stored in argument register 32, FIG. 9J.
When ME4 times out, go to ME5.
ME5: Interrogate match indicators (lines 64 & 78, FIGS. 9B & 9D). Read matching word from AM to MDR, FIGS. 9D & 9E.
Go to ME6.
ME6: Reset L bit in MDR to 0, FIG. 9E.
Set L bit in write mask to 1, FIG. 9G.
Go to ME7.
ME7: Write L bit (now 0) in MDR back into matching word in AM (lines 64 & 74, FIGS. 9B & 9D).
Go to ME8.
ME8: Reset argument mask, FIG. 9E.
Reset write mask, FIG. 9G.
Set all match indicators to 1 (line 54, FIGS. 9B & 9D).
Reset EOL (end of line) flip-flop to 0.
Go to ME9.
ME9: Set R' bit in argument register to 1, FIG. 9J.
Set R' bit in argument mask to 1, FIG. 9E.
Set R' bit in write mask to 1, FIG. 9G.
Go to ME10.
ME10: Associate on R' bit = 1, FIG. 9J.
Go ME11.
ME11: Interrogate match indicators (lines 64 & 78, FIGS. 9B & 9D). Read matching word from AM to MDR, FIGS. 9D and 9E, or if no matching word, set EOL flip-flop to 1.
Go to ME12.
ME12: Test EOL flip-flop, FIG. 9D.
If setting is 0, go to ME13.
If setting is 1, go to ME27.
ME13: Reset R' bit in MDR to 0, FIG. 9E.
Gate block number from MDR to register X, FIGS. 9E, 9F & 9I.
Go to ME14.
ME14: Write the R' bit (now 0) back into the top matching word in AM (lines 64 & 74, FIGS. 9B & 9D).
Test output of compare unit FIG. 9K to determine whether E=A.
If E=A, go to ME8.
If E≠A, go to ME15.
ME15: Test output of compare unit, FIG. 9K, to determine whether E is behind B.
If "no" go to ME20.
If "yes" go to ME16.
ME16: Increment counter Q, FIG. 9F.
Increment register A, FIG. 9I.
Go ME17.
ME17: Gate the contents of register A to register Y, FIGS. 9I and 9H.
Go ME18.
ME18: Gate (N−1) to input lines of C table, FIG. 9H.
Go ME19.
ME19: Gate contents of register A to input lines of E table, FIG. 9I.
Go to ME8.
ME20: Gate contents of register A to register Y, FIGS. 9I 7 9H.
Go to ME21.
ME21: Test output of compare unit, FIG. 9H, to determine whether Y=E.
If Y=E, to to ME19.
If Y≠E, go to ME22.
ME22: Gate output of C table to register DEC, FIG. 9H.
Go to ME23.
ME23: Decrement the setting of register DEC, FIG. 9H.
Go to ME24.
ME24: Gate setting of register DEC to input lines of C table and test to determine whether DEC setting = 0, FIG. 9H.
If DEC=0, go to ME25.
If DEC≠0, go to ME26.

ME25: Gate contents of register Y to register B, FIGS. 9H & 9I.
Go to ME19.
ME26: Decrement register Y, FIG. 9H.
Go to ME21.
ME27: Test F flip-flop, FIG. 9F.
If F=0, go to ME42.
If F≠0, go to ME28.
ME28: Increment register A, FIG. 9I.
Go to ME29.
ME29: Gate contents of register A to register Y, FIGS. 9I & 9H.
Go to ME30.
ME30: Gate block number from HOLD register to register X, FIGS. 9F & 9I.
Go to ME31.
ME31: Gate contents of register A to input lines of E table, FIG. 9I.
Gate (N–1) to input lines of C table, FIG. 9H.
Go to ME32.
ME32: Reset argument mask, FIG. 9E.
Reset write mask, FIG. 9E.
Set all match indicators to 1 (line 54, FIGS. 9B & 9D).
Gate block number from HOLD register to block number field of argument register, FIGS. 9F & 9J.
Go to ME33.
ME33: Set block number field of argument mask to all 1's, FIG. 9E.
Go to ME34.
ME34: Associate on block number stored in argument register 32, FIG. 9J.
Go to ME35.
ME35: Interrogate match indicators (lines 64 & 78, FIGS. 9B & 9D). Read matching word from AM to MDR, FIGS. 9D & 9E.
Go to ME36.
ME36: Set R' bit in MDR to 1, FIG. 9E.
Set R' bit in write mask to 1, FIG. 9G.
Go to mE37.
ME37: Write R' bit (1) in MDR back into matching word in AM (Lines 64 & 74, FIGS. 9B & 9D).
Go to END (place pulse on line 1008, FIG. 9A for signalling the CPU to initiate the next memory request).
(ME38 through ME41 not used in the present embodiment)
ME42: Gate currently requested block number from register 24 to register X, FIGS. 9B, 9F, & 9I.
Go to ME43.
ME43: Test output of compare circuit in FIG. 9K to determine whether E is behind B.
If "no" go to ME44.
If "yes" go to ME48.
ME44: Gate contents of register A to register Y, FIGS. 9I & 9H.
Go to ME45.
ME45: Test output of compare circuit, FIG. 9H, to determine whether Y=E.
If Y=E, go to ME47.
If Y=E, go to ME51.
(ME46 not used in this embodiment.)
ME47: Increment counter U, FIG. 9F.
Gate contents of register A to input lines of E table, FIG. 9I.
When ME47 times out, return to step 502, FIG. 6, of the actual replacement algorithm via the line 1006, FIGS. 6 & 9A.
This initiates operation of the single-shot T16 in the T clock 198, FIG. 9A.)
ME48: Increment register A, FIG. 9I.
Go to ME49.
ME49: Gate contents of register A to register Y, FIGS. 9I & 9H.
Go to ME50.
ME50: Gate (N–1) to input lines of C table, FIG. 9H.
Gate contents of register A to input lines of E table, FIG. 9I.
Return to step 502, FIG. 6, via line 1004, FIGS. 6 & 9A.

(This initiates operation of the single-shot T16 in the T clock 198, FIG. 9A.)
ME51: Gate C table output to register DEC, FIG. 9H,
Go to ME52.
ME52: Decrement setting of register DEC, FIG. 9H.
Go to ME53.
ME53: Gate setting of register DEC to input lines of C table, FIG. 9H.
Test to determine whether DEC setting = 0, FIG. 9H.
If DEC=0, go to ME55.
If DEC=0, go to ME54.
ME54: Decrement register Y, FIG. 9H.
Go to ME45.
ME55: Gate contents of register Y to register B.
Go to ME56.
ME56: Reset argument mask, FIG. 9E.
Reset write mask, FIG. 9G.
Set match indicators to 1 (line 54, FIGS. 9B & 9D).
Reset EOL flip-flop to 0.
Set all SS bits in AM to 1, FIG. 9D.
Go to ME57.
ME57: Set SS bit in argument register to 1, FIG. 9J.
Set SS bit in argument mask to 1, FIG. 9E.
Set SS bit in write mask to 1, FIG. 9G.
Go to ME58.
ME58: Associate on SS bit stored in argument register, FIG. 9J.
Go to ME59.
ME59: Interrogate match indicators (lines 64 & 78, FIGS. 9B & 9D), read topmost word from AM to MDR, FIGS. 9D & 9E, or if no matching word, set EOL flip-flop to 1, FIG. 9D.
Go to ME60.
ME60: Test EOL flip-flop setting. If 0, go to ME61; if 1, go to ME47.
ME61: Gate block number of matching word from MDR to register X, FIGS. 9E, 9F & 9I.
Go to ME62.
ME62: Test compare circuit, FIG. 9K, to determine whether E is behind B. If "yes" go to ME63, if "no" go to ME65.
ME63: Reset SS bit in MDR to 0, FIG. 9E.
Set L bit in MDR to 1, FIG. 9E.
Set L bit in write mask to 1, FIG. 9G.
Go to ME64.
ME64: Write word in MDR back into AM (lines 64 & 74, FIGS. 9B & 9D).
Go to ME57.
ME65: Reset SS bit in MDR to 0, FIG. 9E. Reset L bit in write mask to 0, FIG. 9G.
Go to ME64.
ME66: Reset F flip-flop to 0, FIG. 9F.
Increment counter P, FIG. 9F.
Go to ME8.
(ME66 is activated only when the requested block is not in the working memory, FIGS. 11A & 6, at which time an updating operation is to be performed as specified in step 501, FIG. 6.)

This completes the listing of the ME functions which are schematically represented in the flowchart, FIGS. 11A—11D. The T functions represented in FIG. 7 are described more fully in the aforesaid Nelson patent application, and will not be described in great detail herein. For a more complete understanding of the T functions, which relate to the actual replacement algorithm, reference can be had to the aforesaid Nelson patent.

The system shown in FIGS. 9A—9K is assumed to operate in a uniprogramming mode. However, the invention is not necessarily limited to this mode of operation. When a memory request is initiated by the central processing unit CPU, FIG. 9A, the ID and address information for the desired block are applied through lines 22 to the register 24, FIG. 9B, and concurrently therewith a signal is applied by the CPU to either line 26 or line 28 for setting the alteration flip-flop 30, FIG. 9A. The flip-flop 30 is set to its 1 state if the requested block is to be altered; otherwise being left in its 0 state. The CPU then applies a signal to the start line 100, which continues through OR gate 252 and line 254 to set the single-shot T0 in the T clock 198, thereby initiating a cycle of operation of the system.

FIRST EXAMPLE OF OPERATION

FIGS. 4A, 4B and 12A—12L

Figure 11B:
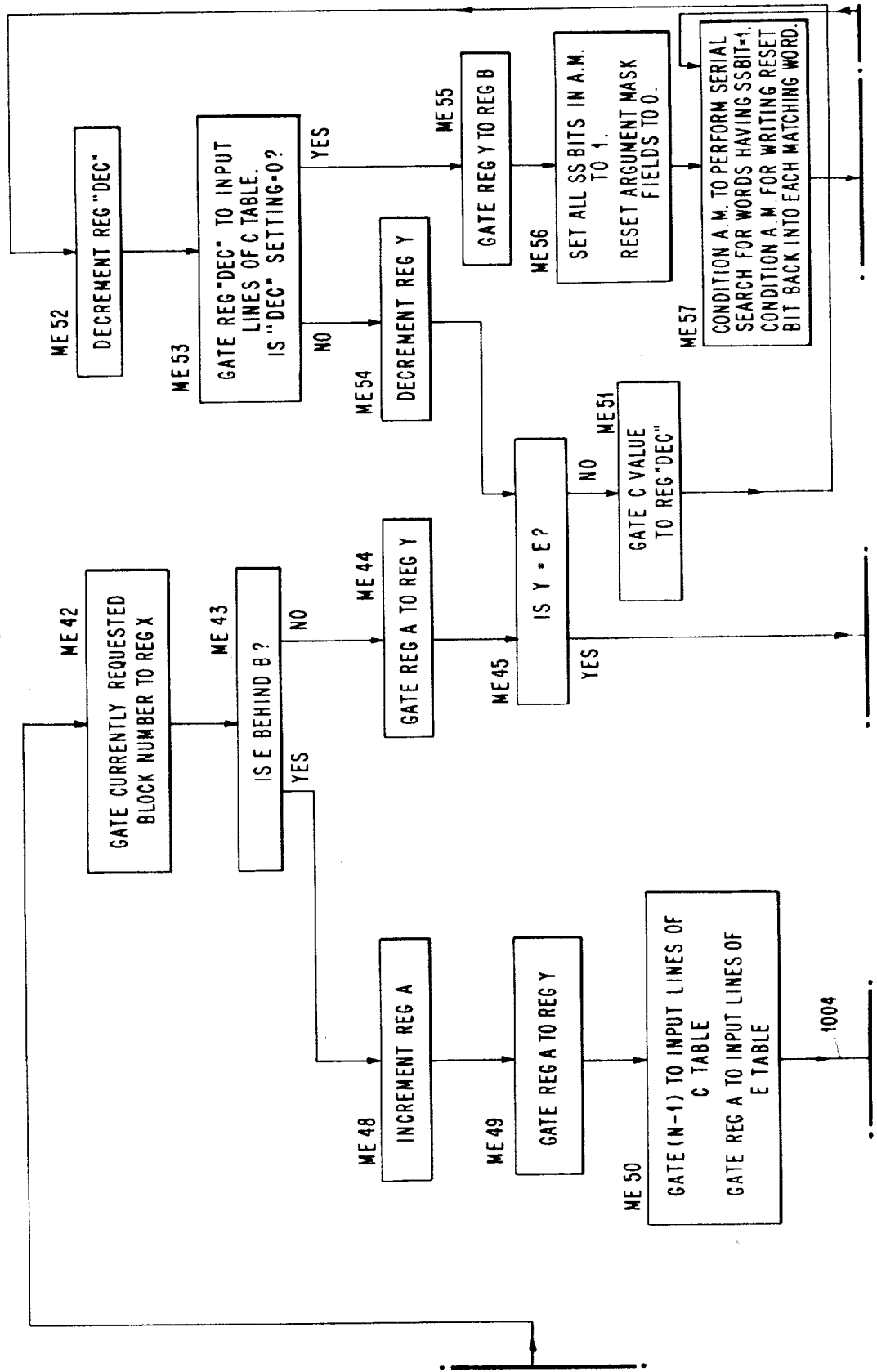
Figure 11C:
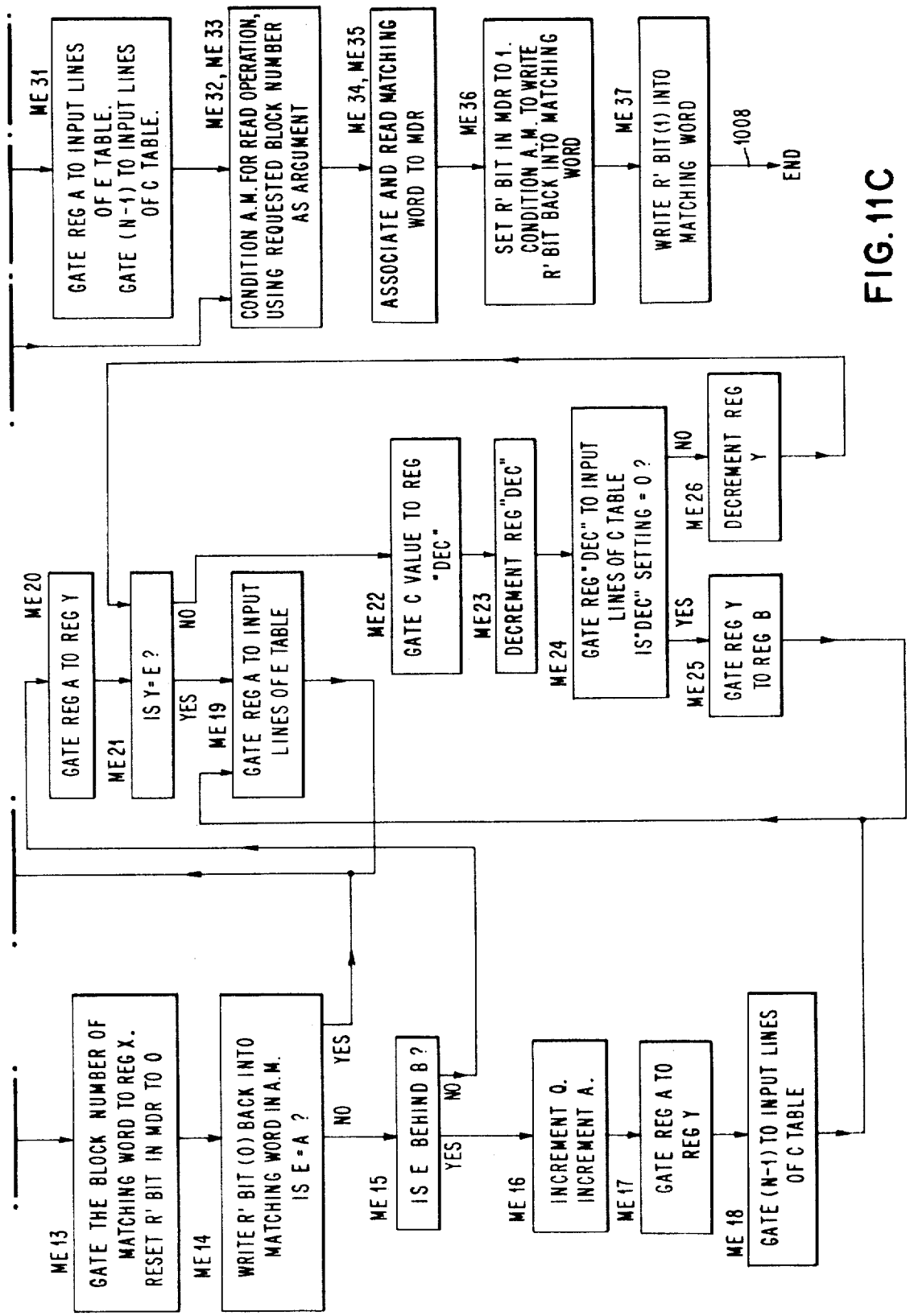
Figure 11D:
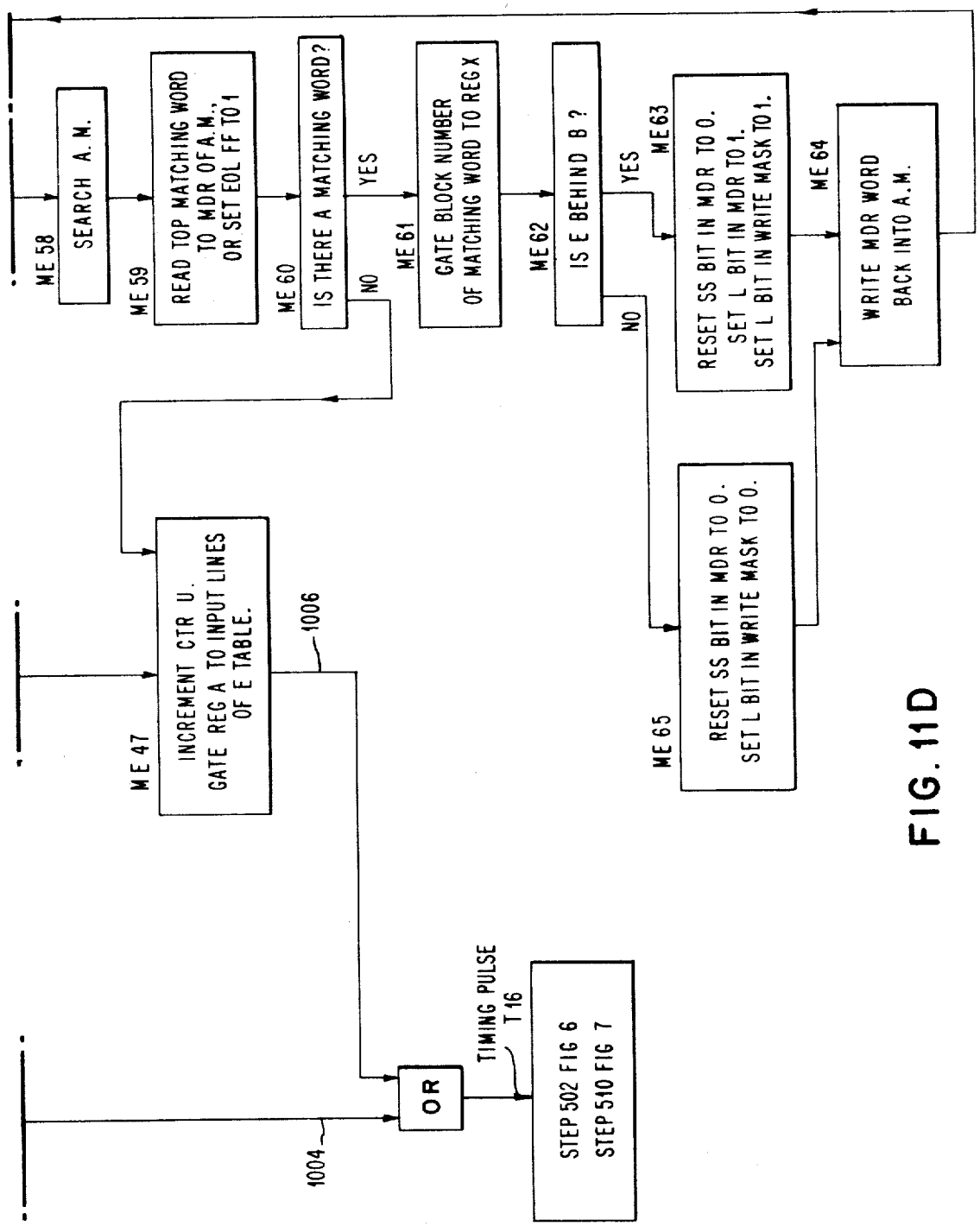

This example includes an L routine, which is uniquely defined by steps ME55—ME65, FIGS. 11B and 11D, ME2-—ME7, FIG. 11A, and ME28—ME31, FIGS. 11A and 11C. The L routine, which comes into play during the final phase of this particular operation, will be described at the appropriate point hereinafter.

In the present example, FIGS. 4A and 4B, the following block referencing sequence is assumed:

BL1, BL2, BL3, BL4, BL5, BL2, BL4 (alter), BL1, BL6, BL1, BL2, BL4

The sequence of operations shown generally in FIGS. 4A-—4B is depicted in greater detail in FIGS. 12A— 12L. As the first step in this sequence, block BL1, is requested by the CPU and is found not to be in the working memory WM (which is assumed to be initially in a clear state). Hence, block BL1 must be brought from the backup store into the working memory. Referring particularly to FIG. 11A, the operation in which we are now interested commences at step ME66, which in this instance causes the counter P to be incremented from 0 to 1, FIG. 12A. Steps ME8—ME12 then are performed to determine whether any updating operations will be needed (as indicated by the presence of stored R' bits in the associative memory AM). In the present instance it can be assumed that all R' bits are at their initial 0 values, hence the operation proceeds from step ME12 to ME27, FIG. 11A, and from thence to step ME42, FIG. 11B (the F flip-flop having been set to 0 in step ME66). The number of the currently requested block (BL1) is gated to register X, which sets the X pointer in the E table to the address corresponding to BL1, FIG. 12A. The B register has an initial setting of 1, as explained above, and since the E value of BL1 initially is 0, E at this time is less than B. Hence, the result of the test performed at ME43, FIG. 11B, is "yes." This results in a sequence of operations represented by steps ME48—ME50. Thus, register A is incremented from 0 to 1, and this new A setting is gated to register Y for setting the Y pointer at address 1 of the C table. Then, the quantity (N−1), which in this case is 2, is entered into the C table as the final C value for address 1. The contents of register A then are gated to the input lines of the E table, thereby setting the E value for block BL1 to 1. The system is now ready to perform the actual block entry operation.

The block storage positions in the working memory WM are assumed to be arranged in the same order as the corresponding word storage positions in the associative memory AM. When initially loading the working memory, the entry of each new block into the memory replaces an all 0 setting of the selected storage position with the requested block information. As a rule, however, the selected storage position already would contain a block of information that previously had been entered therein, and in such a case, the incoming block overwrites the block that is being replaced. In the present instance the block BL1 is entered into the second address or storage position of the working memory, and the corresponding block number BL1 is entered into the corresponding word of the associative memory. The reason why the second address is chosen in this instance is that the word pointer (represented by the setting of the pointer flip-flops in the associative memory) is assumed initially to be at the topmost or first address position, which causes the next entry to be made into the following or second address position, after which the word pointer is moved to the corresponding second address position to indicate that this entry is now filled.

After the requested block BL1 has been entered into the working memory, the system again inquires whether the requested block is in the working memory (flow line 1007, FIGS. 6 and 7). This time, of course, the answer is "yes," and the operations depicted in steps 503—504 and 505, 506, FIG. 6, thereupon are initiated. The block BL1 is referenced in the working memory by the processor CPU, and the R and AL bits of the word in the associative memory which is associated with the block BL1 in the working memory are set to the appropriate values, which in this case would be R=1 and AL=0, since the block has been referenced but not altered. The R' bit associated with the block BL1 also is set to 1. All of these actions are depicted in FIG. 12A, which represents the initial and final setting of the associative memory and the various tables and registers that are utilized by the system.

The next block of information to be requested by the CPU is, in the present example, BL2. The sequence of operations is very similar to that described above with reference to BL1. FIG. 12B shows the action which occurs when BL2 is referenced by the system. Thus, P is advanced from 1 to 2, and A is advanced from 1 to 2. BL2 is assigned an E value of 2 to correspond with the new value of A. A C value of N−1, or 2, is entered into the second address of the C table. The R and R' bits associated with BL2 are set to 1.

FIG. 12C represents action which occurs when the system requests block BL3, which is not in the working memory at this time. The P count advances from 2 to 3, while the A count likewise advances from 2 to 3. An E value of 3 is assigned to BL3. The third position of the C table now stores a C value of 2. BL3 is entered into the first address of the working memory, and its associated R' bit is set to 1. The associated R bit is momentarily set to 1. However, it will be recalled that when all of the R bits in the associative memory attain a concurrent 1 setting, they are automatically reset to 0. FIG. 12C shows the result of this action in the C=0 final setting of the R bit registers.

The action which occurs during intervals 4 and 5 of the actual sequence of operations of FIG. 4A are respectively depicted in FIGS. 12D and 12E, and since they are very similar to the actions which occurred during intervals 1–3, no detailed description thereof will be presented.

During interval 6 of the actual sequence of operations, FIG. 4A, a different type of action occurs, this being an instance where the actual replacement algorithm finds it necessary to retrieve from the backup store a block of information BL2 that recently was replaced in the working memory. This action is represented in FIG. 12F. The P count is advanced from 5 to 6 (step ME66, FIG. 11A). In this case, however, the A count remains at its previous setting of 5. This results from the test performed at step ME43, FIG. 11B. The value of B is still 1, but the E value of the currently requested block BL2 is 2, this E value having been assigned to BL2 when it previously was referenced during interval two, FIG. 4A, as represented in FIG. 12B. Hence, under these conditions, the output of the test performed at ME43, FIG. 11B, is "no." The next step ME44 involves gating the contents of register A to register Y, thereby setting the Y pointer to the fifth address of the C table, FIG. 12F. Since the present Y value (5) is not equal to the current E value (2), the test performed at step ME45, FIG. 11B, results in a "no" output, thereby causing steps ME51-—ME54 to be performed repeatedly until the Y setting is reduced to the current E value. This causes the C values for addresses 5, 4, and 3, of the C table to be reduced from 2 to 1, FIG. 12F. With Y now being equal to E, the output of the step ME45 becomes "yes" and the operation proceeds to step ME47, FIG. 11D. Counter U is now incremented from 0 to 1 to indicate that an unnecessary transfer of block BL2 was performed by the actual replacement algorithm, and the E value of block BL2 is updated from 2 to 5, which is the current A value. The A value, it will be recalled, corresponds to the number of the interval in the optimal sequence of operations when the currently requested block (BL2 in this instance) would have been referenced. Thus, in the optimal sequence of operations, FIG. 4, block BL2 would have been referenced during interval 5, not during interval 6 as in the actual sequence of operations. There now is a discrepancy between these two interval numbers, and this is reflected in the new setting (1) of the unnecessary transfer counter U.

The next block to be referenced by the CPU is BL4, which currently resides in the working memory, not having been replaced since it was entered there during interval 4, FIG. 4A. It is assumed in the present example that in this stage of the operation, the block BL4 is to be altered when referenced. Hence, when the R and AL bits associated with BL4 are updated as indicated in step 505, FIG. 6, and steps 516—520, FIG. 7, the R and AL bits associated with BL4 are both set to 1. This action is depicted also in FIG. 12G. The operation then proceeds to step 506, FIG. 6, the constituent operations of which are represented (in the present instance) by the steps labeled ME1 and ME32—ME37 in FIGS. 11A and 11C. As a final step in this sequence, the R' bit associated with BL4 is set to 1, FIG. 12G. The associative memory now contains two words whose R' bits are 1, namely, the words associated with blocks BL2 and BL4.

The next portion of the operation (interval 7 of the actual sequence, FIG. 4B) exemplifies the use of a plurality of stored R' bits for updating purposes, and it also illustrates how a "-complete set" may be defined. This phase of the operation is initiated when the CPU requests block BL1, which is not then in the working memory WM. Referring to FIG. 12H in conjunction with FIG. 4B, the first action which occurs in response to the current request for BL1 is the resetting of the F flip-flop to 0 and the incrementing of the counter P setting from 6 to 7 (step ME66, FIG. 11A), these two elements F and P being shown in FIG. 9F of the circuit diagram. The associative memory AM next is conditioned to search for all words whose R' bits have been set to 1. As indicated in FIG. 12H, the words corresponding to the blocks BL2 and BL4 (which respectively are stored in the first and second positions from the top of the associative memory) have R' bits equal to 1. Referring again to FIGS. 11A and 11C, and particularly to steps ME8 et seq., the associative memory makes its initial search and reads the top matching word to the memory data register MDR (FIG. 9E). In this instance the top matching word in associative memory AM is the word corresponding to block BL2 in the working memory WM. The block number BL2 is gated to register X (FIG. 9I) for setting the X pointer of the E table to its BL2 position (FIG. 12H). Concurrently, the R'bit corresponding to BL2 is reset to 0, having served its purpose (steps ME13 and ME14, FIG. 11C).

The current E value of BL2 is 5, which is equal to the current A value of 5. Hence, the operation now branches from step ME14, FIG. 11C, back to step ME8, causing a new search to be made throughout the associative memory for any additional words whose R' bits are 1. The R' bit of BL2 having previously been reset to 0 (step ME13), the only word whose R' bit presently is 1 is the word corresponding to block BL4 (FIG. 12H). The block number BL4, therefore, is gated to the register X for setting the X pointer to the BL4 position in the E table. The current E value of BL4 is 4, which is less than the current value of A, or 5. Hence, the operation branches from step ME14, FIG. 11C, to step ME15 where an additional test is made to determine whether the current E value is behind the current B value. In this instance the E value of BL4 being 4, and the current B setting being 1, a "no" branch is made from step ME15, FIG. 11C, to step ME20, wherein the contents of register A are gated to register Y for setting the Y pointer to the fifth C-address position, FIG. 12H. At step ME21 a test is made to determine whether the current Y register setting is equal to the current E value. Inasmuch as the E value of BL4 is 4, whereas the current Y value is 5 the test at step ME21 generates a "no" output, whereupon the operation branches to step ME22, FIG. 11C. Following the steps ME22 through ME25 in sequence, the C value (1) for the fifth C-address position is gated to the register DEC, which is decremented, thereby bringing the DEC setting to 0. This results in the register Y setting being gated to register B (step ME25), which increases the B value from 1 to 5.

The operation now proceeds from step ME25, FIG. 11C back to step ME19, where the register A setting is gated to the E table for increasing the E value of BL4 to 5. It may be observed now that all three of the blocks BL2, BL4 and BL5 currently stored in the working memory WM have E values of 5, which is the current B register setting. This indicates that a complete set has been defined for the interval numbered 5 (i.e., A=5) in the optimal sequence of operations, FIG. 4A.

The operation now progresses from step ME19, FIG. 11C, back to step ME8, FIG. 1A, for initiating a new search of the associative memory to find words having R' bits equal to 1. Since no further words of this kind are in the associative memory at the present time, a "no" output is generated at step ME12, whereupon the operation branches to step ME27.

Inasmuch as the F flip-flop is set at 0, the operation branches again to step ME42, FIG. 11B, where the currently requested block number (BL1) is gated to register X. At this time the E value of BL1 is 1 (FIG. 12H), and since this is less than the new B value of 5, step ME43 generates a "yes" output whereby the operation branches to step ME48.

Steps ME48 through ME50 are updating operations whereby the setting of register A is incremented from 5 to 6 (FIG. 4B); the N—1 value (2) is inserted in the C table at the sixth C-address position (FIG. 12H); and the A value of 6 is inserted into the E table as the new E value of BL1. All updating operations now having been performed upon the variables A, C and E (as well as the previously adjusted variable values P and U), the operation now progresses to step 502, FIG. 6, wherein the actual block replacement operation is performed.

Referring to the breakdown of step 502 into its constituent steps 510—515, FIG. 7, it will be noted that the word pointer is advanced from its current setting to the next word having a 0—0 combination of AL and R bits (step 511). From FIG. 12H it is apparent that the second word in the associative memory does not conform to this description inasmuch as both its AL and R bits are 1. Hence, the word pointer is advanced from the first word position to the third word position, where both the AL and R bits initially are set to 0. The replacement algorithm then causes the newly requested block BL1 to be entered into the third address of the working memory WM, replacing the block BL5 formerly stored there. Thus, in the final setting of the associative memory at this stage of the operation, the block numbers BL2, BL4 and BL1 occupy the first, second and third word positions, respectively, of the associative memory. The operation then returns to step 500, FIG. 7.

Inasmuch as the currently requested block BL1 now is in the working memory WM, a "yes" output is generated by step 500, thereby causing step 503, 504, 505 and 506 to be performed. In step 505, which is subdivided into steps 516 through 520, FIG. 7, the R bit of BL1 is set to 1 to indicate that block BL1 now is being referenced by the system. Likewise, the R' bit of block BL1 is set to 1, FIG. 12H (step 506, FIG. 6).

After BL1 has been referenced as just described the processor CPU initiates a new memory request, this time calling for block BL6, which is not presently in the working memory WM. The actions which occur in response to this memory request are depicted in FIG. 12I. The P value is advanced from 7 to 8, and the A value is advanced from 6 to 7 (FIG. 4B). Block BL6 is entered into the working memory in the first address therein, replacing block BL2 formerly stored there. Block BL6 then is referenced in the working memory, and its R' bit is set to 1. The E value of of BL6 is increased from 0 to 7, the current A value.

The CPU now request block BL1, which presently is in the working memory WM. Hence, block BL1 merely is referenced in the working memory, and there is no change in the values of P and A as a result of this operation (FIG. 12J). The R' bit of BL1 is set to 1, and the R bit of BL1 likewise is set to 1, as shown in FIG. 12J.

The CPU now requests block BL2 again, FIG. 12K. It will be recalled that BL2 was replaced at the time when BL6 entered the working memory (FIG. 12I). Hence, BL2 must be brought back into the working memory. At this time the working memory contains blocks BL6, BL4 and BL1, arranged in that order, as indicated by FIG. 12K. The R' bits of BL6 and BL1 are set to 1. Therefore, when the associative memory AM is searched for words having R'=1 (steps ME8—ME12, FIG. 11A), it will encounter BL6 and BL1. Inasmuch as the E value of BL6 is equal to the current A value of 7, the examination of BL6 is without effect in this instance, the operation merely returning from step ME14, FIG. 11C, to step ME8, FIG. 11A.

When the associative memory again is searched (step ME10) it will find BL1 having an R' bit of 1, and in this instance the current E value (6) of BL1 is not equal to the current A value (7). Hence, the operation branches from step ME14, FIG. 11C, to step ME15, and from thence it proceeds through step ME20 through step ME24. During the course of this sequence, the C value for position seven in the C table, FIG. 12K, is reduced from 2 to 1. The operation then proceeds through steps ME26 and ME21 to step 19, where the E value of block BL2 is increased from 5 to 7, the current A value. This action is indicated in FIG. 12K. The operation now returns to step ME8, FIG. 11A, and progresses ultimately to step ME12. There being no more words in the associative memory whose R' bits are 1 at this time, the operation proceeds through step ME27, FIG. 11A, to step ME42, FIG. 11B.

At step ME42, the currently requested block number (BL2) is gated to register X, setting the Y pointer to the BL2 position of the E table, FIG. 12K. The current E value (5) of BL2 is equal to the current B value (5); hence, at step ME43 the operation branches to step ME44, FIG. 11B. The A value (7) is gated to register Y, thereby setting the Y pointer at the seventh C-address position in the C table, FIG. 12K. It will be recalled that the C value at this address already had been reduced from 2 to 1 as described above. Hence, when this C value is decremented at step ME52, FIG. 11B, it becomes 0. This produces an operation different from any of the operations described hereinabove, causing the sequence to branch from ME52 to ME55 and thereby initiating a new routine involving the use of the SS and L bits.

As the first step in this routine ME55, the Y setting of 7 is gated to register B, thereby increasing the B value from 5 to 7. Then, at step ME56, all of the SS bits in the associative memory are set to 1 in preparation for a serial search through all the words of the associative memory. Steps ME57 through ME61 are performed on each matching word (i.e., each word whose SS bit equals 1) in the associative memory, starting with the top matching word. In this case the top matching word is BL6. Since the E value of BL6 (7) is equal to the new value of B, the resulting action merely involves resetting the SS bit to 0 (steps ME65 and ME64).

The operation now returns to step ME57, FIG. 11B, for initiating a new search sequence. The next word to be encountered in the present serial search operation is the one corresponding to block BL4 (FIG. 12K). It will be recalled that block BL4, due to its altered status, has resided continuously in the working memory WM since it was last referenced therein during interval 6 of the actual sequence of operations (FIG. 4A); whereas it otherwise would have been replaced by this time. Block BL4 currently has an E value of 5, which is less than the new B value of 7 (FIG. 12K). Hence, the test performed at step ME62, FIG. 11D, produces a "yes" branch to steps ME63 and ME64, in which the L bit of the word associated with BL4 is set to 1, as indicated in FIG. 12K. (The significance of having the L bit of BL4 set to 1 will become apparent when the subsequent referencing of BL4 occurs, as will be described presently.)

The last word to be encountered in the serial search is the one corresponding to BL1, FIG. 12K. Inasmuch as the current E value of BL1 (7) is equal to the current value of B, the output of test ME62 (FIG. 11D) is "no," and no significant action occurs. The operation proceeds through steps ME65, ME64 and ME57—ME60 to ME47, wherein the unnecessary transfer count U is incremented from 1 to 2 to reflect the fact that BL2 had to be transferred back into the working memory by the actual replacement algorithm, whereas the optimal replacement algorithm would have kept BL2 continuously in the working memory (FIG. 4B). The new A value (7) is now gated to the E table, thereby increasing the E value of BL2 from 5 to 7. The working memory now is filled with blocks whose E values are equal to 7, which is the number of the interval in the optimal sequence wherein all three of these blocks would have been referenced in succession (FIG. 4B). Hence, we may say that a "complete set" has been defined for optimal interval 7, which fact is reflected in the current B setting of 7.

As the final phase of the block referencing sequence presently under consideration, the block BL4 is referenced. Due to its altered status, as described above, block BL4 has been permitted by the actual replacement algorithm assumed herein (i.e., the algorithm disclosed in Nelson patent application) to remain in the working memory WM at a time when, according to the logic of the optimal replacement algorithm, it should not be there. The optimal algorithm would have replaced BL4 during the interval defined by A=7, FIG. 4B. This condition is recognized by the present efficiency measurement procedure by calling for a special value updating operation, the details of which now will be described:

Referring to FIG. 11A, in conjunction with FIGS. 6 and 12L, a request by the CPU for a block in the working memory whose L bit presently is 1 causes the operation to proceed through the step ME1 to steps ME2 and ME3, wherein the F flip-flop (FIG. 9F) is set to 1 for a purpose to be described, and the counter U is decremented (FIG. 9F), thereby indicating the fact that the actual replacement algorithm was able to avoid making a block transfer that the optimal algorithm would have found necessary. Thus, in effect, the actual replacement algorithm is given a "credit" of 1. The L bit of the matching word (BL4 in this instance) now is reset to 0 (steps ME4—ME7), and the operation proceeds to step ME8, FIG. 11A.

At this point, the system executes a value updating procedure identical to that which occurs normally during a "block exception," when the CPU has requested a block that is not in working memory. In this instance, the requested block (BL4) is in the working memory; nevertheless, the system proceeds as though a normal block exception has occurred. For this reason, the operation which results from requesting a block already in working memory whose L bit is 1 may be referred to as a "pseudo block exception". This point is mentioned in order to observe that not all of the updating operations performed upon U, A and the other variable values are initiated by requests for blocks that are absent from the working memory.

At this time (FIG. 12L) the only block in the working memory whose R' bit = 1 is BL2. Since the E value of BL2 is equal to the current B value of 7, the search operation merely progresses in a loop through steps ME8—ME14 and back to ME8, FIGS. 11A and 11C. Then, it proceeds through steps ME8—ME12 to ME27. Since the F flip-flop now has a 1 setting (step ME2), the operation branches from ME27 to ME28, wherein the value of A is incremented from 7 to 8, FIGS. 12L and 4B. Next, the C value at the eighth address of the C table is increased to 2, and the E value of block BL4 is adjusted to 8 (steps ME29 through ME31, FIGS. 11A and 11C). Following this, the R' bit of BL4 is set to 1 (steps ME32—ME37), and the operation ends.

The incremented A setting of 8 and the decremented U setting of 1, FIGS. 4B and 12L, reflect the fact that the actual replacement algorithm is being given credit for having avoided a block transfer that the logic of the optimal replacement algorithm would have deemed necessary. It should be noted, however, that this result occurred only because the CPU requested a block having its L bit set to 1, such block having resided continuously in the working memory since acquiring this status. If for any reason the block BL4 had been moved out of the working memory between the time when its L bit was set to 1 and the time when it was next requested by the CPU, then its 1 L bit would have been lost, and the reentry of BL4 into the working memory under these conditions would have produced no unusual effect of the kind just described.

SECOND EXAMPLE OF OPERATION

FIGS. 13 and 14A—14F

The present example involves the use of the Q routine which is uniquely defined by the steps ME16—ME18 of the flow chart, FIG. 11C. This routine is described in the final phase of the description pertaining to this operation.

The example represented in FIG. 13 assumes the following block referencing sequence:
BL1
BL2
BL3
BL4
BL5
BL2
BL4 (alter)
BL1 (alter)
BL6
BL2
BL4
BL1
BL7

The first seven block referencing actions (down to and including the alternation of BL4) are identical with the actions depicted in the first six intervals of the actual sequence of operations shown in FIG. 4A. Hence, these steps are not repeated in detail in FIG. 13, reference being made to FIG. 4A for that part of the operation. The system now is in the condition depicted by FIG. 12G.

The next phase of the operation (FIG. 14A) is initiated when the CPU requests block BL1, which is not presently in the working memory. The actions which take place during this interval include the alteration of BL1, which causes the AL bit associated with BL1 to be set to 1, FIGS. 13 and 14A. Blocks BL4 and BL1 both now have an altered status.

When the CPU requests the next block, BL6, the replacement algorithm has no choice other than to enter the newly requested block into the first address of WM, where it replaces BL2, FIG. 14B. When the block BL6 is referenced in the working memory, its R bit becomes 1, but since all of the R bits in the associative memory now have values of 1, all of them are reset to 0 at this time.

When BL2 is requested (FIG. 14C), the only address at which it can be entered in the working memory is the first address due to the altered status of blocks BL4 and BL1. The measurement system identifies this transfer of BL2 into the working memory as an unnecessary transfer (FIG. 13) and increments the U count to 2. The referencing of BL2 then is followed by the referencing of BL4 (FIG. 14D) and BL1 (FIG. 14E), both of which are in the working memory. All three of the blocks in working memory (BL2, BL4 and BL1) now have R' bits=1. Incidentally, while the referencing of BL1 is represented in FIG. 13 as occurring during the optimal interval 8, the updating of A from 7 to 8 actually is deferred, as indicated in FIG. 14E and described fully hereinafter.

The request for bloc, BL7 made by the CPU (FIG. 14F) initiates a value updating operation. Referring to FIG. 11A, the counter P first is incremented (step ME66), causing the P count to advance from 9 to 10, as indicated in FIGS. 13 and 14F. Then, in steps ME8—ME14, FIGS. 11A and 11C, the associative memory is searched for words whose R' bits are 1. The first such word to be encountered is BL2 (BL7 not having been entered yet into the working memory). The E value of BL2 is equal to the current A value of 7; hence, the operation now returns from step ME14 to step ME8, and a new search is made.

This time the word in associative memory corresponding to BL4 is encountered. The E value of BL4 (now 5) differs from the current A value (7) but is equal to the current B value (5). Hence, the operation of the system progresses through steps ME14 and ME15 to ME20, FIG. 11C, and from thence through steps ME21—ME24 to a decision point. As the result of a previous value updating operation (FIG. 14C), the C value at the seventh address position in the C table was reduced from 2 to 1. Now (FIG. 14F) the C value in this same position has been reduced to zero (FIG. 14F). Hence, the output of step ME24, FIG. 11C, is "yes." This causes the B value to increase from 5 to 7 (step ME25), thereby defining a "complete set" for interval 7 of the optimal sequence (FIG. 13), such set comprising BL6, BL2 and BL4. Following this, the E value of BL4 is increased from 5 to 7 (step ME19). The operation now returns to step ME8, FIG. 11A, for the final search.

The last remaining word whose R' bit = 1 is BL1. The current E value of BL1 is 6, whereas the updated value of B is now 7, as noted above. A also is 7 at the present time. Hence, when the tests at steps ME14 and ME15 are performed, FIG. 11C, step ME14 will generate a "no" output, and step ME15 will generate a "yes" output. This directs the operation to step ME16, wherein the Q counter setting is incremented from 0 to 1 (FIG.14F), and the A value is incremented from 7 to 8. The incrementing of Q as just described interjects an "uncertainty factor" into the measurement of the replacement efficiency. The replacement efficiency formula may be stated as:

$$\frac{P-(U-Q)}{P} \geq \text{Eff.} \geq \frac{P-U}{P}$$

This equation specifies a range of possible values for the efficiency rather than a single value thereof. The need for this range specification arises from the fact that the disclosed measurement system has no means for indicating the exact order in which the blocks having the 1 R'-bit values actually were referenced by the processor and it assumes that these blocks were referenced in the order in which they happen to be placed in the working memory. Under some conditions, this assumption could lead to an erroneous conclusion regarding the efficiency of the actual replacement algorithm. In the present example, it so happens that the blocks actually were referenced in the same order as they were arranged in the working memory, and under these circumstances, the actual replacement algorithm is entitled to a credit for having kept block BL1 available for referencing in the working memory (due to its altered status), when the logic of the optimal replacement algorithm (which does not give any special significance to an altered status) would have made it necessary to transfer BL1 back into the working memory from the backup store. In this instance, however, the credit given to the actual replacement algorithm is a conditional or "questionable" credit Q, because with a different ordering of the block referencing actions (not corresponding to the order in which the referenced blocks happen to be stored in the working memory), it is possible that the optimal replacement algorithm might have performed more efficiently in comparison with the actual replacement algorithm. This may not be likely to occur where the working memory has a capacity of only three blocks, as assumed herein for illustrative purposes, but it could very well occur in a memory having a much larger capacity as is generally true in practice. The system therefore recognizes the diverse possibilities inherent in this type of situation by incrementing the Q and A values but not decrementing the U count, so that the U count unmodified by the Q count sets the lower bound of the efficiency range, while the U count reduced by the Q count sets the upper bound of the efficiency range, as specified by the above equation.

The operation now proceeds to step ME17, FIG. 11C, wherein the new A value of 8 is gated to the Y register for setting the Y pointer of the C table to the eighth C-address position, FIG. 14F. Then, at step ME18, the (N—1) value of 2 is entered into the C table as the new C value for this eighth position. The operation now returns to step ME19, wherein the new A value of 8 is gated to the E table as the new E value of BL1. Following this, the operation returns to the initial step ME8 in the search sequence. Since there no longer are any words having their R' bits equal to 1, this phase of the value updating operation is completed, and the operation now progresses successively through steps ME8—ME12 and ME27 to ME42, FIG. 11B.

At step ME42, the currently requested block number (BL7) is gated from register 24 (FIG. 9I). Since the current E value (0) of BL7 is less than the current B value (7), the test at step ME43, FIG. 11B, results in a branch to step ME48, where the A register setting is incremented to 9 FIGS. 13 and 14F). Then, at step ME49, the new A value of 9 is gated to register Y, and at step ME50, the (N—1) value of 2 is gated to the ninth address position of the C table, FIG. 14F. (It is assumed for present purposes that the C-address counter has sufficient capacity for a ninth position. However, if only three binary orders are used for addressing purposes, the address setting then would return to its No. 1 position, and the fact that this is actually the ninth C position would have to be recognized by means of a suitable expedient such as the use of a high-order carry bit). At step ME50, the new A value of 9 is entered into the E table as the updated E value of BL7, FIGS. 13 and 14F. This concludes the value updating operation for block BL7.

The system now proceeds to step 502, FIGS. 6 and 7, wherein the actual block replacement operation is executed, causing BL7 to replace BL2 in the working memory. The CPU then references block BL7 in the working memory, in the course of which the action R and R' bits of BL7 are set to 1. This ends the exemplary sequence illustrated in FIG. 13.

One other point may be mentioned in connection with the sequence just described. It will be noted that in the seventh interval of the optimal sequence (A=7), FIG. 13 the measurement system indicates that a "complete set" of blocks BL6, BL2, and BL4 could have been made concurrently available for reference in the working memory during this same interval without requiring an intervening block replacement operation. In fact, however, no such "complete set" of blocks ever existed in the working memory at any one time during the actual sequence of operations. Referring to FIGS. 14B and 14C in conjunction with FIG. 13, it may be noted that at various times during the intervals 8 and 9 of the actual sequence, the working memory contained wither the set of blocks BL2, BL4 and BL1 or the set of blocks BL6, BL4, and BL1, but it never contained the set of blocks BL6, BL2, and BL4 at any one time.

This dies not necessarily means that every "complete set" defined by the measurement system would exist only in the abstract and not in real fact. Occasionally, it may happen that a complete set defined by the measurement system coincides with the set of blocks that actually resides in the working memory at that time. Often, however, this is not the case, and in the particular examples selected for illustration herein, it is never the case.

SUMMARY OF ADVANTAGES

The replacement efficiency measuring process disclosed herein is capable of making a dynamic on-line measurement of the block replacement efficiency of a virtual-memory data processing system without significantly degrading the performance of that system. This is made possible, in the present showing, by the utilization of stored R' bits, which enable the necessary value updating functions to be performed during convenient periods when they will interfere very little or not at all with the normal operations of the system. This enables a comparison to be made on a progressive, intermittent basis between the performance of the actual replacement algorithm and that of an optical replacement algorithm which is derived from the MIN algorithm mentioned hereinabove. In order to make such a comparison on a completely factual basis, the present measurement technique includes provisions for recognizing those occasional or rare instances where an actual replacement algorithm may perform more efficiently than the optimal replacement algorithm (L routine), or where there is doubt whether the optimal algorithm might have performed more efficiently than the actual algorithm (Q routine) due to uncertainty over the actual order of referencing represented by the stored R' bits.

Although the invention is disclosed herein as though it were practiced on a special-purpose apparatus, it could equally well be carried out by means of a programmed general-purpose computer of the virtual-memory type, which should be regarded as the equivalent of the disclosed special purpose embodiment.

I claim:

1. In a data processing system of the virtual-memory type wherein blocks of information are stored at numbered block addresses in a backup store and in some instances are stored also at working addresses temporarily associated with such block numbers in a high-speed working memory having a limited storage capacity, said system including a central processor operable to request blocks of information according to their block numbers in said backup store and to reference such blocks when they are residing in said working memory and being effective whenever the block which it requests is currently stored only in the backup store to fetch the requested block from said store and enter the same into said memory at a working address therein selected according to a predetermined replacement algorithm, thereby replacing the block formerly stored at such working address;

the method of measuring the efficiency of said predetermined replacement algorithm by progressively comparing the number of block replacements that actually are performed with an optimal number of block replacements which would have been performed had the processor been operated under the control of an optimal replacement algorithm that takes cognizance of all blocks which have resided and are about to reside in said memory, including the block currently requested by said processor, and the relative order in which such blocks have entered the memory, said method comprising the steps of:

counting the actual number of replacement intervals that are initiated by said processor while it is operating under the control of said predetermined replacement algorithm, each such interval being initiated when said processor requests a block not currently stored in the working memory and being terminated when said processor next requests a block that is not then residing in said memory;

marking with suitable indicia those working addresses at which blocks are referenced by said processor during each interval between successive block replacements;

storing a table of index values which associates the identifying number of each block that has been requested by said processor with the number of the replacement interval in which such block most recently would have been referenced in the working memory according to said optimal replacement algorithm;

causing said processor, as an incident to the initiation of each new replacement interval and prior to entry of the currently requested block into said memory, to make an updated determination of the optimal number of block replacement intervals that thus far would have been initiated if said processor had operated under the control of the optimal replacement algorithm, said determination being based upon said block referencing indicia and said stored index values, and manifesting a count of the unnecessary block transfers that have occurred between the backup store and the working memory according to the difference, if any, between the actual number of block replacement intervals and the optimal number of block replacement intervals.

2. An efficiency measuring method as set forth in claim 1 further comprising the steps of:

detecting the occurrence of a condition in which the processor references a requested block already present in said memory without initiating a new replacement interval at a time when, according to the optimal replacement algorithm, a new replacement interval would have had to be initiated by said processor in order to make the requested block available for referencing in said memory;

and in response to the detection of such a condition, adjusting the optimal interval number and the unnecessary block transfer count consistently therewith.

3. A replacement efficiency measuring method as set forth in claim 1 further comprising the steps of:

detecting the occurrence of a condition in which the processor references a requested block already present in said memory without initiating a new replacement interval at a time when, according to the optimal replacement algorithm and depending also upon whether the actual order of referencing corresponds to the relative order in which the marked working addresses are arranged, a new replacement interval would have had to be initiated by said processor in order to make the requested block available for referencing in said memory;

and, in response to the detection of such a condition, manifesting an indication that the count of unnecessary block transfers may required adjustment in view of the fact that there has been an increase in the optimal number of replacement intervals without a corresponding increase in the actual number of replacement intervals.

4. In a data processing system of the virtual-memory type wherein blocks of information are stored at numbered block addresses in a backup store and in some instances are stored also at working addresses temporarily associated with such block numbers in a high-speed working memory having a limited storage capacity of N blocks, said system including a central processor operable to request blocks of information according to their block numbers in said backup store and to reference such blocks when they are residing in said working memory and being effective whenever the block which it requests is currently stored only in the backup store to fetch the requested block from said store and enter the same into said memory at a working address therein selected according to a predetermined replacement algorithm, thereby replacing the block formerly stored at such working address;

apparatus for measuring the efficiency of said predetermined replacement algorithm by progressively comparing the number of block replacements that actually are performed with an optimal number of block replacements which would have been performed had the processor been operated under the control of an optimal replacement algorithm that takes cognizance of all blocks which have resided and are about to reside in said memory, including the block currently requested by said processor, and the relative order in which such blocks have entered the memory, said apparatus comprising:

means for counting the actual number of replacement intervals through which said system has operated under the control of said predetermined replacement algorithm in the course of attaining the current point in its program of operations;

block reference storing means effective within each interval of the actual block replacement sequence for storing indicia designating which of the N blocks stored in the working memory are referenced by the processor during that interval only;

intermittently operable computing means effective when operated to institute a computational procedure whereby said processor utilizes the indicia stored in said block reference storing means together with the identifying number of the currently requested block to determine the optimal number of replacement intervals in which the system could have attained the current point in its program of operations if it where functioning under the control of an optimal replacement algorithm evolved according to specific logical rules from the sequence in which the blocks have been requested by said processor;

and enabling means for said computing means effective at the initiation of each interval in the actual sequence of operations to render said computing means operative for making an updated determination of the optimal interval number, whereby the processor executes said computational procedure at those times when the system is waiting for a currently requested block to be fetched from the backup store.

5. Apparatus as set forth in claim 4 wherein said computing means includes the following:

registering means effective each time said processor requests a block not then stored in the working memory to register the number of the block and the number of the optimal interval corresponding to the actual interval in which it is so requested;

means for designating which of the intervals defined by the optimal replacement algorithm contain complete sets of block references, each complete-set interval consisting of a single interval in the optimal sequence of operations corresponding to one or more contemporary intervals in the actual sequence of operations during at least one of which the working memory contains N blocks all of which are referenced by said processor within a period that includes said single optimal interval and, if necessary, not more than N−1 succeeding optimal intervals;

and means under the control of said registering means and said complete-set designating means for effectively excluding from the current determination of the optimal interval number all block requests that were made prior to the most recently designated complete-set interval.

6. Apparatus as set forth in claim 5, further comprising:

detecting means responsive to the block number requests registered by said registering means and responsive also to the optimal interval numbers determined by said computing means and said complete-set interval designations for detecting the occurrence of a condition in which a particular block has been permitted by said predetermined replacement algorithm to remain continuously in the working memory in an unreferenced state during a plurality of successive intervals in the actual sequence of operations corresponding to at least N successive intervals in the optimal sequence, commencing with a complete-set interval;

and means controlled by said detecting means when it has detected the occurrence of such a condition, and operable in the event that the processor again references said particular block before it leaves the working memory, to increment the current optimal interval number without changing the current actual interval number, thereby effectively decrementing the count of unnecessary transfers charged to said predetermined replacement algorithm.

7. In a data processing system of the kind wherein blocks of information are stored at numbered block addresses in a backup store and in some instances are stored also at working addresses temporarily associated with such block numbers in a high-speed working memory having a limited storage capacity of N blocks, said system including a central processor operable to request blocks of information according to their block numbers in said backup store and to reference such blocks when they are residing in said working memory and having block transfer instrumentalities effective whenever said processor requests a block currently stored only in the backup store to fetch the requested block from said store and enter the same into the working memory at a working address therein selected according to a predetermined replacement algorithm, thereby replacing the block formerly stored at such working address and causing the operation of the system to be divided into a succession of block replacement intervals, each interval commencing when the processor requests a block not currently stored in the working memory and terminating when the processor next requests a block that is not then residing in the working memory, the improvement consisting of an apparatus for enabling the replacement efficiency of the system to be dynamically measured while the system is operating under the control of said predetermined replacement algorithm, said apparatus comprising:

means for counting the actual number of replacement intervals through which said system has operated under the control of said predetermined replacement algorithm in the course of attaining the current point in its program of operations;

computing means for performing an optimization procedure wherein said processor determines the optimal number of replacement intervals in which the system could have attained the current point in its program of operations if it were functioning under the control of an optimal replacement algorithm evolved empirically from the sequence in which the blocks have been requested by said processor; the difference, if any, between the actual and optimal interval numbers representing the number of unnecessary block transfers chargeable to said predetermined replacement algorithm; said computing means including:

registering means effective each time said processor requests a block not then stored in the working memory to register the number of the block and the number of the optimal interval in which it is so requested;

means for designating which of the intervals defined by the optimal replacement algorithm contain complete sets of block references, each complete-set interval consisting of a single interval in the optimal sequence of operations corresponding to one or more contemporary intervals in the actual sequence of operations during at least one of which the working memory contains N blocks all of which are referenced by said processor within a period that includes said single optimal interval and, if necessary, not more than N−1 succeeding optimal intervals;

and means under the control of said registering means and said complete-set designating means for effectively excluding from the current determination of the optimal interval number all block requests that were made prior to the most recently designated complete-set interval;

detecting means responsive to the block number requests registered by said registering means and responsive also to the optimal interval numbers determined by said computing means and to said complete-set interval designations for detecting the occurrence of a condition in which a particular block has been permitted by said predetermined replacement algorithm to remain continuously in the working memory in an unreferenced state during a plurality of successive intervals in the actual sequence or operations corresponding to at least N successive intervals in the optimal sequence, commencing with a complete-set interval;

and means controlled by said detecting means when it has detected the occurrence of such a condition, and operable in the event that the processor again references said particular block before it leaves the working memory, to increment the current optimal interval number without changing the current actual interval number, thereby effectively decrementing the count of unnecessary transfers charged to said predetermined replacement algorithm.

8. In a data processing system of the kind wherein blocks of information are stored at numbered block addresses in a backup store and in some instances are stored also at working addresses temporarily associated with such block numbers in a high-speed working memory having a limited storage capacity of N blocks, said system including a central processor operable to request blocks of information according to their block numbers in said backup store and to reference such blocks when they are residing in said working memory and having block transfer instrumentalities effective whenever said processor requests a block currently stored only in the backup store to fetch the requested block from said store and enter the same into the working memory at a working address therein selected according to a predetermined replacement algorithm, thereby replacing the block formerly stored at such working address and causing the operation of the system to be divided into a succession of block replacement intervals, each interval commencing when the processor requests a block not currently stored in the working memory and terminating when the processor next requests a block that is not then residing in the working memory, the improvement consisting of an on-lines efficiency measurement apparatus for progressively determining, with the aid of said processor, how many of the block replacements effected under the control of said predetermined replacement algorithm were performed unnecessarily as a result of previous inconsistent replacement decisions executed under the control of said algorithm, said apparatus comprising:

interval indexing means for assigning a succession of actual interval numbers (P) respectively to the successive intervals in the actual sequence of block entry and replacement operations performed by said block transfer instrumentalities under the control of said predetermined replacement algorithm;

optimization means for defining a succession of optimal intervals according to an assumed optimal sequence of block entry and replacement operations evolved empirically from the actual sequence of block requests made by said processor and for assigning numbers (A) consecutively to such optimal intervals; the difference, if any, between the current values of said actual interval number (P) and said optimal interval number (A) at any given time representing the number of unnecessary block transfers (U) performed by said processor under the control of said predetermined replacement algorithm as of said given time, said optimization means including:

block indexing means for storing variable block index values (E), one for each block number which has been requested by the processor, the current index value of each block representing the number of the optimal interval in which the respective block would have been most recently referenced in the optimal sequence of operations;

counter table means having selectable storage positions addressable according to the numbers representing the respective intervals in the optimal sequence of operations, each such position being adapted to store a variable counter value (C) that is capable of being stepped through a range of values having zero and N−1 as its limits, the first such limiting value being assigned to the selected interval the first time that said processor makes reference to a block whose index value (E) corresponds to the number of that interval;

counter table adjusting means effective each time the processor makes reference to a different block having the same block index value (E) to step the counter value (C) for the corresponding interval by 1 toward its second limiting value, whereby a selected one of the counter values (C) attains its second limit each time a set of N blocks having same index value (E) is referenced by said processor;

complete-set interval numbering means initially settable to a starting value (e.g., 1) and effective each time a counter value in said counter table means attains its second limiting value to register the number of the corresponding optimal interval as the current complete-set interval number (B), said number, when greater than said starting value, being equal to the number of the most recent interval in the optimal sequence of operations when the N blocks stored in the working memory could have been referenced by said processor within a period including such interval and, if necessary, not more than N−1 succeeding intervals in said optimal sequence;

block index adjusting means effective each time a block having an index value (E) lower than the current setting (B) of the complete-set interval numbering means is requested by said processor to increment the optimal interval number (A) and set the index value (E) of such block equal to the incremented value of the optimal interval number (A); said optimization means normally being in an unoperated state;

block reference registering means including, for each block storage address in the working memory, a storage device settable to store a reference bit (R') which indicates by its value (1 or 0) whether or not the block stored at the corresponding address in the working memory has been referenced at least once by said processor since the most recent block replacement was effected under the control of said predetermined replacement algorithm;

and updating means controlled by the reference bits (R') stored in said block reference registering means and effective each time said processor requests a block of information not then stored in said working memory to cause an updating operation of said optimization means in accordance with the identities of the respective blocks which have been referenced in the working memory during the interval that terminated with the current block request, thereby updating the optimal interval number (A), the block index values (E), the counter values (C) and the complete-set interval number (B), such action occurring at times when the system is waiting for block replacements.

9. Apparatus as set forth in claim 8, further comprising:

detecting means responsive to the block index values (E) and responsive also to the optimal interval number (A) and to the complete-set interval numbers (B) for detecting a condition in which a particular block has been permitted by said predetermined replacement algorithm to remain continuously in the working memory in an unreferenced state during a plurality of successive intervals in the actual sequence of operations corresponding to at least N successive intervals in the optimal sequence, commencing with a complete-set interval;

and means controlled by said detecting means when it has detected the occurrence of such a condition, and operable in the event that the processor again references said particular block before it leaves the working memory, to increment the current optimal interval number (A) without changing the current actual interval number (P), thereby effectively decrementing the count of unnecessary transfers (U) charged to said predetermined replacement algorithm.

10. In a data processing system of the kind wherein blocks of information are stored at numbered block addresses in a backup store and in some instances are stored also at working addresses temporarily associated with such block numbers in a high-speed working memory having a limited storage capacity of N blocks, said system including a central processor operable to request blocks of information according to their block numbers in said backup store and to reference such blocks when they are residing in said working memory and having block transfer instrumentalities effective whenever said processor requests a block currently stored only in the backup store to fetch the requested block from said store and enter the same into the working memory at a working address therein selected according to a predetermined replacement algorithm, thereby replacing the block formerly stored at such working address and causing the operation of the system to be divided into a succession of block replacement intervals, each interval commencing when the processor requests a block not currently stored in the working memory and terminating when the processor next requests a block that is not then residing in the working memory, the improvement consisting of an on-line efficiency measurement apparatus for progressively determining, with the aid of said processor, how many of the block replacements effected under the control of said predetermined replacement algorithm were performed unnecessarily as a result of previous inconsistent replacement decisions executed under the control of said algorithm, said apparatus comprising:

interval indexing means for assigning a succession of actual interval numbers (P) respectively to the successive intervals in the actual sequence of block entry and replacement operations performed by said block transfer instrumentalities under the control of said predetermined replacement algorithm;

optimization means for defining a succession of optimal intervals according to an assumed optimal sequence of block entry and replacement operations evolved empirically from the actual sequence of block requests made by said processor and for assigning numbers (A) consecutively to such optimal intervals; the difference, if any, between the current values of said actual interval number (P) and said optimal interval number (A) at any given time representing the number of unnecessary block transfers (U) performed by said processor under the control of said predetermined replacement algorithm as of said given time, said optimization means including:

block indexing means for storing variable block index values (E), one for each block number which has been requested by the processor, the current index value of each block representing the number of the optimal interval in which the respective block would have been most recently referenced in the optimal sequence of operations;

counter table means having selectable storage positions addressable according to the numbers representing the respective intervals in the optimal sequence of operations, each such position being adapted to store a variable counter value (C) that is capable of being stepped through a range of values having zero and N−1 as its limits, the first such limiting value being assigned to the selected interval the first time that said processor makes reference to a block whose index value (E) corresponds to the number of that interval;

counter table adjusting means effective each time the processor makes reference to a different block having the same block index value (E) to step the counter value (C) for the corresponding interval by 1 toward its second limiting value, whereby a selected one of the counter values (C) attains its second limit each time a set of N blocks having the same index value (E) is referenced by said processor;

complete-set interval numbering means initially settable to a starting value (e.g., 1) and effective each time a counter value in said counter table means attains its second limiting value to register the number of the corresponding optimal interval as the current complete-set interval number (B), said number, when greater than said starting value, being equal to the number of the most recent interval in the optimal sequence of operations when the N blocks stored in the working memory could have been referenced by said processor within a period including such interval and, if necessary, not more than N−1 succeeding intervals in said optimal sequence;

block index adjusting means effective each time a block having an index value (E) lower than the current setting (B) of the complete-set interval numbering means is requested by said processor to increment the optimal interval number (A) and set the index value (E) of such block equal to the incremented value of the optimal interval number (A);

detecting means responsive to the block index values (E) and responsive also to the optimal interval number (A) and to the complete-set interval numbers (B) for detecting a condition in which a particular block has been permitted by said predetermined replacement algorithm to remain continuously in the working memory in an unreferenced state during a plurality of successive intervals in the actual sequence of operations corresponding to at least N successive intervals in the optimal sequence, commencing with a complete-set interval;

and means controlled by said detecting means when it has detected the occurrence of such a condition, and operable in the event that the processor again references said particular block before it leaves the working memory, to increment the current optimal interval number (A) without changing the current actual interval number (P), thereby effectively decrementing the count of unnecessary transfers (U) charged to said predetermined replacement algorithm.